(12) United States Patent
Puri et al.

(10) Patent No.: US 9,609,330 B2
(45) Date of Patent: Mar. 28, 2017

(54) CONTENT ADAPTIVE ENTROPY CODING OF MODES AND REFERENCE TYPES DATA FOR NEXT GENERATION VIDEO

(71) Applicant: Intel Corporation, Santa Clara, CA (US)

(72) Inventors: Atul Puri, Redmond, WA (US); Neelesh N. Gokhale, Seattle, WA (US); Daniel Socek, Miami, FL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/375,935

(22) PCT Filed: Jan. 28, 2014

(86) PCT No.: PCT/US2014/013333
§ 371 (c)(1),
(2) Date: Jul. 31, 2014

(87) PCT Pub. No.: WO2014/120656
PCT Pub. Date: Aug. 7, 2014

(65) Prior Publication Data
US 2016/0277739 A1 Sep. 22, 2016

Related U.S. Application Data

(60) Provisional application No. 61/758,314, filed on Jan. 30, 2013.

(51) Int. Cl.
*H04N 19/00* (2014.01)
*H04N 19/13* (2014.01)
(Continued)

(52) U.S. Cl.
CPC .......... *H04N 19/13* (2014.11); *H04N 19/105* (2014.11); *H04N 19/117* (2014.11);
(Continued)

(58) Field of Classification Search
CPC ..... H04N 19/13; H04N 19/105; H04N 19/136
(Continued)

(56) References Cited

U.S. PATENT DOCUMENTS

| 5,675,386 A | 10/1997 | Lee et al. |
| 2003/0108247 A1 | 6/2003 | Acharya et al. |

(Continued)

FOREIGN PATENT DOCUMENTS

| EP | 2 271 102 A1 | 1/2011 |
| JP | 2011-223068 A | 11/2011 |

(Continued)

OTHER PUBLICATIONS

Extended European Search Report, mailed Aug. 18, 2016, for EP Patent Application No. 14746494.5.

(Continued)

*Primary Examiner* — Jeffery Williams
(74) *Attorney, Agent, or Firm* — Green, Howard & Mughal LLP.

(57) ABSTRACT

Techniques related to content adaptive entropy coding of modes and reference types data are described.

25 Claims, 32 Drawing Sheets

(51) Int. Cl.

| | | |
|---|---|---|
| H04N 19/105 | (2014.01) | |
| H04N 19/124 | (2014.01) | |
| H04N 19/182 | (2014.01) | |
| H04N 19/513 | (2014.01) | |
| H04N 19/167 | (2014.01) | |
| H04N 19/169 | (2014.01) | |
| H04N 19/17 | (2014.01) | |
| H04N 19/186 | (2014.01) | |
| H04N 19/122 | (2014.01) | |
| H04N 19/176 | (2014.01) | |
| H04N 19/61 | (2014.01) | |
| H04N 19/91 | (2014.01) | |
| H04N 19/63 | (2014.01) | |
| H04N 19/119 | (2014.01) | |
| H04N 19/96 | (2014.01) | |
| H04N 19/12 | (2014.01) | |
| H04N 19/136 | (2014.01) | |
| H04N 19/139 | (2014.01) | |
| H04N 19/159 | (2014.01) | |
| H04N 19/184 | (2014.01) | |
| H04N 19/192 | (2014.01) | |
| H04N 19/573 | (2014.01) | |
| H04N 19/59 | (2014.01) | |
| H04N 19/117 | (2014.01) | |
| H04N 19/82 | (2014.01) | |
| H04N 19/517 | (2014.01) | |
| H04N 19/523 | (2014.01) | |
| H04N 19/53 | (2014.01) | |
| H04N 19/577 | (2014.01) | |
| H04N 19/196 | (2014.01) | |
| H04N 19/126 | (2014.01) | |
| H04N 19/31 | (2014.01) | |
| H04N 19/40 | (2014.01) | |

(52) U.S. Cl.
CPC .......... *H04N 19/119* (2014.11); *H04N 19/12* (2014.11); *H04N 19/122* (2014.11); *H04N 19/124* (2014.11); *H04N 19/126* (2014.11); *H04N 19/136* (2014.11); *H04N 19/139* (2014.11); *H04N 19/159* (2014.11); *H04N 19/167* (2014.11); *H04N 19/17* (2014.11); *H04N 19/176* (2014.11); *H04N 19/182* (2014.11); *H04N 19/184* (2014.11); *H04N 19/186* (2014.11); *H04N 19/1887* (2014.11); *H04N 19/192* (2014.11); *H04N 19/196* (2014.11); *H04N 19/31* (2014.11); *H04N 19/40* (2014.11); *H04N 19/513* (2014.11); *H04N 19/517* (2014.11); *H04N 19/523* (2014.11); *H04N 19/53* (2014.11); *H04N 19/573* (2014.11); *H04N 19/577* (2014.11); *H04N 19/59* (2014.11); *H04N 19/61* (2014.11); *H04N 19/63* (2014.11); *H04N 19/82* (2014.11); *H04N 19/91* (2014.11); *H04N 19/96* (2014.11)

(58) Field of Classification Search
USPC .................................................. 375/240.02
See application file for complete search history.

(56) References Cited

U.S. PATENT DOCUMENTS

| | | |
|---|---|---|
| 2005/0232501 A1 | 10/2005 | Mukerjee |
| 2006/0133479 A1 | 6/2006 | Chen et al. |
| 2006/0251330 A1 | 11/2006 | Toth et al. |
| 2007/0217500 A1 | 9/2007 | Gao et al. |
| 2007/0291849 A1 | 12/2007 | Lainema |
| 2008/0112489 A1 | 5/2008 | Malladi et al. |
| 2009/0046937 A1 | 2/2009 | Fenney et al. |
| 2009/0279615 A1 | 11/2009 | Au et al. |
| 2010/0002775 A1 | 1/2010 | Huang et al. |
| 2010/0269009 A1 | 10/2010 | Okamura et al. |
| 2011/0051811 A1 | 3/2011 | Wang et al. |
| 2011/0109721 A1 | 5/2011 | Hong et al. |
| 2012/0128070 A1 | 5/2012 | Kim et al. |
| 2012/0134412 A1 | 5/2012 | Shibahara et al. |
| 2012/0155532 A1 | 6/2012 | Puri et al. |
| 2012/0207222 A1 | 8/2012 | Lou et al. |
| 2013/0003837 A1 | 1/2013 | Yu et al. |
| 2015/0229948 A1* | 8/2015 | Puri ..................... H04N 19/615 375/240.03 |

FOREIGN PATENT DOCUMENTS

| | | |
|---|---|---|
| JP | 2012-080213 A | 4/2012 |
| KR | 10-2011-0112171 A | 10/2011 |
| KR | 10-2011-0112180 A | 10/2011 |
| KR | 10-2011-0129493 A | 12/2011 |
| KR | 10-2012-0086232 A | 8/2012 |
| KR | 10-2013-0010124 A | 1/2013 |
| KR | 10-2013-0045425 A | 5/2013 |
| RU | 2246797 | 2/2005 |
| RU | 2355127 | 5/2009 |
| WO | 2012/045037 A2 | 4/2012 |
| WO | 2012044935 | 4/2012 |
| WO | 2014/078068 | 5/2014 |
| WO | 2014/120367 A1 | 8/2014 |
| WO | 2014/120373 A1 | 8/2014 |
| WO | 2014/120656 | 8/2014 |
| WO | 20141/120575 A1 | 8/2014 |

OTHER PUBLICATIONS

International Preliminary Report on Patentability for International Patent Application No. PCT/US2013/077967, mailed on Aug. 13, 2015.
International Preliminary Report on Patentability for International Patent Application No. PCT/US2014/013027, mailed on Aug. 12, 2015.
International Preliminary Report on Patentability for International Patent Application No. PCT/US2014/013333, mailed on Aug. 13, 2015.
International Preliminary Report on Patentability for International Patent Application No. PCT/US2013/067182, mailed on May 28, 2015.
International Preliminary Report on Patentability for International Patent Application No. PCT/US2013/077692, mailed Aug. 13, 2015.
Office Action for Russian Patent Application No. 2015126241, mailed on Jun. 27, 2016.
International Search Report and Written Opinion received for PCT Patent Application No. PCT/US2013/077692, mailed on Apr. 11, 2014, 15 Pages.
International Search Report and Written Opinion received for PCT Patent Application No. PCT/US2013/067182, mailed on Jan. 29, 2014, 10 Pages.
International Search Report and Written Opinion received for PCT Patent Application No. PCT/US2013/077967, mailed on Apr. 10, 2014, 16 Pages.
International Search Report and Written Opinion received for PCT Patent Application No. PCT/US2014/013027, mailed on May 20, 2014, 12 Pages.
International Search Report and Written Opinion received for PCT Patent Application No. PCT/US2014/013333 , mailed on May 20, 2014, 11 Pages.

* cited by examiner

_US 9,609,330 B2_

CONTENT ADAPTIVE ENTROPY CODING OF MODES AND REFERENCE TYPES DATA FOR NEXT GENERATION VIDEO

RELATED APPLICATIONS

This application claims the benefit of International PCT Application No. PCT/US2014/013333 filed on Jan. 28, 2014 titled "CONTENT ADAPTIVE ENTROPY CODING OF MODES AND REFERENCE TYPES DATA FOR NEXT GENERATION VIDEO" and further claims benefit of U.S. Provisional Application No. 61/758,314 filed on Jan. 30, 2013 and titled "NEXT GENERATION VIDEO CODER", the contents of which are hereby incorporated in their entirety.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The present description, developed within the context of a Next Generation Video (NGV) codec project, addresses the general problem of designing an advanced video codec that maximizes the achievable compression efficiency while remaining sufficiently practical for implementation on devices. For instance, with ever increasing resolution of video and expectation of high video quality due to availability of good displays, the corresponding bitrate/bandwidth required using existing video coding standards such as earlier MPEG standards and even the more recent H.264/AVC standard, is relatively high. H.264/AVC was not perceived to be providing high enough compression for evolving higher resolution video applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3($b$) is an illustrative diagram of an example next generation video decoder and subsystems;

FIG. 11 is an illustrative diagram of an example video coding system;

DETAILED DESCRIPTION

Figure 1:
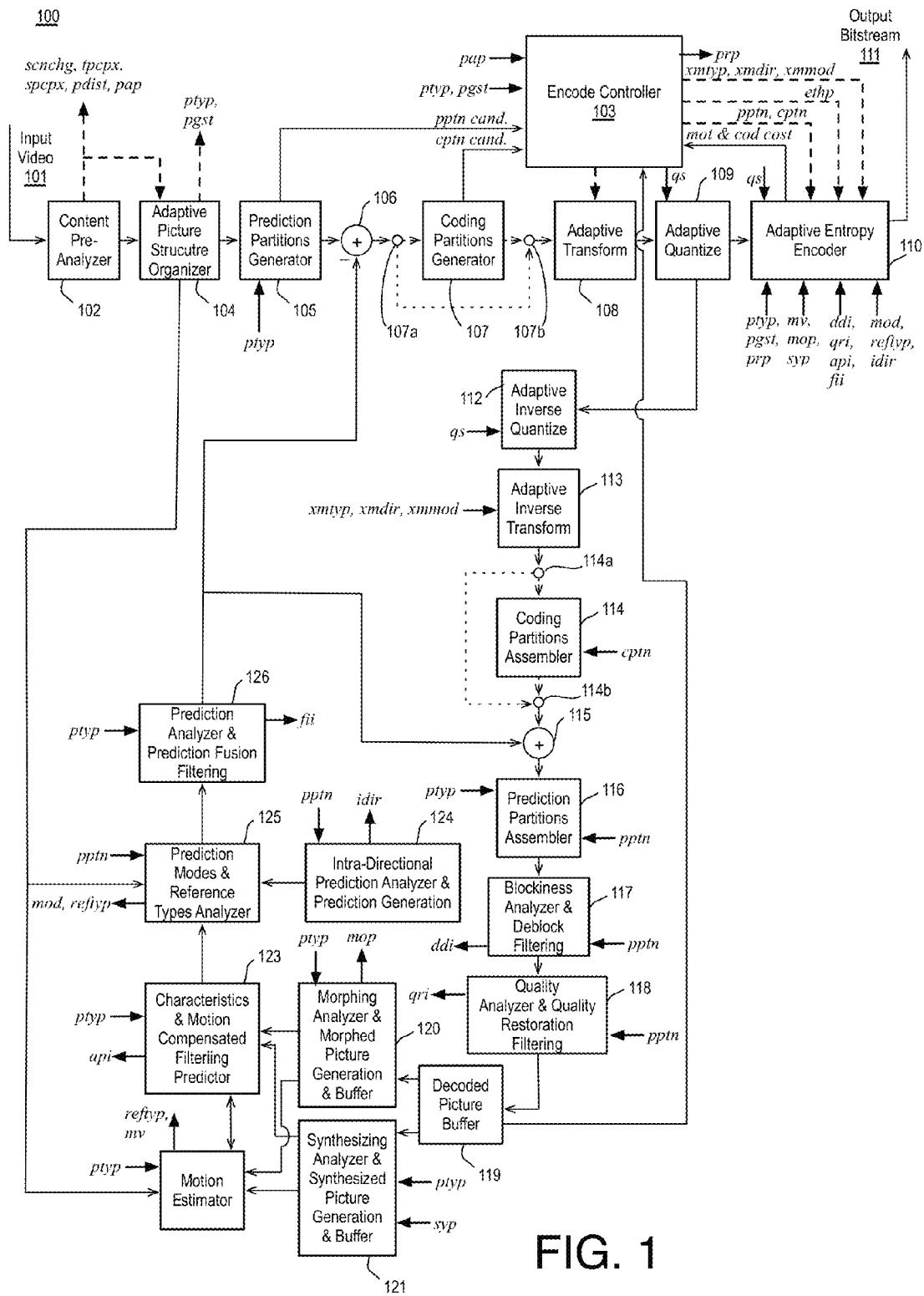
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to content adaptive entropy coding for video systems.

Next generation video (NGV) systems, apparatus, articles, and methods are described below. NGV video coding may incorporate significant content based adaptivity in the video coding process to achieve higher compression. As discussed above, the H.264/AVC standard may have a variety of limitations and ongoing attempts to improve on the standard, such as, for example, the HEVC standard may use iterative approaches to address such limitations. Herein, an NGV system including an encoder and a decoder will be described.

For example, the H.264 standard may support two modes of entropy coding. In the first mode, Adaptive VLC (Variable Length Coding), transform coefficients may be coded using Context Adaptive VLC (CAVLC) and all other syntax elements (e.g., overhead data, modes, motion vectors, and so on) may be coded using Exponential Golomb coding. The CAVLC coded data and the Exponential Golomb coded data may be multiplexed to generate an encoded bitstream. In the second mode, all data may be encoded using Context Adaptive Binary Arithmetic Coding (CABAC). The corresponding decoder may also operate in two modes, disassembling and decoding the multiplexed bit stream in the first mode and decoding the CABAC encoded bitstream in the second mode. Such techniques may have limitations. For example, CABAC coding may be efficient but may be complex such that throughput in higher resolution contexts may be limited. Further, by grouping data types together for coding, efficiency and complexity of the entropy coding may not be optimized.

In some video codec implementations, entropy coding and decoding of various data such as overhead data, modes, motion vectors, and/or transform coefficients may be a significant contributor to the coding efficiency and complexity of the system. In some examples, the techniques discussed herein may balance coding efficiency and system complexity.

In some examples, first video data and second video data may be received for entropy encoding at an entropy encoder module. The first video data and the second video data may be different data types (e.g., header data, morphing parameters, synthesizing parameters, or global maps data or motion vectors or intra-prediction partition data or so on, as is discussed further herein). A first entropy encoding technique may be determined for the first video data based on a parameter associated with the first video data such as, for example, a number of compressed bits of the first video data, a predetermined indicator or flag associated with the first video data, a predetermined threshold, or a heuristically determined threshold or the like. In some examples, the first entropy encoding technique may be chosen from one of an adaptive symbol-run variable length coding technique or an adaptive proxy variable length coding technique. The first video data may be entropy encoded using the first entropy encoding technique and the second video data may be entropy encoded using the first entropy encoding technique. In some examples, the second entropy encoding technique may be determined for the second video data based on a parameter as discussed with respect to the first video data. In some examples, the second entropy encoding technique may be determined from options including an adaptive symbol-run variable length coding technique, an adaptive proxy variable length coding technique, an adaptive vector variable length coding, an adaptive 1-dimensional variable length coding technique, an adaptive 2-dimensional variable length coding technique, or other techniques as discussed herein. In some examples, the second entropy encoding technique may be predetermined for the data type of the second video data. Entropy encoding the first video data and the second video data may generate first compressed video data and second compressed video data. The first and second compressed video data may be assembled to generate an output bitstream.

The output bitstream may be transmitted from the encoder to a decoder, which may disassemble the bitstream to determine the first and second compressed video data. The compressed video data may be entropy decoded to generate entropy decoded video data, which may be further decoded to generate a video frame. The video frame may be transmitted to a display device for presentment to a user.

In some examples, additional video data types may be received for entropy encoding at the entropy encoder module. For example, third, fourth, fifth, sixth, seventh, or more video data may be entropy encoded to generate associated compressed video data, which may be assembled in the output bitstream, transmitted, and subsequently entropy decoded via a decoder. The various data types and encoding/decoding technique options and implementations are discussed further herein.

As used herein, the term "coder" may refer to an encoder and/or a decoder. Similarly, as used herein, the term "coding" may refer to performing video encoding via an encoder and/or performing video decoding via a decoder. For example a video encoder and video decoder may both be examples of coders capable of coding video data. In addition, as used herein, the term "codec" may refer to any process, program or set of operations, such as, for example, any combination of software, firmware, and/or hardware, that may implement an encoder and/or a decoder. Further, as used herein, the phrase "video data" may refer to any type of data associated with video coding such as, for example, video frames, image data, encoded bitstream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The reconstructed tiles or super-fragments may be transmitted to blockiness analyzer and deblock filtering module 117. Blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in output bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in output bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1(a), inter-prediction may be performed by one or more modules including morphing analyzer and morphed picture generation module 120, synthesizing analyzer and generation module 121, and characteristics and motion filtering predictor module 123. Morphing analyzer and morphed picture generation module 120 may analyze a current picture to determine parameters for changes in gain, changes in dominant motion, changes in registration, and changes in blur with respect to a reference frame or frames with which it may be to be coded. The determined morphing parameters may be quantized/de-quantized and used (e.g., by morphing analyzer and morphed picture generation module 120) to generate morphed reference frames that that may be used by motion estimator module 122 for computing motion vectors for efficient motion (and characteristics) compensated prediction of a current frame. Synthesizing analyzer and generation module 121 may generate super resolution (SR) pictures and projected interpolation (PI) pictures or the like for motion for determining motion vectors for efficient motion compensated prediction in these frames.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion compensated filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes from among, "skip", "auto", "inter", "split", "multi", and "intra", for each prediction partition of a tile (or super-fragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in output bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

FIG. 1 illustrates example control signals associated with operation of video encoder 100, where the following abbreviations may represent the associated information:
scnchg Scene change information
spcpx Spatial complexity information
tpcpx Temporal complexity information
pdist Temporal prediction distance information
pap Pre Analysis parameters (placeholder for all other pre analysis parameters except scnchg, spcpx, tpcpx, pdist)
ptyp Picture types information
pgst Picture group structure information
pptn cand. Prediction partitioning candidates
cptn cand. Coding Partitioning Candidates
prp Preprocessing
xmtyp Transform type information
xmdir Transform direction information
xmmod Transform mode
ethp One eighth (⅛th) pel motion prediction
pptn Prediction Partitioning
cptn Coding Partitioning
mot&cod cost Motion and Coding Cost
qs quantizer information set (includes Quantizer parameter (Qp), Quantizer matrix (QM) choice)
mv Motion vectors
mop Morphing Parameters
syp Synthesizing Parameters
ddi Deblock and dither information
qri Quality Restoration filtering index/information
api Adaptive Precision filtering index/information
fii Fusion Filtering index/information
mod Mode information
reftyp Reference type information
idir Intra Prediction Direction The various signals and data items that may need to be sent to the decoder, ie, pgst, ptyp, prp, pptn, cptn, modes, reftype, ethp, xmtyp, xmdir, xmmod, idir, mv, qs, mop, syp, ddi, qri, api, fii, quant coefficients and others may then be entropy encoded by adaptive entropy encoder 110 that may include different entropy coders collectively referred to as an entropy encoder subsystem. While these control signals are illustrated as being associated with specific example functional modules of encoder 100 in FIG. 1, other implementations may include a different distribution of control signals among the functional modules of encoder 300. The present disclosure is not limited in this regard and, in various examples, implementation of the control signals herein may include the undertaking of only a subset of the specific example control signals shown, additional control signals, and/or in a different arrangement than illustrated.

Figure 2:
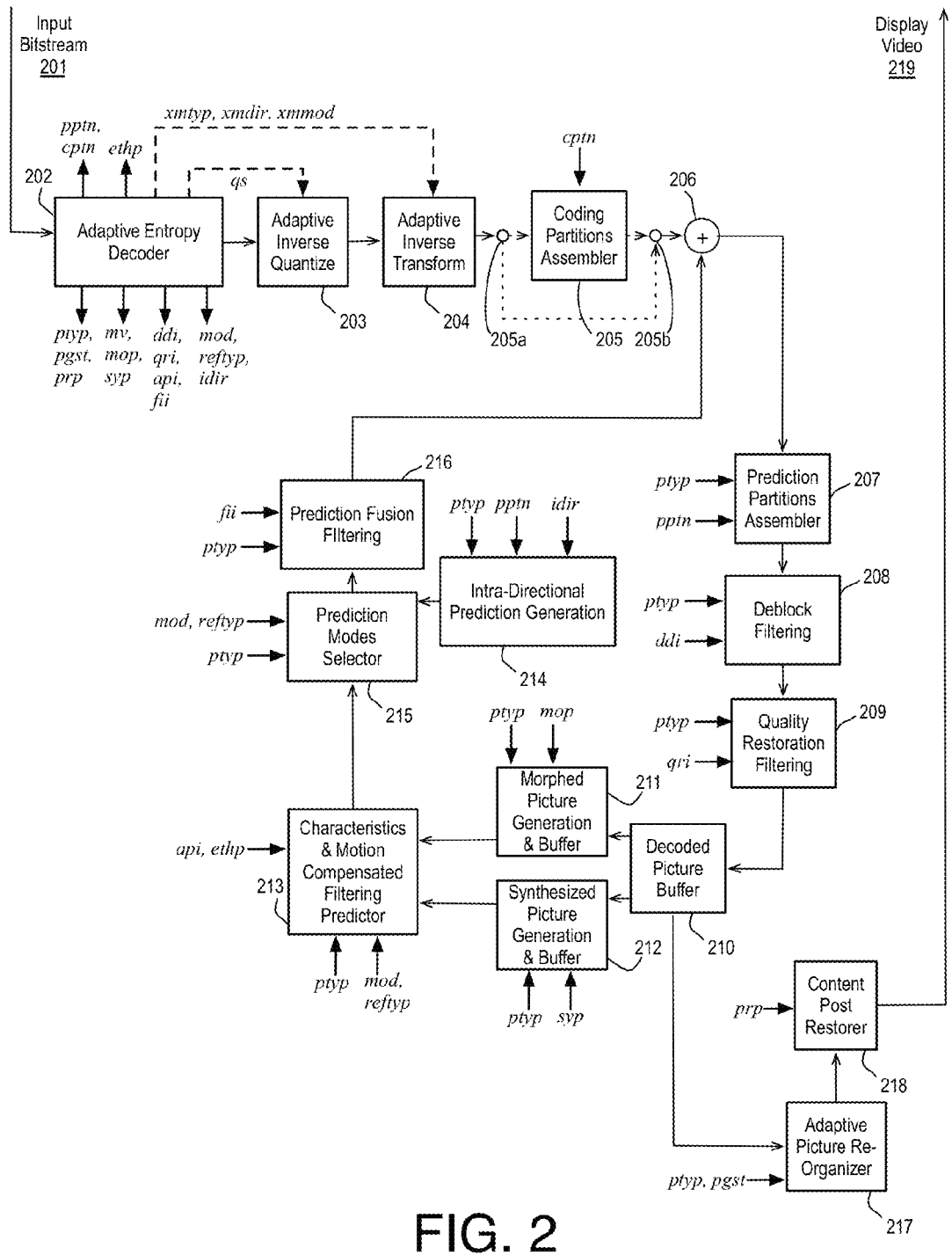
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F/B-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

FIG. 2 illustrates example control signals associated with operation of video decoder 200, where the indicated abbreviations may represent similar information as discussed with respect to FIG. 1 above. While these control signals are illustrated as being associated with specific example functional modules of decoder 200 in FIG. 4, other implementations may include a different distribution of control signals among the functional modules of encoder 100. The present disclosure is not limited in this regard and, in various examples, implementation of the control signals herein may include the undertaking of only a subset of the specific example control signals shown, additional control signals, and/or in a different arrangement than illustrated.

While FIGS. 1 through 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3A:
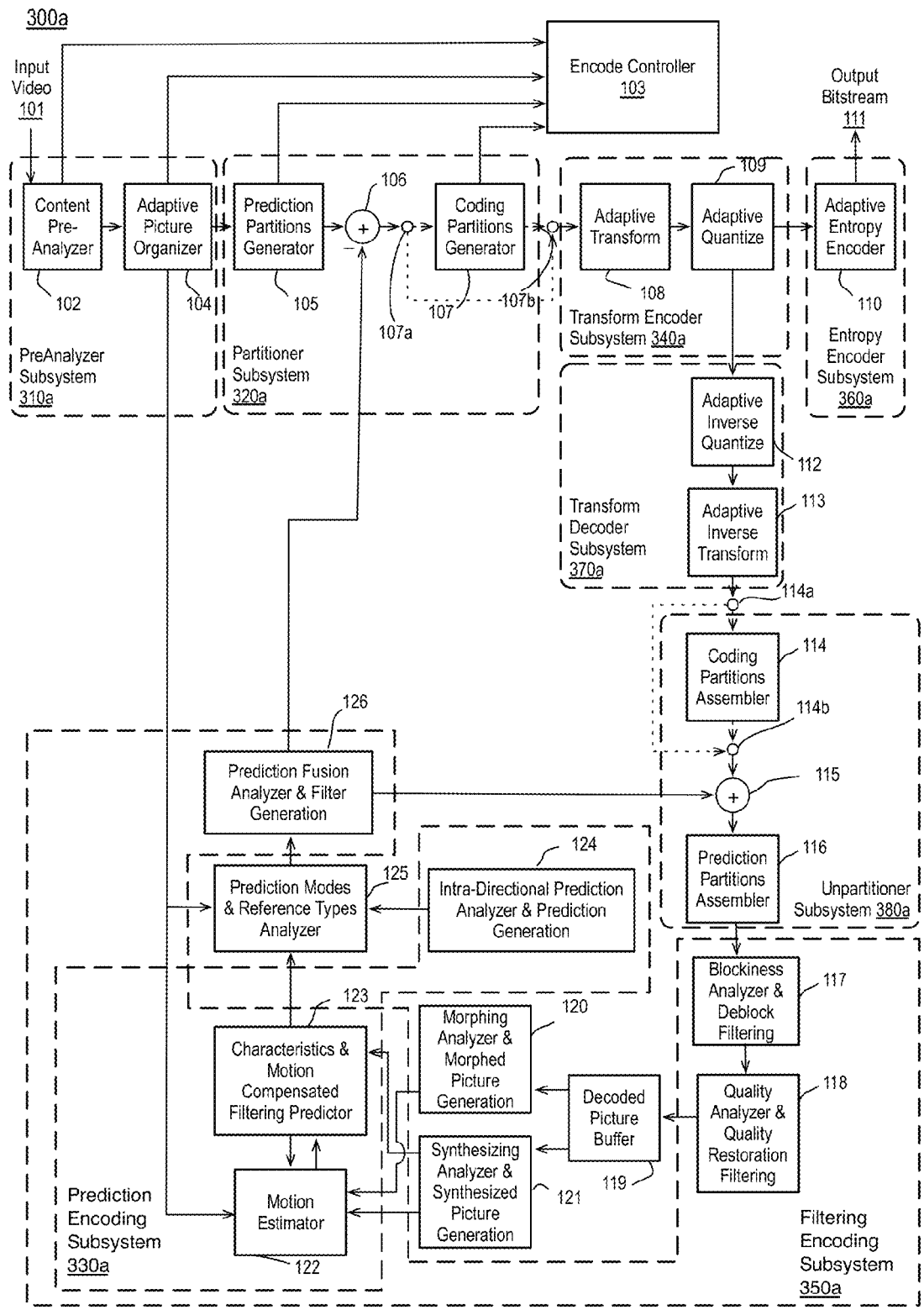
FIG. 3($a$) is an illustrative diagram of an example next generation video encoder and subsystems.

FIG. 3(a) is an illustrative diagram of an example next generation video encoder 300a, arranged in accordance with at least some implementations of the present disclosure. FIG. 3(a) presents a similar encoder to that shown in FIGS. 1(a) and 1(b), and similar elements will not be repeated for the sake of brevity. As shown in FIG. 3(a), encoder 300a may include preanalyzer subsystem 310a, partitioner subsystem 320a, prediction encoding subsystem 330a, transform encoder subsystem 340a, filtering encoding subsystem 350a, entropy encoder system 360a, transform decoder subsystem 370a, and/or unpartioner subsystem 380a. Preanalyzer subsystem 310a may include content pre-analyzer module 102 and/or adaptive picture organizer module 104. Partitioner subsystem 320a may include prediction partitions generator module 105, and/or coding partitions generator 107. Prediction encoding subsystem 330a may include motion estimator module 122, characteristics and motion compensated filtering predictor module 123, and/or intra-directional prediction analyzer and prediction generation module 124. Transform encoder subsystem 340a may include adaptive transform module 108 and/or adaptive quantize module 109. Filtering encoding subsystem 350a may include blockiness analyzer and deblock filtering module 117, quality analyzer and quality restoration filtering module 118, motion estimator module 122, characteristics and motion compensated filtering predictor module 123, and/or prediction analyzer and prediction fusion filtering module 126. Entropy coding subsystem 360a may include adaptive entropy encoder module 110. Transform decoder subsystem 370a may include adaptive inverse quantize module 112 and/or adaptive inverse transform module 113. Unpartioner subsystem 380a may include coding partitions assembler 114 and/or prediction partitions assembler 116.

Partitioner subsystem 320a of encoder 300a may include two partitioning subsystems: prediction partitions generator module 105 that may perform analysis and partitioning for prediction, and coding partitions generator module 107 that may perform analysis and partitioning for coding. Another partitioning method may include adaptive picture organizer 104 which may segment pictures into regions or slices may also be optionally considered as being part of this partitioner.

Prediction encoder subsystem 330a of encoder 300a may include motion estimator 122 and characteristics and motion compensated filtering predictor 123 that may perform analysis and prediction of "inter" signal, and intra-directional prediction analyzer and prediction generation module 124 that may perform analysis and prediction of "intra" signal. Motion estimator 122 and characteristics and motion compensated filtering predictor 123 may allow for increasing predictability by first compensating for other sources of differences (such as gain, global motion, registration), followed by actual motion compensation. They may also allow for use of data modeling to create synthesized frames (super resolution, and projection) that may allow better predictions, followed by use of actual motion compensation in such frames.

Transform encoder subsystem 340a of encoder 300a may perform analysis to select the type and size of transform and may include two major types of components. The first type of component may allow for using parametric transform to allow locally optimal transform coding of small to medium size blocks; such coding however may require some overhead. The second type of component may allow globally stable, low overhead coding using a generic/fixed transform such as the DCT, or a picture based transform from a choice of small number of transforms including parametric transforms. For locally adaptive transform coding, PHT (Parametric Haar Transform) may be used. Transforms may be performed on 2D blocks of rectangular sizes between 4×4 and 64×64, with actual sizes that may depend on a number of factors such as if the transformed data is luma or chroma, inter or intra, and if the transform used is PHT or DCT. The resulting transform coefficients may be quantized, scanned and entropy coded.

Entropy encoder subsystem 360a of encoder 300a may include a number of efficient but low complexity components each with the goal of efficiently coding a specific type of data (various types of overhead, motion vectors, or transform coefficients). Components of this subsystem may belong to a generic class of low complexity variable length coding techniques, however, for efficient coding, each component may be custom optimized for highest efficiency. For instance, a custom solution may be designed for coding of "Coded/Not Coded" data, another for "Modes and Ref Types" data, yet another for "Motion Vector" data, and yet another one for "Prediction and Coding Partitions" data. Finally, because a very large portion of data to be entropy coded is "transform coefficient" data, multiple approaches for efficient handling of specific block sizes, as well as an algorithm that may adapt between multiple tables may be used.

Filtering encoder subsystem 350a of encoder 300a may perform analysis of parameters as well as multiple filtering of the reconstructed pictures based on these parameters, and may include several subsystems. For example, a first subsystem, blockiness analyzer and deblock filtering module 117 may deblock and dither to reduce or mask any potential block coding artifacts. A second example subsystem, quality analyzer and quality restoration filtering module 118, may perform general quality restoration to reduce the artifacts due to quantization operation in any video coding. A third example subsystem, which may include motion estimator 122 and characteristics and motion compensated filtering predictor module 123, may improve results from motion compensation by using a filter that adapts to the motion characteristics (motion speed/degree of blurriness) of the content. A fourth example subsystem, prediction fusion analyzer and filter generation module 126, may allow adaptive filtering of the prediction signal (which may reduce spurious artifacts in prediction, often from intra prediction) thereby reducing the prediction error which needs to be coded.

Encode controller module 103 of encoder 300a may be responsible for overall video quality under the constraints of given resources and desired encoding speed. For instance, in full RDO (Rate Distortion Optimization) based coding without using any shortcuts, the encoding speed for software encoding may be simply a consequence of computing resources (speed of processor, number of processors, hyperthreading, DDR3 memory etc.) availability. In such case, encode controller module 103 may be input every single combination of prediction partitions and coding partitions and by actual encoding, and the bitrate may be calculated along with reconstructed error for each case and, based on lagrangian optimization equations, the best set of prediction and coding partitions may be sent for each tile of each frame being coded. The full RDO based mode may result in best compression efficiency and may also be the slowest encoding mode. By using content analysis parameters from content preanalyzer module 102 and using them to make RDO simplification (not test all possible cases) or only pass a certain percentage of the blocks through full RDO, quality versus speed tradeoffs may be made allowing speedier encoding. Up to now we have described a variable bitrate (VBR) based encoder operation. Encode controller module 103 may also include a rate controller that can be invoked in case of constant bitrate (CBR) controlled coding.

Lastly, preanalyzer subsystem 310a of encoder 300a may perform analysis of content to compute various types of parameters useful for improving video coding efficiency and speed performance. For instance, it may compute horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation etc. The parameters generated by preanalyzer subsystem 310a may either be consumed by the encoder or be quantized and communicated to decoder 200.

While subsystems 310a through 380a are illustrated as being associated with specific example functional modules of encoder 300a in FIG. 3(a), other implementations of encoder 300a herein may include a different distribution of the functional modules of encoder 300a among subsystems 310a through 380a. The present disclosure is not limited in this regard and, in various examples, implementation of the example subsystems 310a through 380a herein may include the undertaking of only a subset of the specific example functional modules of encoder 300a shown, additional functional modules, and/or in a different arrangement than illustrated.

Figure 3B:
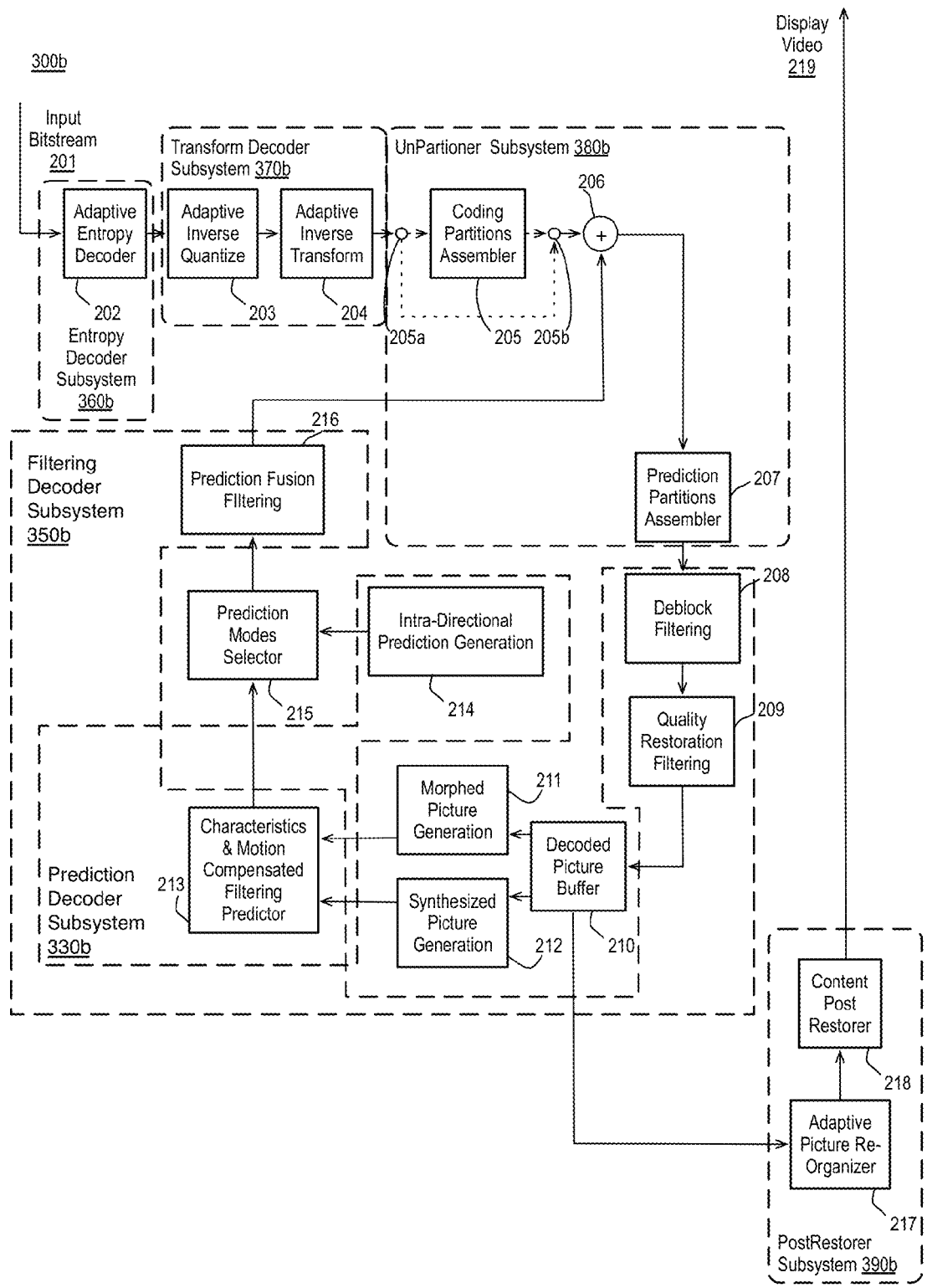

FIG. 3(b) is an illustrative diagram of an example next generation video decoder 300b, arranged in accordance with at least some implementations of the present disclosure. FIG. 3(b) presents a similar decoder to that shown in FIG. 2, and similar elements will not be repeated for the sake of brevity. As shown in FIG. 3(b), decoder 300b may include prediction decoder subsystem 330b, filtering decoder subsystem 350b, entropy decoder subsystem 360b, transform decoder subsystem 370b, unpartitioner_2 subsystem 380b, unpartitioner_1 subsystem 351b, filtering decoder subsystem 350b, and/or postrestorer subsystem 390b. Prediction decoder subsystem 330b may include characteristics and motion compensated filtering predictor module 213 and/or intra-directional prediction generation module 214. Filtering decoder subsystem 350b may include deblock filtering module 208, quality restoration filtering module 209, characteristics and motion compensated filtering predictor module 213, and/or prediction fusion filtering module 216. Entropy decoder subsystem 360b may include adaptive entropy decoder module 202. Transform decoder subsystem 370b may include adaptive inverse quantize module 203 and/or adaptive inverse transform module 204. Unpartitioner_2 subsystem 380b may include coding partitions assembler 205. Unpartitioner_1 subsystem 351b may include prediction partitions assembler 207. Postrestorer subsystem 790 may include content post restorer module 218 and/or adaptive picture re-organizer 217.

Entropy decoding subsystem 360b of decoder 300b may perform the inverse operation of the entropy encoder subsystem 360a of encoder 300a, i.e., it may decode various data (types of overhead, motion vectors, transform coefficients) encoded by entropy encoder subsystem 360a using a class of techniques loosely referred to as variable length decoding. Specifically, various types of data to be decoded may include "Coded/Not Coded" data, "Modes and Ref Types" data, "Motion Vector" data, "Prediction and Coding Partitions" data, and "Transform Coefficient" data.

Transform decoder subsystem 370b of decoder 300b may perform inverse operation to that of transform encoder subsystem 340a of encoder 300a. Transform decoder subsystem 370b may include two types of components. The first type of example component may support use of the parametric inverse PHT transform of small to medium block sizes, while the other type of example component may support inverse DCT transform for all block sizes. The PHT transform used for a block may depend on analysis of decoded data of the neighboring blocks. Output bitstream 111 and/or input bitstream 201 may carry information about partition/block sizes for PHT transform as well as in which direction of the 2D block to be inverse transformed the PHT may be used (the other direction uses DCT). For blocks coded purely by DCT, the partition/block sizes information may be also retrieved from output bitstream 111 and/or input bitstream 201 and used to apply inverse DCT of appropriate size.

Unpartitioner subsystem 380b of decoder 300b may perform inverse operation to that of partitioner subsystem 320a of encoder 300a and may include two unpartitioning subsystems, coding partitions assembler module 205 that may perform unpartitioning of coded data and prediction partitions assembler module 207 that may perform unpartitioning for prediction. Further if optional adaptive picture organizer module 104 is used at encoder 300a for region segmentation or slices, adaptive picture re-organizer module 217 may be needed at the decoder.

Prediction decoder subsystem 330b of decoder 300b may include characteristics and motion compensated filtering predictor module 213 that may perform prediction of "inter" signal and intra-directional prediction generation module 214 that may perform prediction of "intra" signal. Characteristics and motion compensated filtering predictor module 213 may allow for increasing predictability by first compensating for other sources of differences (such as gain, global motion, registration) or creation of synthesized frames (super resolution, and projection), followed by actual motion compensation.

Filtering decoder subsystem 350b of decoder 300b may perform multiple filtering of the reconstructed pictures based on parameters sent by encoder 300a and may include several subsystems. The first example subsystem, deblock filtering module 208, may deblock and dither to reduce or mask any potential block coding artifacts. The second example subsystem, quality restoration filtering module 209, may perform general quality restoration to reduce the artifacts due to quantization operation in any video coding. The third example subsystem, characteristics and motion compensated filtering predictor module 213, may improve results from motion compensation by using a filter that may adapt to the motion characteristics (motion speed/degree of blurriness) of the content. The fourth example subsystem, prediction fusion filtering module 216, may allow adaptive filtering of the prediction signal (which may reduce spurious artifacts in prediction, often from intra prediction) thereby reducing the prediction error which may need to be coded.

Postrestorer subsystem 390b of decoder 300b is an optional block that may perform further improvement of perceptual quality of decoded video. This processing can be done either in response to quality improvement parameters sent by encoder 100, or it can be standalone decision made at the postrestorer subsystem 390b. In terms of specific parameters computed at encoder 100 that can be used to improve quality at postrestorer subsystem 390b may be estimation of film grain noise and residual blockiness at encoder 100 (even after deblocking). As regards the film grain noise, if parameters can be computed and sent via output bitstream 111 and/or input bitstream 201 to decoder 200, then these parameters may be used to synthesize the film grain noise. Likewise, for any residual blocking artifacts at encoder 100, if they can be measured and parameters sent via output bitstream 111 and/or bitstream 201, postrestorer subsystem 390b may decode these parameters and may use them to optionally perform additional deblocking prior to display. In addition, encoder 100 also may have access to scene change, spatial complexity, temporal complexity, motion range, and prediction distance information that may help in quality restoration in postrestorer subsystem 390b.

While subsystems 330b through 390b are illustrated as being associated with specific example functional modules of decoder 300b in FIG. 3(b), other implementations of decoder 300b herein may include a different distribution of the functional modules of decoder 300b among subsystems 330b through 390b. The present disclosure is not limited in this regard and, in various examples, implementation of the example subsystems 330b through 390b herein may include the undertaking of only a subset of the specific example functional modules of decoder 300b shown, additional functional modules, and/or in a different arrangement than illustrated.

Figure 4:
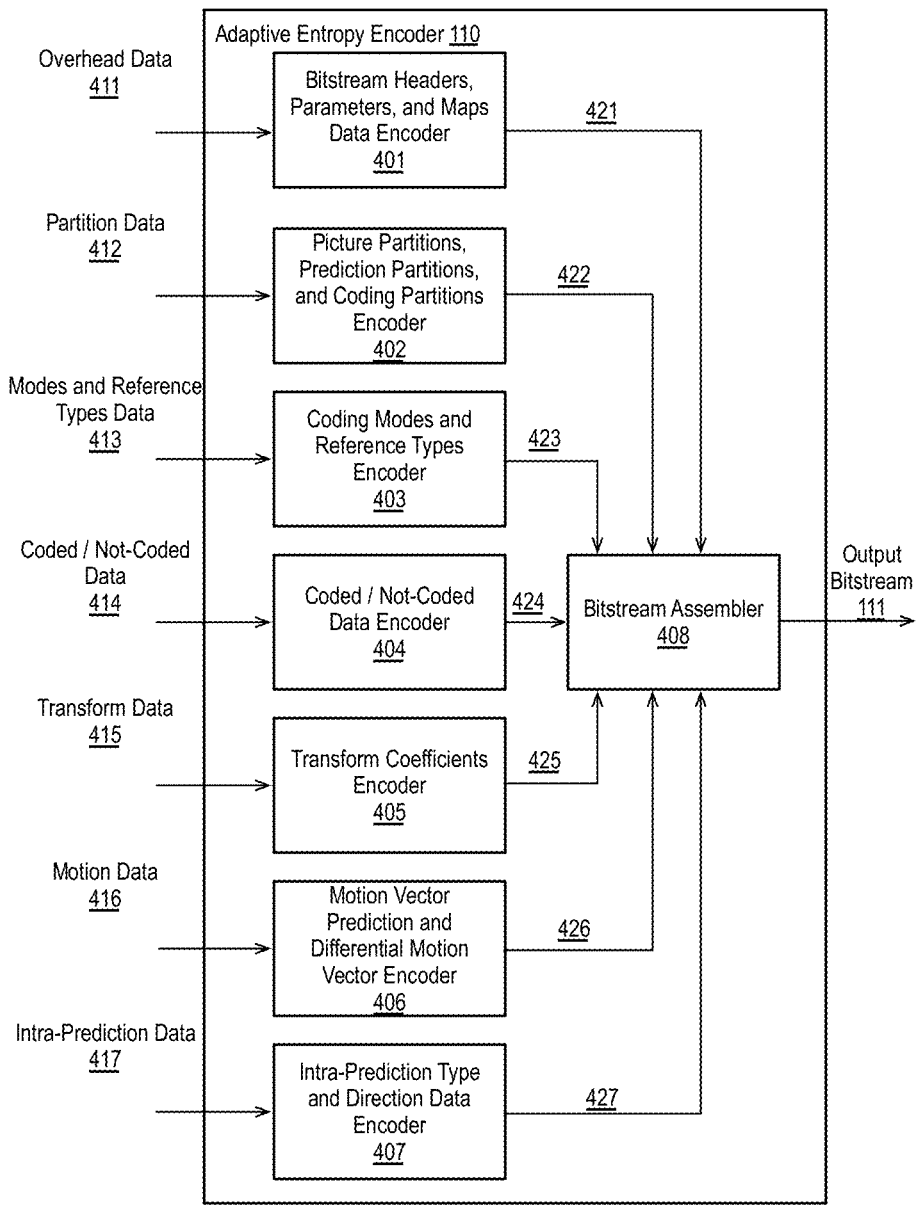
FIG. 4 is an illustrative diagram of an example entropy encoder module.

FIG. 4 is an illustrative diagram of an example entropy encoder module 110, arranged in accordance with at least some implementations of the present disclosure. As shown, entropy encoder module 110 may include bitstream headers, parameters and maps data encoder module 401, picture partitions, prediction partitions, and coding partitions encoder module 402, coding modes and reference types encoder module 403, coded/not-coded data encoder module 404, transform coefficients encoder module 405, motion vector prediction and differential motion vector encoder module 406, intra-prediction type and direction data encoder module 407, and/or bitstream assembler module 408. In the discussion herein, each of modules 401-407 may be shortened to encoder module 401, encoder module 404, or the like for the sake of brevity.

As shown, encoder modules 401-407 may receive video data 411-417, respectively, via adaptive entropy encoder 110. In some examples, received video data 411-417 may be received from various modules of encoder 100 as discussed herein. As shown, encoder modules 401-407 may compress the received video data 411-417 to generated compressed video data 421-427. Compressed video data 421-427 may be provided to bitstream assembler 408, which may assemble compressed video data 421-427 to generate output bitstream 111.

In some examples, encoder modules 401-407 may each include one or more specialized component(s) for efficiently encoding the type of data associated with received video data 411-417. In some examples, one or more of encoder modules 401-407 may preprocess the received video data 411-417 and/or select an entropy coding technique based on a parameter, parameters, or characteristics of the received video data 411-417 or other system information.

For example, encoder module 401 may receive overhead data 411, which may include bitstream header data (e.g., sequence and/or picture level bitstream headers), morphing parameters, synthesizing parameters, or global maps data (e.g., quantizer maps of pictures indicating quantizers to be used on a partition basis). As is discussed further below with respect to FIG. 6, in some examples, encoder module 401 may implement an adaptive symbol-run variable length coding technique, an adaptive proxy variable length coding technique, or a variable length coding table or tables compression of video data 411. In some examples, encoder module 411 may determine which technique provides the greatest compression efficiency (e.g., the fewest bits for compressed video data 421) such that the parameter(s) associated with video data 411 may be the number of bits needed for each coding technique or the like. Encoder module 411 may entropy encode video data 411 to generate compressed video data 421 (e.g., compressed overhead data), which may be transmitted to bitstream assembler 408 as shown.

As discussed, in some examples, the parameter associated with the video data (e.g., any of video data 411-417) may be a fewest number of attainable bits, most efficient encoding technique, or the like. In other examples, the parameter associated with the video data may be a predefined or predetermine parameter such that encoding technique is predetermined. In some examples, the parameter associated with the video data may be based on a characteristic of the video data such that the determined encoding technique may be adaptive to the received video data as is discussed further herein.

As shown, in some examples, encoder module 402 may receive partition data 412, which may include picture slices or regions data, intra-prediction partition data, and/or inter-prediction partition and coding partition data. As is discussed further below with respect to FIG. 6, in some examples, encoder module 412 may implement an adaptive symbol-run variable length coding technique or an adaptive proxy variable length coding technique for the compression of the intra-prediction partition data and/or inter-prediction partition data portions of video data 412 based on a parameter associated with the intra-prediction partition data and/or inter-prediction partition data (e.g., a fewest number of attainable bits, most efficient encoding technique, a predetermined parameter, characteristics of video data 412, or the like), and encoder module 412 may implement adaptive codebook variable length coding for the slices or regions data portions of video data 412 to generate compressed video data 422 (e.g., compressed partition data), which may be transmitted to bitstream assembler 408 as shown. In some examples, the intra-prediction partition data and/or inter-prediction partition data may include data indicating the partitioning of tiles into partitions, partitions into sub-partitions, or the like. In some examples, the partitions and/or sub-partitions may include prediction partitions and/or sub-partitions. In some examples, partitions and/or sub-partitions may include coding partitions and/or sub-partitions.

Further as shown, in some examples, encoder module 403 may receive modes and reference types data 413, which may include modes (e.g., intra, split, skip, auto, inter, or multi) data and/or references data for each prediction partition. For example, the mode split information may indicate whether a partition is further divided or not. If a partition is further divided, the mode data may further include direction information indicating whether the split is a horizontal split (e.g., hor) or a vertical split (e.g., vert). As is discussed further below with respect to FIG. 6, in some examples, encoder module 403 may implement an adaptive symbol-run variable length coding technique or an adaptive proxy variable length coding technique for separate coding of split/non-split partition information data, separate coding of split/non-split split information data, or prediction reference information data based on a parameter associated with the data (e.g., a fewest number of attainable bits, most efficient encoding technique, a predetermined parameter, characteristics of the pertinent portions of video data 413, or the like), and encoder module 403 may implement adaptive variable length coding for joint coding of modes and split information to generate compressed video data 423 (e.g., compressed modes and reference types data), which may be transmitted to bitstream assembler 408 as shown.

Further, in some examples, encoder module 404 may receive coded/not-coded data 414, which may include coded/not-coded data as discussed herein. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. As is discussed further below with respect to FIG. 6, in some examples, encoder module 404 may implement an adaptive symbol-run variable length coding technique or an adaptive proxy variable length coding technique for coded/not-coded data based on a parameter associated with the coded/not-coded data (e.g., a fewest number of attainable bits, most efficient encoding technique, a predetermined parameter, characteristics of video data 414, or the like) to generate compressed video data 424 (e.g., compressed coded/not-coded data), which may be transmitted to bitstream assembler 408 as shown.

In some examples, encoder module 405 may receive transform data 415, which may include transform coefficient data. For example, for blocks or partitions or sub-partitions that are coded (e.g., have one or more nonzero transform coefficients), transform coefficient data may be received for entropy encoding. As is discussed further with respect to FIG. 6, encoder module 405 may implement adaptive vector variable length coding for blocks or partitions or sub-partitions having a block or partition or sub-partition size of 2 in one dimension (e.g., 2×K partitions or K×2 sized partitions). Further, encoder module 405 may implement adaptive 1-dimensional variable length coding for blocks or partitions or sub-partitions of size 4×4 and adaptive 2-dimensional variable length coding for all other block or partition or sub-partition sizes (e.g., 4×8, 8×4, 8×8, 16×16, 32×32, 64×64, and so on). The generated compressed video data 425 (e.g., compressed transform data) may be transmitted to bitstream assembler 408 as shown.

For example, the transform coefficient data may result from a forward transform of rectangular (or square or the like) partitions of pixel data or rectangular (or square or the like) of pixel difference values implemented via adaptive transform module 108 followed by a quantization of the resulting coefficients via adaptive quantize module 109. In some examples, the transform coefficient data may be scanned to convert it to a 1-dimensional frequency ordered partition via encoder module 405. Such conversion may be highly adaptive any partition size (e.g., 24 or more or 32 or more partition sizes), different data types (e.g., discrete cosine transform coefficients or hybrid parametric Haar transform coefficients or the like of either intra or inter partitions), and/or different quantizer set characteristics (e.g., various combinations of quantizer parameters and/or matrices). Further, a block or partition or sub-partition may belong to different picture types: I-picture (e.g., intra compensation only), P-picture (e.g., predictive) or F-picture (e.g., functional) and/or may represent different types of signal or data (e.g., luma or chroma or the like), which may be quantized with different quantizer setting.

Further, in some examples, encoder module 406 may receive motion data 416, which may include motion vector data. As is discussed further with respect to FIG. 6, motion vector prediction may be performed based on video data 416 to generate one or more predicted motion vectors. A predicted motion vector may be differenced with an original motion data of video data 416 to generate a difference motion vector. In some examples, encoder module 416 may implement an adaptive classified variable length coding for the difference motion vector(s) to generate compressed video data 426 (e.g., compressed motion data), which may be transmitted to bitstream assembler 408 as shown.

Further, in some examples, encoder module 407 may receive intra-prediction data 417, which may include intra-prediction type or intra-prediction direction data. For example, as discussed, intra coding may use prediction, which may use neighboring past decoded partition(s) within the same frame to generate spatial prediction. In such examples, there may be predictors for indicating a past decoded partition or partitions. For example, the predictors may include dc, slope, directional, BTPC, feature matching, or the like. Further, in some examples, the directional predictor may be adaptive for different partition sizes. For example, specifying a directional predictor may include providing an technique for determining angular prediction pixel partition(s) for coding using causal neighboring decoded partitions and/or specifying a technique for entropy coding spatial prediction directions. In some examples, such techniques may be performed via encoder module 407. As is discussed further below with respect to FIG. 6, in some examples, encoder module 407 may implement an adaptive variable length coding technique or an arithmetic coding technique for intra-prediction type or intra-prediction direction data based on a parameter associated with the intra-prediction type or intra-prediction direction data (e.g., a fewest number of attainable bits, most efficient encoding technique, a predetermined parameter, characteristics of video data 417, or the like) to generate compressed video data 427 (e.g., compressed intra-prediction data), which may be transmitted to bitstream assembler 408 as shown.

As shown in FIG. 4, adaptive entropy encoder 110 may include bitstream assembler 408. In some examples, some or all of encoder modules 401-407 may provide entropy coded compressed video data 421-427 at different instances in time. Further, in some examples, one or some of compressed video data 421-427 may be picture based, region or slice based, tile based, prediction partition based, coding partition based, or any combination thereof. In some examples, bitstream assembler may multiplex (the potentially different) compressed video data 421-427 to create a valid bitstream such as, for example, output bitstream 111. For example, the valid bitstream may be a valid next generation video (NGV) coded bitstream, which may following a NGV bitstream syntax specification. In some examples, output bitstream 111 may be a video only bitstream. In some examples, output bitstream 111 may be multiplexed (e.g., Transport or a Media File Format) with uncoded or coded audio to create a multiplexed audio-visual stream. In any event, the bitstream may be used local decode, storage, or transmission to a decoder as discussed herein.

Figure 5:
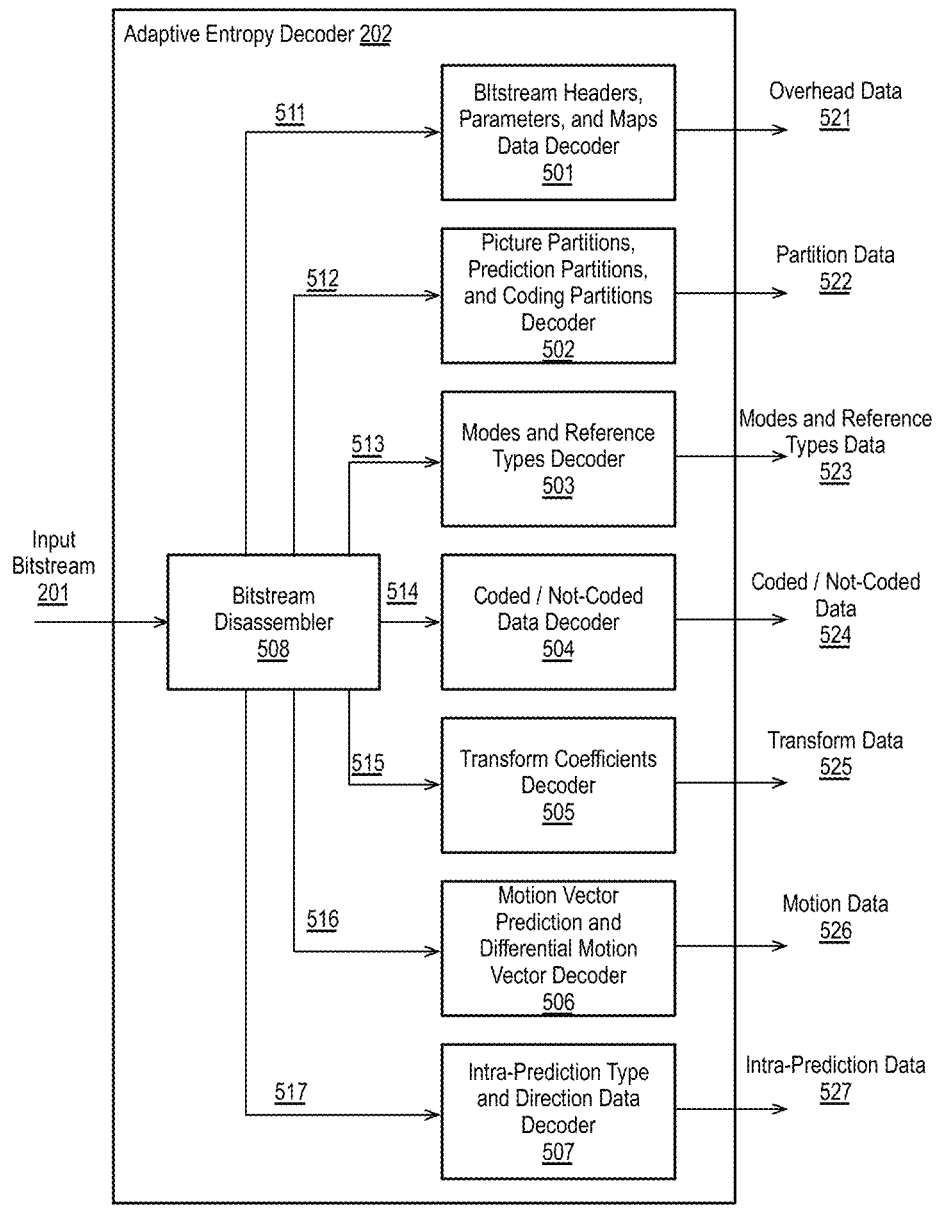
FIG. 5 is an illustrative diagram of an example entropy decoder module.

FIG. 5 is an illustrative diagram of an example entropy decoder module 202, arranged in accordance with at least some implementations of the present disclosure. As shown, entropy decoder module 202 may include bitstream headers, parameters and maps data decoder module 501, picture partitions, prediction partitions, and coding partitions decoder module 502, coding modes and reference types decoder module 503, coded/not-coded data decoder module 504, transform coefficients decoder module 505, motion vector and differential motion vector decoder module 506, intra-prediction and direction data decoder module 507, and/or bitstream disassembler module 508. In the discussion herein, each of modules 501-507 may be shortened to decoder module 501, decoder module 505, or the like for the sake of brevity.

As shown, bitstream disassembler module 508 may receive input bitstream 201. In some examples, input bitstream 201 may be a valid bitstream such as, for example, a valid next generation video (NGV) coded bitstream, which may follow a NGV bitstream syntax specification. In some examples, input bitstream 201 may be a video only bitstream. In some examples, input bitstream 201 may be a multiplexed audio-visual stream as discussed herein. Bitstream disassembler module 508 may disassemble input bitstream 201 to determine compressed video data 511-517 as shown. For example, bitstream disassembler module 508 may use a predefined syntax or specification to divide input bitstream 201 into component compressed video data 511-517 by data type for decompression via decoder modules 501-507. In some examples, bitstream disassembler module 508 may perform an inverse operation with respect to bitstream assembler module 508.

As shown in FIG. 5, decoder modules 501-507 may receive compressed video data 511-517, respectively, and generate video data 521-527. Video data 521-527 may be transmitted to various components of decoder 200 for further decoding as discussed herein. Decoder 200 may thereby generate video frame(s) for presentment to a user via a display device (not shown). In some examples, decoder modules 501-507 may each perform an inverse operation with respect to encoder modules 401-407. In some examples, decoder modules 501-507 may each include one or more specialized component(s) for efficiently entropy decoding the type of data associated with compressed video data 511-517.

For example, decoder module 501 may receive compressed overhead data 511, which may include compressed bitstream header data (e.g., sequence and/or picture level bitstream headers), morphing parameters, synthesizing parameters, or global maps data (e.g., quantizer maps of pictures indicating quantizers to be used on a partition basis). In some examples, decoder module 511 may implement an adaptive symbol-run variable length coding technique, an adaptive proxy variable length coding technique, or a variable length coding table or tables for decompression of compressed overhead data 511 to generate overhead data 521. In some examples, decoder module 501 may determine which coding technique to implement based on a parameter or indicator provided via bitstream 201.

As shown, in some examples, decoder module 502 may receive compressed partition data 512, which may include compressed picture slices or regions data, intra-prediction partition data, and/or inter-prediction partition data. In some examples, decoder module 512 may implement an adaptive symbol-run variable length coding technique or an adaptive proxy variable length coding technique for the decompression of the intra-prediction partition data and/or inter-prediction partition data portions of compressed partition data 512, and decoder module 512 may implement an adaptive codebook variable length coding for the decompression of the slices or regions data portions of compressed partition data 512 to generate partition data 522. In some examples, the intra-prediction partition data and/or inter-prediction partition data may include data indicating the partitioning of tiles into partitions, partitions into sub-partitions, or the like. In some examples, the partitions and/or sub-partitions may include prediction partitions and/or sub-partitions. In some examples, partitions and/or sub-partitions may include coding partitions and/or sub-partitions. In some examples, decoder module 502 may determine which coding technique to implement for the decompression of the intra-prediction partition data and/or inter-prediction partition data portions of compressed video data 512 based on a parameter or indicator provided via bitstream 201.

Further, in some examples, decoder module 503 may receive compressed modes and reference types data 513, which may include compressed modes (e.g., intra, split, skip, auto, inter, or multi) data and/or references data for each prediction partition. For example, the mode split information may indicate whether a partition is further divided or not. If a partition is further divided, the mode data may further include direction information indicating whether the split is a horizontal split (e.g., hor) or a vertical split (e.g., vert). In some examples, decoder module 503 may implement an adaptive symbol-run variable length coding technique or an adaptive proxy variable length coding technique for decompression of separate coding of split/non-split partition information data, separate coding of split/non-split split information data, or prediction reference information data, and decoder module 503 may implement an adaptive variable length coding for decompression of joint coding of modes and split information to generate modes and reference types data 523. In some examples, decoder module 503 may determine which coding technique to implement for decompression of separate coding of split/non-split partition information data, separate coding of split/non-split split information data, or prediction reference information data based on a parameter or indicator provided via bitstream 201.

Further, in some examples, decoder module 504 may receive compressed coded/not-coded data 514, which may include coded/not-coded data as discussed herein. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. In some examples, decoder module 504 may implement an adaptive symbol-run variable length coding technique or an adaptive proxy variable length coding technique for decompression of coded/not-coded data to generate coded/not-coded data 524. In some examples, decoder module 504 may determine which coding technique to implement for decompression based on a parameter or indicator provided via bitstream 201.

As shown, in some examples, decoder module 505 may receive compressed transform data 515, which may include transform coefficient data. For example, for blocks or partitions or sub-partitions that are coded (e.g., have one or more nonzero transform coefficients) compressed transform data 515 may include transform coefficient data. In some examples, decoder module 505 may implement an adaptive vector variable length coding for decompression of blocks or partitions or sub-partitions having a block or partition or sub-partition size of 2 in one dimension (e.g., 2×K partitions or K×2 sized partitions. Further, decoder module 505 may implement an adaptive 1-dimensional variable length coding for decompression of blocks or partitions or sub-partitions of size 4×4 and adaptive 2-dimensional variable length coding for decompression of all other block or partition or sub-partition sizes (e.g., 4×8, 8×4, 8×8, 16×16, 32×32, 64×64, and so on). The generated transform data 525 may be transmitted to other module(s) of decoder 200 as shown.

Further, in some examples, decoder module 506 may receive compressed motion data 516, which may include motion vector data. As is discussed further below with respect to FIG. 6, in some examples, compressed motion data 516 may be decompressed using an adaptive classified variable length coding technique to generate predicted difference motion vectors. The predicted difference motion vectors may be added to motion vector prediction to generate reconstructed motion vectors. The motion vector prediction may be generated based on previously decoded motion vectors of neighboring blocks or partitions using the inverse of the technique implemented via encoder module 506, for example, and/or motion vectors. The reconstructed motion vectors may be transmitted to other module(s) of decoder 200 via motion data 526 as shown.

Further, in some examples, decoder module 507 may receive compressed intra-prediction data 517, which may include intra-prediction type or intra-prediction direction data. For example, as discussed, intra coding may use prediction, which may use neighboring past decoded partition(s) within the same frame to generate spatial prediction. In such examples, there may be predictors for indicating a past decoded partition or partitions. For example, the predictors may include dc, slope, directional, BTPC, feature matching, or the like. Further, in some examples, the directional predictor may be adaptive for different partition sizes. For example, specifying a directional predictor may include providing an technique for determining angular prediction pixel partition(s) for coding using causal neighboring decoded partitions and/or specifying a technique for entropy coding spatial prediction directions. In some examples, decoder module 517 may implement an adaptive variable length coding technique or an arithmetic coding technique for decompression of intra-prediction type or intra-prediction direction data to generate intra-prediction data 527. In some examples, decoder module 507 may determine which coding technique to implement for decompression based on a parameter or indicator provided via bitstream 201.

As discussed above, a variety of entropy coding techniques may be implemented on various data types for lossless compression of video data to generate compressed video data at an entropy encoder and for decompression of the compressed video data to generate duplicate video data at an entropy decoder.

In some examples, an adaptive symbol-run variable length coding technique may be implemented. For example, encoder and decoder modules 401, 501, 402, 502, 403, 503, and/or 404, 504 may implement an adaptive symbol-run variable length coding technique on some or all of the video data or compressed video data received.

In some examples, an adaptive symbol-run variable length coding technique may include coding of relative difference in addresses between non-skipped blocks within a frame in video coding that allows one to determine the number of consecutive skipped blocks. For example, in the context of coded/not-coded data as encoded and decoded via encoder and decoder modules 504, 504, instead of sending one bit (e.g., bit-map) for each block to signal coded/not-coded (e.g., skipped) blocks, encoder module 504, for example, may encode a run of skipped blocks. In such implementations, the longer the run of skipped blocks, the more efficiently the data may be compressed.

Further, several types of adaptivity may be added to adaptive symbol-run variable length coding technique as described herein: adaptivity that may allow for use of multiple tables, adaptivity that may allow for use of either performing this type of coding on original bit map data, inverted bitmap, differential bitmap, or gradient predictive bitmap, or the like. For example, the adaptive symbol-run variable length coding technique may include converting the first video data from bit map data to at least one of an inverted bitmap, a differential bit map, or a gradient predictive bit map before applying adaptive symbol-run variable length coding. For example, adaptive symbol-run variable length coding technique may be used to entropy encode substantially any type of event (e.g., symbol/run combination). Further, symbol/run events may be used to code multi-level (e.g., 0, 1, 2, 3, etc.) or binary (e.g., 0,1) events. In examples where multi-level events are encoded, adaptive symbol-run variable length coding technique may be applied a number of consecutive times, breaking a multi-level map into a number of binary sub-maps, with each previous sub-map, excluded from next level's sub-map, or the like.

In some examples, an adaptive proxy variable length coding technique may be implemented. For example, encoder and decoder modules 401, 501, 402, 502, 403, 503, and/or 404, 504 may implement an adaptive proxy variable length coding technique on some or all of the video data or compressed video data received.

In some examples, an adaptive proxy variable length coding technique may include substitution of original fixed length 1D blocks (e.g., groups) of bits with variable length codes (e.g., patterns of sequence of bits) such that after the replacement the resulting bitstream may be smaller in size. In some examples, at the decoder, the process may be repeated (or inversed) resulting in original intended bitstream. In some examples, the original blocks of bits replaced may be of fixed small sizes (e.g., groups of 2 bits, groups of 3 bits, or groups of 4 bits, or the like). In some examples, the replacement codes may be of small size and variable length in nature. In some examples, the adaptive proxy variable length coding discussed herein may be characterized as Short VLCs (e.g., variable length codes). Further, the adaptive proxy variable length coding technique described herein may be adaptive to content by providing multiple replacement options. In some examples, 1-dimensional blocks/groups of 2 bits may be replaced with 1-3 bit long codes. In some examples, 1-dimensional blocks/groups (or collections of blocks/groups) of 3 bits with codes may be replaced with 1-5 bit long codes. In some examples, the adaptive proxy variable length coding technique may exploit statistical redundancy within a bitstream. In some examples, the adaptive proxy variable length coding technique may provide a compression gain of about 1-1.3. In some examples, adaptive proxy variable length coding technique may offer the advantage of being amenable to application to short sequence of bits.

In some examples, an adaptive block-of-symbols variable length coding technique may be implemented. For example, encoder and decoder modules 405, 505 may implement an adaptive block-of-symbols variable length coding technique on some or all of the video data or compressed video data received.

In some examples, an adaptive block-of-symbols variable length coding technique may include two sub-coding techniques, as will be discussed further with respect to FIG. 7. For example, the adaptive block-of-symbols variable length coding technique may include an adaptive vector variable length coding technique and an adaptive 1D/2D (1-dimensional/2-dimensional) variable length coding technique. In some examples, the adaptive block-of-symbols variable length coding technique may be used to encode blocks of closely related symbols such as blocks of transform coefficients as discussed herein.

In some examples, the adaptive vector variable length coding technique of the adaptive block-of-symbols variable length coding technique may encode relatively small 2D blocks or partitions of symbols by use of a joint single codeword such that coding a block of symbols may result in a VLC (variable length coding) codebook. In some examples, the larger the size of the block or partition, the larger the size of the codebook. In some examples, the adaptive vector variable length coding technique may be applied to block or partition sizes having a size 2 in one dimension (e.g., 2×K or K×2 blocks or partitions). By applying the adaptive vector variable length coding technique to blocks or partitions of such sizes, the size of the VLC codebook may be advantageously limited.

In some examples, the adaptive 1D variable length coding technique of the adaptive block-of-symbols variable length coding technique may be used for coding 4×4 transform coefficient block or partition sizes. is essentially same as the CAVLC coder. This coder is primarily used for coding 4×4. In some examples, the adaptive 1D variable length coding technique may be implemented via a content adaptive variable length coding technique with a number of different VLC Tables used based on the context of the coefficient(s) being coded. For example, based on the context of the coefficient(s) being coded encoder and/or decoder modules 505, 505 may switch VLC Tables.

In some examples, the adaptive 2D variable length coding technique of the adaptive block-of-symbols variable length coding technique may utilize two dimensional properties of a block of symbols to switch based on context between a number of different VCL Tables. In some examples, the adaptive 2D variable length coding technique may be characterized as a CA2DVLC (Content Adaptive 2D Variable Length) coder. In some examples, In some examples, the adaptive 2D variable length coding technique may be used to encode all remaining transform coefficient block or petition sizes besides 2×K, K×2 blocks and 4×4 blocks (e.g., 4×8, 8×4, 8×8, 16×16, 32×32, 64×64, and so on).

Figure 6:
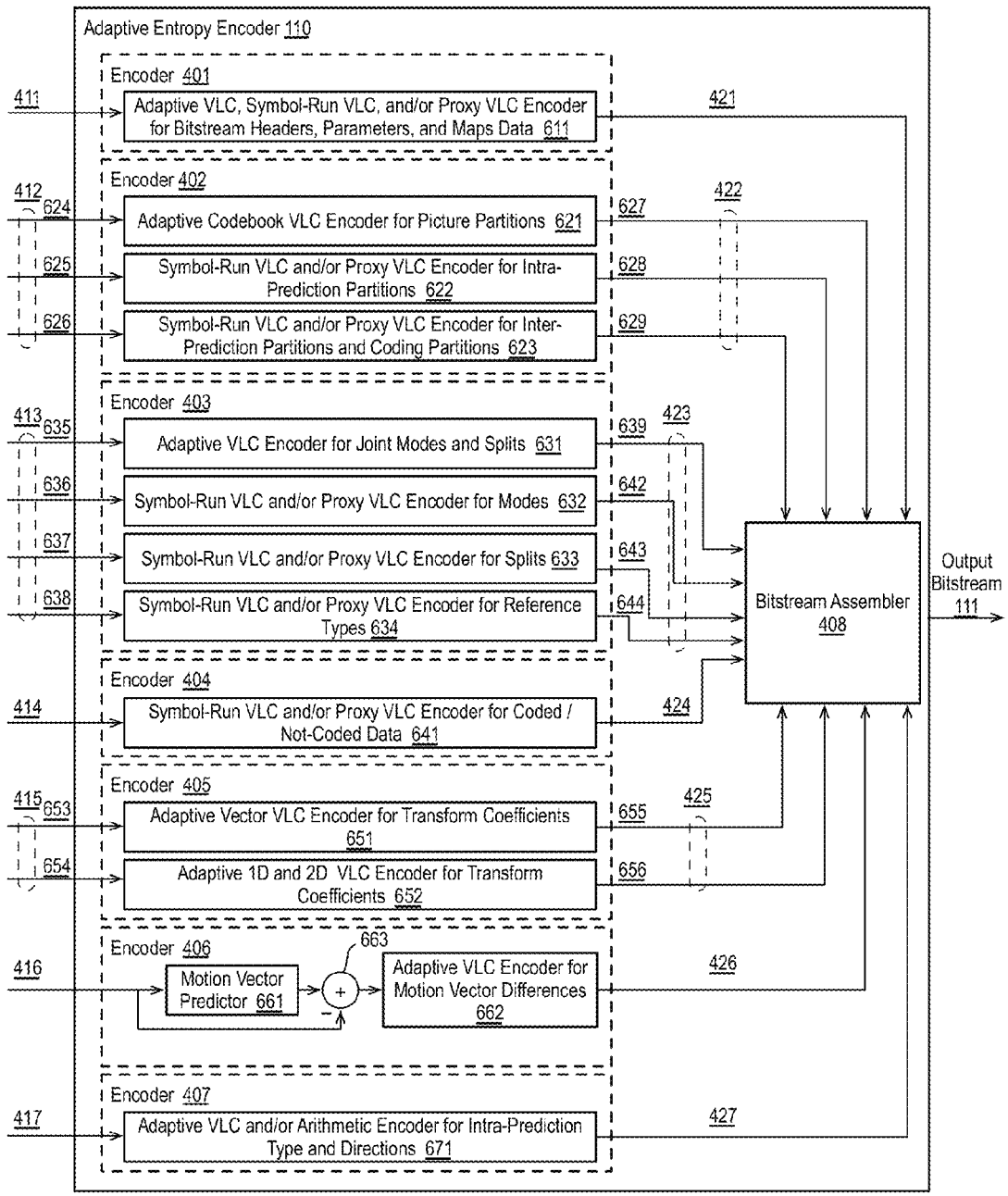
FIG. 6 is an illustrative diagram of an example entropy encoder module.

FIG. 6 is an illustrative diagram of an example entropy encoder module 110, arranged in accordance with at least some implementations of the present disclosure. As shown and as discussed above with respect to FIG. 4, entropy encoder module 110 may include bitstream headers, parameters and maps data encoder module 401, picture partitions, prediction partitions, and coding partitions encoder module 402, coding modes and reference types encoder module 403, coded/not-coded data encoder module 404, transform coefficients encoder module 405, motion vector and differential motion vector encoder module 406, intra-prediction and direction data encoder module 407, and/or bitstream assembler module 408.

As shown, encoder module 401 may include adaptive VLC, symbol-run VLC, and/or proxy VLC encoder for bitstream headers, parameters, and maps data module 611 and may receive video data 411. Video data 411 may have a data type such that video data 411 may include bitstream header data (e.g., sequence and/or picture level bitstream headers), morphing parameters, synthesizing parameters, and/or global maps data (e.g., quantizer maps of pictures indicating quantizers to be used on a partition basis). In some examples, an entropy encoding technique may be determined for video data 411 based on a parameter, parameters or characteristics of video data 411 or other system parameters. In some examples, the entropy encoding technique for video data 411 may be one of an adaptive symbol-run variable length coding technique or an adaptive proxy variable length coding technique, as described above, or a variable length coding table or tables compression technique. The determined entropy encoding technique may be applied to video data 411 to generate compressed video data 421. A variable length coding table or tables compression technique may include a content adaptive variable length coding technique with one or more tables available for coding based on video data 411, for example. In some examples, encoder module 404 may determine which technique provides the greatest compression efficiency (e.g., the fewest bits for compressed video data 421) such that the parameter(s) associated with video data 411 may be the number of bits needed for each coding technique or the like. In some examples, the parameter associated with video data 411 may be based on a characteristic of the video data such that the determined encoding technique may be adaptive to the received video data.

As shown in FIG. 6, encoder module 402 may include adaptive codebook VLC encoder for picture partitions module 621, symbol-run VLC and/or proxy VLC encoder for intra-prediction partitions module 622, and/or symbol-run VLC and/or proxy VLC encoder for inter-prediction partitions and coding partitions module 623. Also as shown, encoder module 402 may receive video data 412. In some examples, video data 412 may include picture slices or regions data 624, intra-prediction partition data 625, and/or inter-prediction and coding partition data 626.

As shown, picture slices or regions data 624 may be received via adaptive codebook VLC encoder for picture partitions module 621, which may apply adaptive codebook variable length coding to picture slices or regions data 624 to generate compressed picture slices or regions data 627. In some examples, picture slices or regions data 624 may include region boundaries for pictures, slices, regions, or the like. In some examples, adaptive codebook variable length coding may include content adaptive variable length coding using an codebook adaptive to the content of picture slices or regions data 624 or other system parameters or the like.

As shown, intra-prediction partition data 625 may be received via symbol-run VLC and/or proxy VLC encoder for intra-prediction partitions module 622. In some examples, an entropy encoding technique may be determined for intra-prediction partition data 625 based on a parameter, parameters or characteristics of intra-prediction partition data 625 or other system parameters (e.g., compression efficiency, a characteristic of the data, and so on), as discussed herein. The determined entropy encoding technique may be applied to intra-prediction partition data 625 to generate compressed intra-prediction partition data 628. As shown, in some examples, the entropy encoding technique for intra-prediction partition data 625 may be one of an adaptive symbol-run variable length coding technique or an adaptive proxy variable length coding technique, as described above. In some examples, intra-prediction partition data 625 may include partitions based on bi-tree partitioning or k-d tree partitioning, or the like.

As shown, inter-prediction and coding partition data 626 may be received via symbol-run VLC and/or proxy VLC encoder for inter-prediction partitions and coding partitions module 623. In some examples, an entropy encoding technique may be determined for or inter-prediction and coding partition data 626 based on a parameter, parameters or characteristics of or inter-prediction and coding partition data 626 or other system parameters (e.g., compression efficiency, a characteristic of the data, and so on), as discussed herein. The determined entropy encoding technique may be applied to or inter-prediction and coding partition data 626 to generate compressed or inter-prediction and coding partition data 629. As shown, in some examples, the entropy encoding technique for or inter-prediction and coding partition data 626 may be one of an adaptive symbol-run variable length coding technique or an adaptive proxy variable length coding technique, as described above. In some examples, or inter-prediction and coding partition data 426 may include inter-partitions and coding tree partitions, or the like.

As shown in FIG. 6, encoder module 403 may include adaptive VLC encoder for joint modes and splits module 631, symbol-run VLC and/or proxy VLC encoder for modes module 632, symbol-run VLC and/or proxy VLC encoder for splits module 633, and/or symbol-run VLC and/or proxy VLC encoder for reference types module 634. Also as shown, encoder module 403 may receive video data 412. In some examples, video data 412 may joint coding of modes and splits data 635, modes information data 636, split/not-split information data 637, and/or prediction reference information data 638.

As shown, joint coding of modes and splits data 635 may be received via adaptive VLC encoder for joint modes and splits module 631, which may apply adaptive variable length coding to joint coding of modes and splits data 635 to generate compressed joint coding of modes and splits data 639. In some examples, adaptive variable length coding may include content adaptive variable length coding adaptive to the content of joint coding of modes and splits data 635 or other system parameters or the like.

As discussed, in some examples, modes and splits data may be coded jointly via adaptive VLC encoder for joint modes and splits module 631. In some examples, modes and splits data may be coded separately via symbol-run VLC and/or proxy VLC encoder for modes module 632 and symbol-run VLC and/or proxy VLC encoder for splits module 633, as is discussed below. In some examples, encoder 100 (via, e.g., adaptive entropy encoder 110 and/or encode controller 103) to code jointly or separately based on results of a comparison of the coding techniques to determine which technique compresses the data most efficiently.

As shown, modes information data 636 may be received via symbol-run VLC and/or proxy VLC encoder for modes module 632. In some examples, an entropy encoding technique may be determined for modes information data 636 based on a parameter, parameters or characteristics of modes information data 636 or other system parameters (e.g., compression efficiency, a characteristic of the data, and so on), as discussed herein. The determined entropy encoding technique may be applied to modes information data 636 to generate compressed modes information data 642. As shown, in some examples, the entropy encoding technique for modes information data 636 may be one of an adaptive symbol-run variable length coding technique or an adaptive proxy variable length coding technique, as described above.

As shown, split/not-split information data 637 may be received via symbol-run VLC and/or proxy VLC encoder for splits module 633. In some examples, an entropy encoding technique may be determined for split/not-split information data 637 based on a parameter, parameters or characteristics of split/not-split information data 637 or other system parameters (e.g., compression efficiency, a characteristic of the data, and so on), as discussed herein. The determined entropy encoding technique may be applied to split/not-split information data 637 to generate compressed split/not-split information data 643. As shown, in some examples, the entropy encoding technique for split/not-split information data 637 may be one of an adaptive symbol-run variable length coding technique or an adaptive proxy variable length coding technique, as described above.

As shown, prediction reference information data 638 may be received via symbol-run VLC and/or proxy VLC encoder for reference types module 634. In some examples, an entropy encoding technique may be determined for prediction reference information data 638 based on a parameter, parameters or characteristics of prediction reference information data 638 or other system parameters (e.g., compression efficiency, a characteristic of the data, and so on), as discussed herein. The determined entropy encoding technique may be applied to prediction reference information data 638 to generate compressed prediction reference information data 644. As shown, in some examples, the entropy encoding technique for prediction reference information data 638 may be one of an adaptive symbol-run variable length coding technique or an adaptive proxy variable length coding technique, as described above.

As shown, encoder module 404 may include symbol-run VLC and/or proxy VLC encoder for coded/not-coded data 641 and may receive video data 414. Video data 414 may have a data type such that video data 411 may coded/not-coded data. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. In some examples, an entropy encoding technique may be determined for video data 414 based on a parameter, parameters or characteristics of video data 414 or other system parameters. In some examples, the entropy encoding technique for video data 414 may be one of an adaptive symbol-run variable length coding technique or an adaptive proxy variable length coding technique, as described above. The determined entropy encoding technique may be applied to video data 414 to generate compressed video data 424. In some examples, encoder module 404 may determine which technique provides the greatest compression efficiency as discussed such that the parameter(s) associated with video data 411 may be the number of bits needed for each coding technique or the like. In some examples, the parameter associated with video data 411 may be based on a characteristic of the video data such that the determined encoding technique may be adaptive to the received video data.

As shown, in some examples, encoder module 405 may include an adaptive vector VLC encoder for transform coefficients module 651 and/or an adaptive 1D and 2D VLC encoder for transform coefficients module 652.

As shown, adaptive vector VLC encoder for transform coefficients module 651 may receive transform coefficients data 653, which may include transform coefficient data for blocks or partitions or sub-partitions having a block or partition or sub-partition size of 2 in one dimension (e.g., 2×K partitions or K×2 sized partitions). An adaptive vector variable length coding technique may be applied to transform coefficients data 653 to generate compressed transform coefficients data 655. In some examples, the adaptive vector variable length coding technique may include a quad-tree division of the block or partition or the, representing each quadrant generated via the quad-tree division with a single vector codeword that represents all coefficients with a single index value, and entropy coding the codeword using a variable length coding technique or the like.

Also as shown, adaptive 1D and 2D VLC encoder for transform coefficients module 652 may receive transform coefficient data 654 and may implement an adaptive 1-dimensional variable length coding for blocks or partitions or sub-partitions of size 4×4 and an adaptive 2-dimensional variable length coding for all other block or partition or sub-partition sizes (e.g., 4×8, 8×4, 8×8, 16×16, 32×32, 64×64, and so on) to generate compressed transform coefficient data 656. As discussed, transform coefficient data 653, 654 may result from a forward transform of rectangular (or square or the like) partitions of pixel data or rectangular (or square or the like) of pixel difference values implemented via adaptive transform module 108 followed by a quantization of the resulting coefficients via adaptive quantize module 109. In some examples, the transform coefficient data may be scanned to convert it to a 1-dimensional frequency ordered partition via encoder module 405. Such conversion may be highly adaptive any partition size (e.g., 24 or more or 32 or more partition sizes), different data types (e.g., discrete cosine transform coefficients or hybrid parametric Haar transform coefficients or the like of either intra or inter partitions), and/or different quantizer set characteristics (e.g., various combinations of quantizer parameters and/or matrices). Further, a block or partition or sub-partition may belong to different picture types: I-picture (e.g., intra compensation only), P-picture (e.g., predictive) or F-picture (e.g., functional) and/or may represent different types of signal or data (e.g., luma or chroma or the like), which may be quantized with different quantizer setting.

As shown, encoder module 406 may include a motion vector predictor module 661, an adaptive VLC encoder for motion vector differences module 662, and/or a differencer 663. As shown, encoder module 406 may receive video data 416, which may include motion vector data, via motion vector predictor module 661. Motion vector predictor module 661 may perform motion vector prediction based on video data 416 (e.g., the motion vector data of video data 516) using original motion vector(s) to generate associated predicted motion vector(s). In some examples, the motion vector prediction may be based on immediate neighbors to left, right, above, or below the motion vector being predicted. In some examples, other spatial neighbors that may share the same or similar characteristics may be used. For example, a number of different types of prediction may be adaptively selected and the selection information may provided to decoder 200 via bitstream 111. Differencer 663 may difference the predicted motion vector(s) and the original motion vector(s) to generate difference motion vector(s) for entropy coding. As shown adaptive VLC encoder for motion vector differences module 662 may apply an adaptive variable length coding technique to the difference motion vector(s) to generate compressed video data 526. In some examples, differential (e.g., difference) motion vectors may have twice the range of original motion vectors. Further $\frac{1}{8}^{th}$ pel precision motion compensation may expand the range of the difference motion vector by a factor of 8. In some examples, to address such expansion, classification of large space(s) into smaller subintervals and indexing of vectors inside the subinterval may be used.

As shown, encoder module 407 may include adaptive VLC and/or arithmetic encoder for intra-prediction and directions data module 671 and may receive video data 417. Video data 517 may have a data type such that video data 417 may include intra-prediction type or intra-prediction direction data. In some examples, an entropy encoding technique may be determined for video data 417 based on a parameter, parameters or characteristics of video data 417 or other system parameters (e.g., compression efficiency or the like) as discussed herein. In some examples, the entropy encoding technique for video data 417 may be one of an adaptive variable length coding technique or an arithmetic coding technique, as described above. The determined entropy encoding technique may be applied to video data 417 to generate compressed video data 427. In some examples, the adaptive variable length coding technique may include a content adaptive variable length coding based on the content of video data 417. In some examples, the arithmetic coding technique may include a content adaptive binary arithmetic coding based on the content of video data 417. In some examples, video data 417 may support 9 or more prediction directions and a variety of prediction types including planar, Binary Tree Predictive Coding (BTPC), or the like.

As shown in FIG. 6 and discussed above with respect to FIG. 4, the output encoder modules 401-407 (via the associated sub-modules) may be input to bitstream assembler 408, which may output a multiplexed bitstream formatted per the bitstream syntax, as discussed above.

Figure 7:
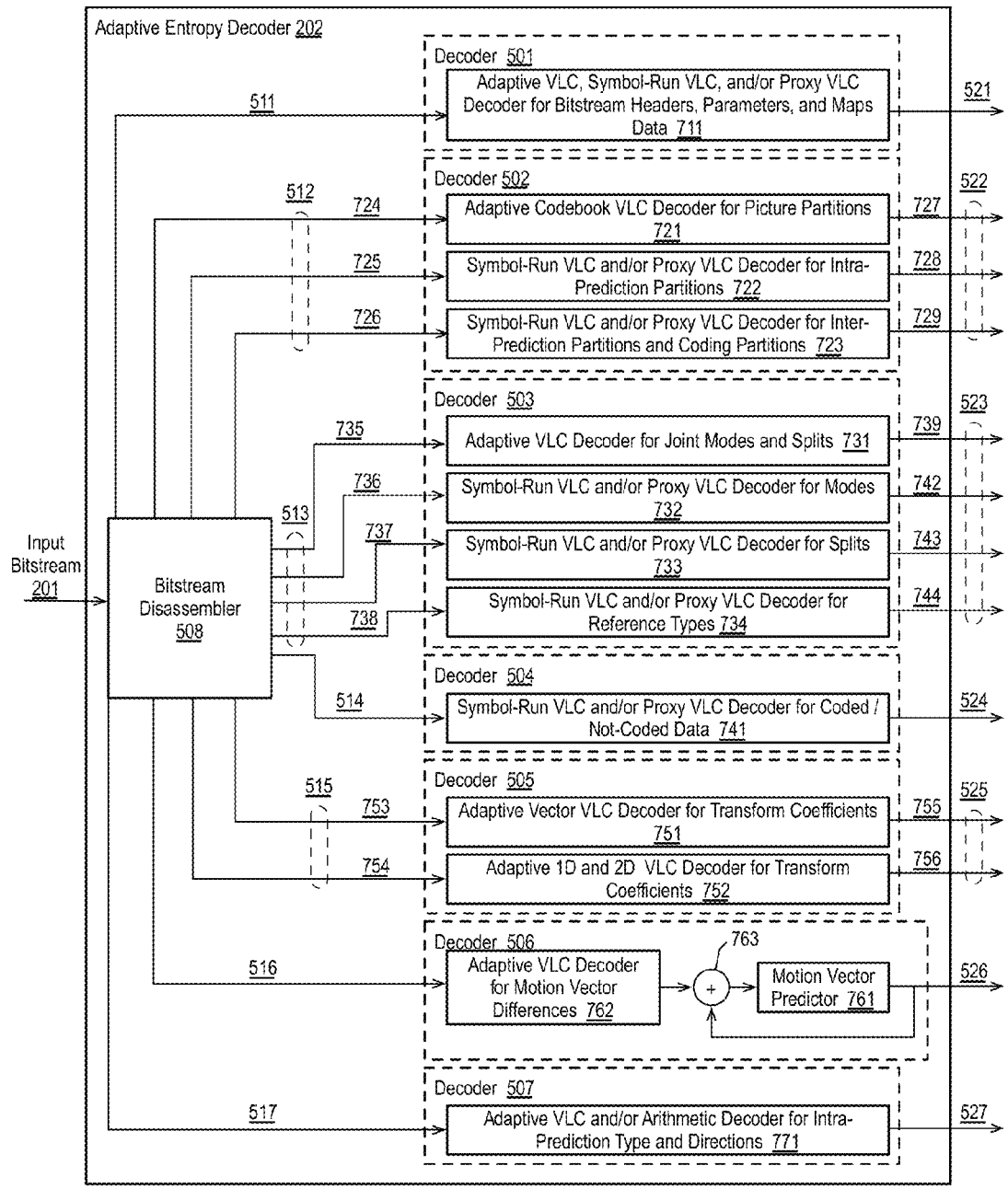
FIG. 7 is an illustrative diagram of an example entropy decoder module.

FIG. 7 is an illustrative diagram of an example entropy decoder module 202, arranged in accordance with at least some implementations of the present disclosure. As shown and as discussed above with respect to FIG. 5, entropy decoder module 202 may include headers, parameters and maps data decoder module 501, picture partitions, prediction partitions, and coding partitions decoder module 502, coding modes and reference types decoder module 503, coded/not-coded data decoder module 504, transform coefficients decoder module 505, motion vector and differential motion vector decoder module 506, intra-prediction and direction data decoder module 507, and/or bitstream disassembler module 508. In some examples, entropy decoder module 202 (and the pertinent sub-modules) may perform an inverse technique with respect to entropy encoder module 110 (and the pertinent sub-modules) such that there may be a one-to-one correspondence between encoder modules (and sub-modules) and decoder modules (and sub-modules)

As shown, bitstream disassembler module 508 may receive input bitstream 201. In some examples, input bitstream 201 may be a valid bitstream such as, for example, a valid next generation video (NGV) coded bitstream, which may follow a NGV bitstream syntax specification or any valid bitstream as discussed herein. As discussed with respect to FIG. 5, bitstream disassembler module 508 may disassemble input bitstream 201 to determine compressed video data 511-517, which may each have one or more component parts as discussed further below. For example, bitstream disassembler module 508 may use a predefined syntax or specification to divide input bitstream 201 into component compressed video data 511-517 by data type for decompression via decoder modules 501-507. In some examples, bitstream disassembler module 508 may perform an inverse operation with respect to bitstream assembler module 308. In some examples, the disassembling of input bitstream 201 may be characterized as a de-multiplexing.

As shown, decoder module 501 may include adaptive VLC, symbol-run VLC, and/or proxy VLC decoder for headers, parameters, and maps data module 711 and may receive compressed video data 511. In some examples, compressed video data 511 may include header data (e.g., sequence and/or picture level bitstream headers), morphing parameters, synthesizing parameters, and/or global maps data entropy encoded using one of an adaptive symbol-run variable length coding technique, an adaptive proxy variable length coding technique, or a variable length coding table or tables compression technique. In some examples, adaptive VLC, symbol-run VLC, and/or proxy VLC decoder for headers, parameters, and maps data module 711 may determine an entropy decoding technique applicable to compressed video data 511 and decode compressed video data 511 using the applicable technique to generate video data 521. In some examples, the applicable technique may be determined based on an indicator, parameter, header data, or the like conveyed via input bitstream 201.

As shown, decoder module 502 may include adaptive codebook VLC decoder for picture partitions module 721, symbol-run VLC and/or proxy VLC decoder for intra-prediction partitions data module 722, and/or symbol-run VLC and/or proxy VLC decoder for inter-prediction partitions and coding partitions data module 723 and may receive compressed video data 512.

As shown, compressed picture slices or regions data 724 may be received via adaptive codebook VLC decoder for picture partitions module 721. In some examples, adaptive codebook VLC decoder for picture partitions module 721 may apply adaptive codebook variable length coding to compressed picture slices or regions data 724 to generate picture slices or regions data 727. As discussed, adaptive codebook variable length coding may include content adaptive variable length coding using an codebook adaptive to the content of compressed picture slices or regions data 724 or other system parameters or the like. In some examples, the codebook may be implemented via adaptive codebook VLC decoder for picture partitions module 721.

As shown, symbol-run VLC and/or proxy VLC decoder for intra-prediction partitions data 722 may receive compressed intra-prediction partition data 725. In some examples, compressed intra-prediction partition data 725 may include compressed intra-prediction partition data entropy encoded using one of an adaptive symbol-run variable length coding technique or an adaptive proxy variable length coding technique, as described herein. In some examples, symbol-run VLC and/or proxy VLC decoder for intra-prediction partitions data 722 may determine an entropy decoding technique applicable to compressed intra-prediction partition data 725 and entropy decode compressed intra-prediction partition data 725 using the applicable technique to generate intra-prediction partition data 728. In some examples, the applicable coding technique may be determined based on an indicator, parameter, header data, or the like conveyed via input bitstream 201.

As shown, symbol-run VLC and/or proxy VLC decoder for inter-prediction partitions and coding partitions data 723 may receive compressed inter-prediction and coding partition data 726. In some examples, compressed inter-prediction and coding partition data 726 may include compressed inter-prediction and coding partition data entropy encoded using one of an adaptive symbol-run variable length coding technique or an adaptive proxy variable length coding technique, as described herein. In some examples, symbol-run VLC and/or proxy VLC decoder for inter-prediction partitions and coding partitions data 723 may determine an entropy decoding technique applicable to compressed inter-prediction and coding partition data 726 and entropy decode compressed inter-prediction and coding partition data 726 using the applicable technique to generate inter-prediction and coding partition data 729. In some examples, the applicable coding technique may be determined based on an indicator, parameter, header data, or the like conveyed via input bitstream 201.

As shown, decoder module 503 may include adaptive VLC decoder for joint modes and splits module 731, symbol-run VLC and/or proxy VLC decoder for modes module 732, symbol-run VLC and/or proxy VLC decoder for splits module 733, and/or symbol-run VLC and/or proxy VLC decoder for reference types module 734 and may receive compressed video data 513.

As discussed above with respect to encoder module 403, in some examples, modes and splits data may be coded jointly and, in some examples, modes and splits data may be coded separately. In some examples, adaptive VLC decoder for joint modes and splits module 731 may decode jointly coded data, and symbol-run VLC and/or proxy VLC decoder for modes module 732 and symbol-run VLC and/or proxy VLC decoder for splits module 733 may decode separately coded data. In some examples, whether data is jointly or separately coded may be indicated via input bitstream 201.

As shown, compressed joint coding of modes and splits data 735 may be received via adaptive VLC decoder for joint modes and splits module 731. In some examples, adaptive VLC decoder for joint modes and splits module 731 may apply adaptive variable length coding to compressed joint coding of modes and splits data 735 to generate joint coding of modes and splits data 739. As discussed, adaptive variable length coding may be content adaptive variable length coding adaptive to the content of compressed joint coding of modes and splits data 735 or other system parameters or the like.

As shown, symbol-run VLC and/or proxy VLC decoder for modes module 732 may receive compressed modes information data 736. In some examples, compressed modes information data 736 may include compressed modes information data entropy encoded using one of an adaptive symbol-run variable length coding technique or an adaptive proxy variable length coding technique, as described herein. In some examples, symbol-run VLC and/or proxy VLC decoder for modes module 732 may determine an entropy decoding technique applicable to compressed modes information data 736 and entropy decode compressed modes information data 736 using the applicable technique to generate modes information data 742. In some examples, the applicable coding technique may be determined based on an indicator, parameter, header data, or the like conveyed via input bitstream 201.

As shown, symbol-run VLC and/or proxy VLC decoder for splits module 733 may receive compressed splits information data 737. In some examples, compressed splits information data 737 may include compressed splits information data entropy encoded using one of an adaptive symbol-run variable length coding technique or an adaptive proxy variable length coding technique, as described herein. In some examples, symbol-run VLC and/or proxy VLC decoder for splits module 733 may determine an entropy decoding technique applicable to compressed splits information data 737 and entropy decode compressed splits information data 737 using the applicable technique to generate splits information data 743. In some examples, the applicable coding technique may be determined based on an indicator, parameter, header data, or the like conveyed via input bitstream 201.

As shown, symbol-run VLC and/or proxy VLC decoder for reference types module 734 may receive compressed reference types information data 738. In some examples, compressed reference types information data 738 may include compressed reference types information data entropy encoded using one of an adaptive symbol-run variable length coding technique or an adaptive proxy variable length coding technique, as described herein. In some examples, symbol-run VLC and/or proxy VLC decoder for reference types module 734 may determine an entropy decoding technique applicable to compressed reference types information data 738 and entropy decode compressed reference types information data 738 using the applicable technique to generate reference types information data 744. In some examples, the applicable coding technique may be determined based on an indicator, parameter, header data, or the like conveyed via input bitstream 201.

As shown, decoder module 504 may include symbol-run VLC and/or proxy VLC decoder for coded/not-coded data module 741 and may receive compressed video data 514. In some examples, compressed video data 514 may include coded/not-coded, as discussed herein, entropy encoded using one of an adaptive symbol-run variable length coding technique or an adaptive proxy variable length coding technique. In some examples, symbol-run VLC and/or proxy VLC decoder for coded/not-coded data module 741 may determine an entropy decoding technique applicable to compressed video data 514 and decode compressed video data 514 using the applicable technique to generate video data 524. In some examples, the applicable technique may be determined based on an indicator, parameter, header data, or the like conveyed via input bitstream 201. In some examples, the applicable technique may be one of an adaptive symbol-run variable length coding technique or an adaptive proxy variable length coding technique.

As shown, decoder module 505 may include adaptive vector VLC decoder for transform coefficients module 751 and/or adaptive 1D and 2D VLC decoder for transform coefficients module 752 and may receive compressed video data 515.

As shown, adaptive vector VLC decoder for transform coefficients module 751 may receive compressed transform coefficients data 753, which may include compressed transform coefficients data for blocks or partitions or sub-partitions having a size of 2 in one dimension (e.g., 2×K partitions or K×2 sized partitions), as discussed herein. In some examples, adaptive vector VLC decoder for transform coefficients module 751 may apply an adaptive vector variable length coding technique to entropy decode compressed transform coefficients data 753 to generate transform coefficients data 755. As discussed, In some examples, the adaptive vector variable length coding technique may include using a variable length codeword to generate all coefficients of a quad-tree division of the block, which may be generated via merging the quad-tree division.

As shown, adaptive 1D and 2D VLC decoder for transform coefficients module 752 may receive compressed transform coefficients data 754, which may include compressed transform coefficients data for blocks or partitions or sub-partitions of size 4×4 and all other block or partition or sub-partition sizes (e.g., 4×8, 8×4, 8×8, 16×16, 32×32, 64×64, and so on). In some examples, adaptive 1D and 2D VLC decoder for transform coefficients module 752 may apply an adaptive 1-dimensional variable length coding for blocks or partitions or sub-partitions of size 4×4 and an adaptive 2-dimensional variable length coding for all other block or partition or sub-partition sizes (e.g., 4×8, 8×4, 8×8, 16×16, 32×32, 64×64, and so on) to entropy decode compressed transform coefficients data 754 to generate transform coefficients data 756.

As shown, decoder module 506 may include an adaptive VLC decoder for motion vector differences module 762, a motion vector predictor 761 and an adder 763, and may receive compressed video data 516. In some examples, adaptive VLC decoder for motion vector differences module 762 may decode compressed video data 516 to generate motion vector differences. Furthermore, motion vector predictor 761 may generate prediction motion vectors using previously decoded neighboring motion vectors in analogy to the techniques discussed with respect to motion vector predictor module 661. As shown, decoded difference motion vector(s) may be added via adder 763 to prediction motion vector(s) to generate reconstructed motion vector(s), which may be output as a part of video data 526 and further used to perform motion vector prediction for other motion vectors via motion vector predictor module 761.

As shown, decoder module 507 may include adaptive VLC and/or arithmetic decoder for intra-prediction type and direction module 771 and may receive compressed video data 517. In some examples, compressed video data 517 may include intra-prediction type and direction data entropy encoded using one of an adaptive VLC technique or an arithmetic coding technique. In some examples, adaptive VLC and/or arithmetic decoder for intra-prediction type and direction module 771 may determine an entropy decoding technique applicable to compressed video data 517 and decode compressed video data 517 using the applicable technique to generate video data 527. In some examples, the applicable technique may be determined based on an indicator, parameter, header data, or the like conveyed via input bitstream 201.

As discussed, video data 521-527 (including various sub-components as discussed) may be transmitted to various components of decoder 200. Further, as discussed, decoder 200 may use entropy decoded video data 521-527 to generate video frames, which may be output, via display video 219, for presentment or display via a display device for a user.

Figure 8:
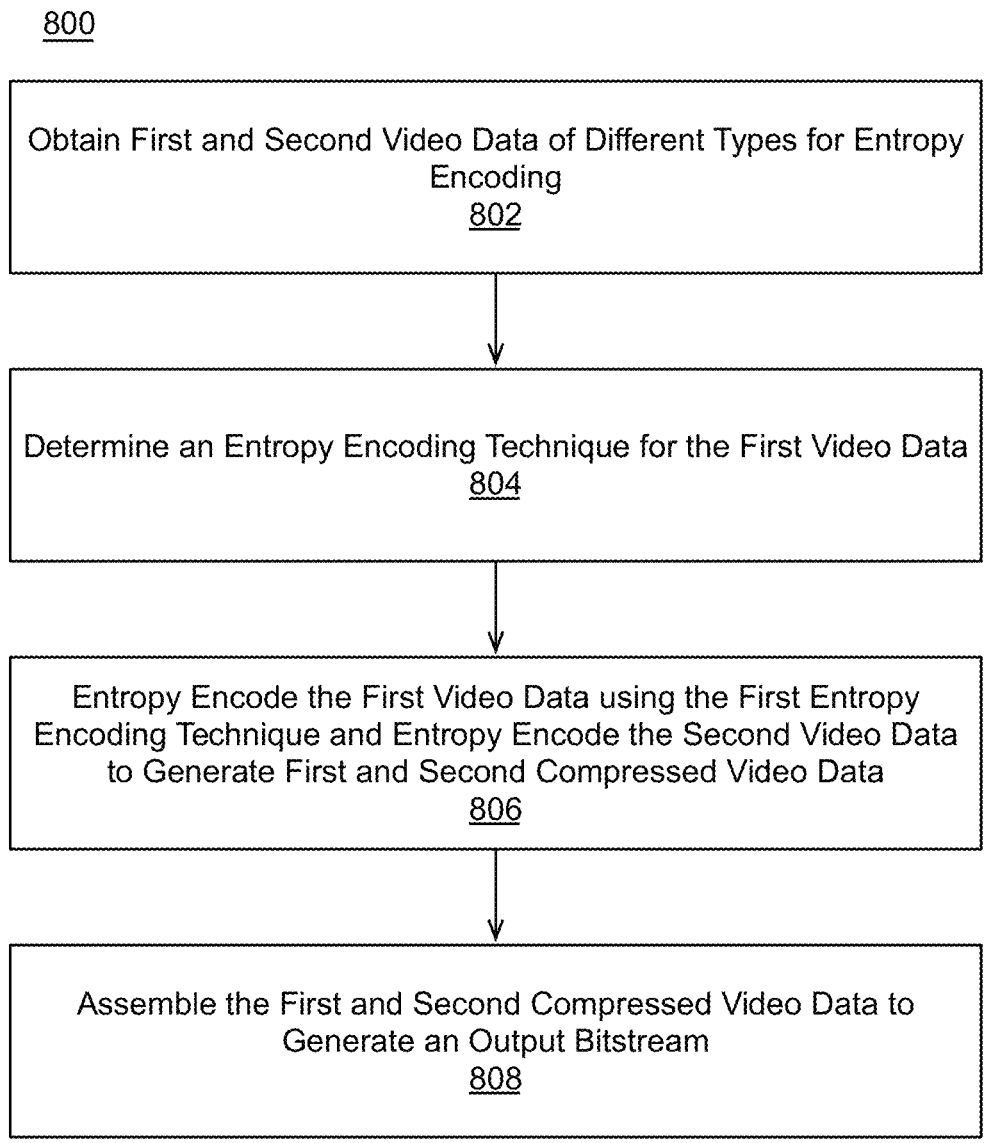
FIG. 8 is a flow diagram illustrating an example process.

FIG. 8 is a flow diagram illustrating an example process 800, arranged in accordance with at least some implementations of the present disclosure. Process 800 may include one or more operations, functions or actions as illustrated by one or more of operations 802, 804, 806, and/or 808. Process 800 may form at least part of a next generation video coding process. By way of non-limiting example, process 800 may form at least part of a next generation video encoding process as undertaken by encoder system 100 of FIG. 1 and/or entropy encoder module 110 of FIG. 5 or 7.

Process 800 may begin at operation 802, "Obtain First and Second Video Data of Different Types for Entropy Encoding", where first and second (or additional) video data of different types may be obtained or received for entropy coding. For example, two or more of video data 411-417 (and/or any sub-components of video data 511-517) may be received. In some examples, video data 411-417 may be received via adaptive entropy encoder 110. As discussed, the first and second (or additional) video data may be of different types such as any of the types or sub-component types as discussed with respect to video data 411-417 or elsewhere herein.

Process 800 may continue at operation 804, "Determine an Entropy Encoding Technique for the First Video Data", where a first entropy encoding technique may be determined for the first video data. As discussed, in some examples, one or more of encoder modules 401-407 may determine a coding technique for video data 411-417 from various coding technique options. For example, encoder module 401 may determine a coding technique for video data 411 from one of an adaptive symbol-run variable length coding technique, an adaptive proxy variable length coding technique, or a variable length coding table or tables compression technique. Further, encoder module 402 may determine a coding technique for intra-prediction partition data 625 of video data 402 from one of an adaptive symbol-run variable length coding technique and an adaptive proxy variable length coding technique, and so on. A wide range of examples have been provided herein with respect to FIGS. 4 and 6 and will not be repeated here for the sake of brevity. As discussed, in some examples, two ore more types of video data may be received. In some examples, an entropy encoding technique may be determined for two, three, or more types of video data as described herein.

As discussed, an entropy encoding technique may be determined for video data. In some examples, a selected coding table associated with the first encoding technique may be determined from two or more available tables. For example, the table selection may be made based on a bit count comparison, a coding efficiency, or the like between the available tables. For example, any of the described entropy encoding techniques discussed herein may have multiple available tables. In some examples, a table indicator may be generated and provided in bitstream 900 indicating the selected table for the video data. For example, bitstream 900 may include indicators indicating the selected encoding technique and the selected coding table. Further an indicator or indicators associated with the length of the video data may be included into bitstream 900. For example, the length or number of tuples in the video data (e.g. the length of the string of video) may be provided and any remainder portion (e.g., if the length is not evenly divided into tuples) may be coded using a bit map technique and provided into the output bitstream.

Process 800 may continue at operation 806, "Entropy Encode the First Video Data using the First Entropy Encoding Technique and Entropy Encode the Second Video Data to Generate First and Second Compressed Video Data", where the first video data may be entropy encoded using the first entropy encoding technique to generate first compressed video data and the second video data may be compressed using a second entropy encoding technique to generate first and second compressed video data.

Process 800 may continue at operation 808, "Assemble the First and Second Compressed Video Data to Generate an Output Bitstream", where the first compressed video data and the second compressed video data may be assembled to generate an output bitstream. For example, bitstream assembler 508 may assemble or multiplex the first compressed video data and the second compressed video data to generate output bitstream 111 as discussed herein.

As discussed, in some examples, output bitstream 111 may be multiplexed with an audio stream (coded or uncoded) to generate a multiplexed audio-visual stream. Further, as discussed, in some examples, one or more of the video data may be preprocessed or otherwise manipulated prior to entropy coding. For example, for motion vector data, motion vector prediction may be performed to generate predicted motion vector(s), the predicted motion vector(s) may be differenced with the original motion vector(s) to generate difference motion vector(s), and the difference motion vector(s) may be entropy coded as discussed herein. Further, in some examples, each of the seven encoder modules 401-407 may be implemented simultaneously to operate on seven types of video data 411-417. Process 800 may be implemented via adaptive entropy encoder module 110 as discussed herein. Further, process 800 may be repeated either in serial or in parallel on any number of instantiations of video data.

As discussed, video data of different types may be entropy coded using a variety of determined (or predetermined) adaptive entropy coding techniques to generate compressed video data. The compressed video data may be assembled to generate an output bitstream.

Figure 9:
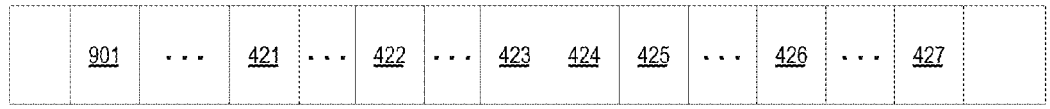
FIG. 9 illustrates an example bitstream.

FIG. 9 illustrates an example bitstream 900, arranged in accordance with at least some implementations of the present disclosure. In some examples, bitstream 900 may correspond to output bitstream 111 as shown in FIGS. 1, 3a, 4, and 6 and/or input bitstream 201 as shown in FIGS. 2, 3b, 5, and 7. Although not shown in FIG. 9 for the sake of clarity of presentation, in some examples bitstream 900 may include a header portion and a data portion. In various examples, bitstream 900 may include data, indicators, index values, mode selection data, or the like associated with encoding compressed video as discussed herein. As shown, in some examples, bitstream 900 may include indicator data 901, compressed video data 421, compressed video data 422, compressed video data 423, compressed video data 424, compressed video data 425, compressed video data 426, and/or compressed video data 427. The illustrated data may be in any order in bitstream 900 and may be adjacent or separated by any other of a variety of additional data for coding video. As discussed, bitstream 900 may also include indicators indicating the selected encoding technique and the selected coding table (e.g., in indicator data 901). Further an indicator or indicators associated with the length of the video data may be included into bitstream 900. For example, the length or number of tuples in the video data (e.g. the length of the string of video) may be provided and any remainder portion (e.g., if the length is not evenly divided into tuples) may be coded using a bit map technique and provided into the output bitstream.

In some examples, compressed video data 421-427 may include any compressed video data encoded via any technique as discussed herein. In some examples, indicator data 901 may include header data, mode indicator data, and/or data indicating entropy encoding techniques associated with compressed video data 421-427. For example, indicator data 901 may indicate an entropy coding technique used for compressing video data 421, an entropy coding technique used for compressing portions of video data 422, an entropy coding technique used for compressing portions of video data 423, an entropy coding technique used for compressing video data 424, and/or an entropy coding technique used for compressing video data 427, as discussed herein with respect to FIGS. 4 and 6.

As discussed, bitstream 900 may be generated by an encoder such as, for example, encoder 100 and/or received by a decoder 200 for decoding such that video frames may be presented via a display device.

Figure 10:
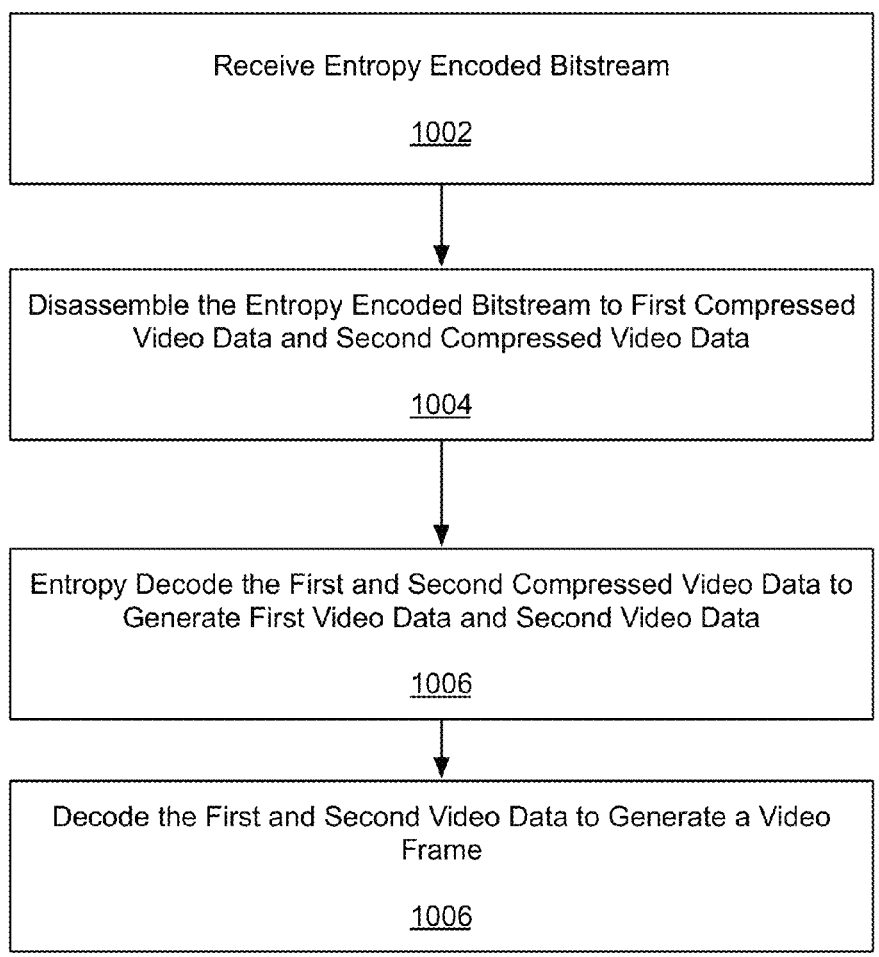
FIG. 10 is a flow diagram illustrating an example process.

FIG. 10 is a flow diagram illustrating an example process 1000, arranged in accordance with at least some implementations of the present disclosure. Process 1000 may include one or more operations, functions or actions as illustrated by one or more of operations 1002, 1004, 1006, and/or 1008. Process 1000 may form at least part of a next generation video coding process. By way of non-limiting example, process 1000 may form at least part of a next generation video decoding process as undertaken by decoder system 200 of FIG. 2.

Process 1000 may begin at operation 1002, "Receive Entropy Encoded Bitstream", where an entropy encoded bitstream may be received. For example, a bitstream encoded as discussed herein may be received at a video decoder. In some examples, bitstream 100 or 900 or the like may be received via decoder 200.

Process 1000 may continue at operation 1004, "Disassemble the Entropy Encoded Bitstream to First Compressed Video Data and Second Compressed Video Data", where the received bitstream may be disassembled to determine different types of compressed video data. For example, bitstream 201 may be disassembled via bitstream disassembler 508 to generate compressed video data 511-517 (and any sub-component video data) as illustrated in FIG. 7. For example, the disassembled compressed video data may include first compressed video and second compressed video data.

Process 1000 may continue at operation 1006, "Entropy Decode the First and Second Compressed Video Data to Generate First Video Data and Second Video Data", where first and second compressed video data may be entropy decoded to generate (decompressed) first and second video data. As discussed, in some examples, one or more of decoder modules 501-507 may determine a coding technique for compressed video data 511-517 from various coding technique options. For example, decoder module 501 may determine a coding technique for compressed video data 511 from one of an adaptive symbol-run variable length coding technique, an adaptive proxy variable length coding technique, or a variable length coding table or tables compression technique based on an indicator or indicators provided via the input bitstream. Further, decoder module 502 may determine a coding technique for compressed intra-prediction partition data 725 of video data 512 from one of an adaptive symbol-run variable length coding technique and an adaptive proxy variable length coding technique, and so on. A wide range of examples have been provided herein with respect to FIGS. 5 and 7 and will not be repeated here for the sake of brevity. As discussed, in some examples, two ore more types of video data may be received. In some examples, an entropy decoding technique may be determined for two, three, or more types of video data as described herein.

Process 1000 may continue at operation 1008, "Decode the First and Second Video Data to Generate a Video Frame", where the first and second video data (and any other entropy decoded video data) may be decoded to generate video frame(s). The video frames may be suitable for presentment to a user via a display device, for example.

As discussed, in some examples, one or more of the entropy decoded video data may be post-processed or otherwise manipulated prior to further decoding. For example, entropy decoded difference motion vector(s) may be added to prediction motion vector(s) to generate reconstructed motion vector(s), which may be output for use in motion vector prediction (e.g., inter-prediction) via decoder 200.

Various components of the systems described herein may be implemented in software, firmware, and/or hardware and/or any combination thereof. For example, various components of encoder 100 or encoder 200 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

Some additional and/or alternative details related to process 800, 1000 and other processes discussed herein may be illustrated in one or more examples of implementations discussed herein and, in particular, with respect to FIG. 11 below.

Figure 11:
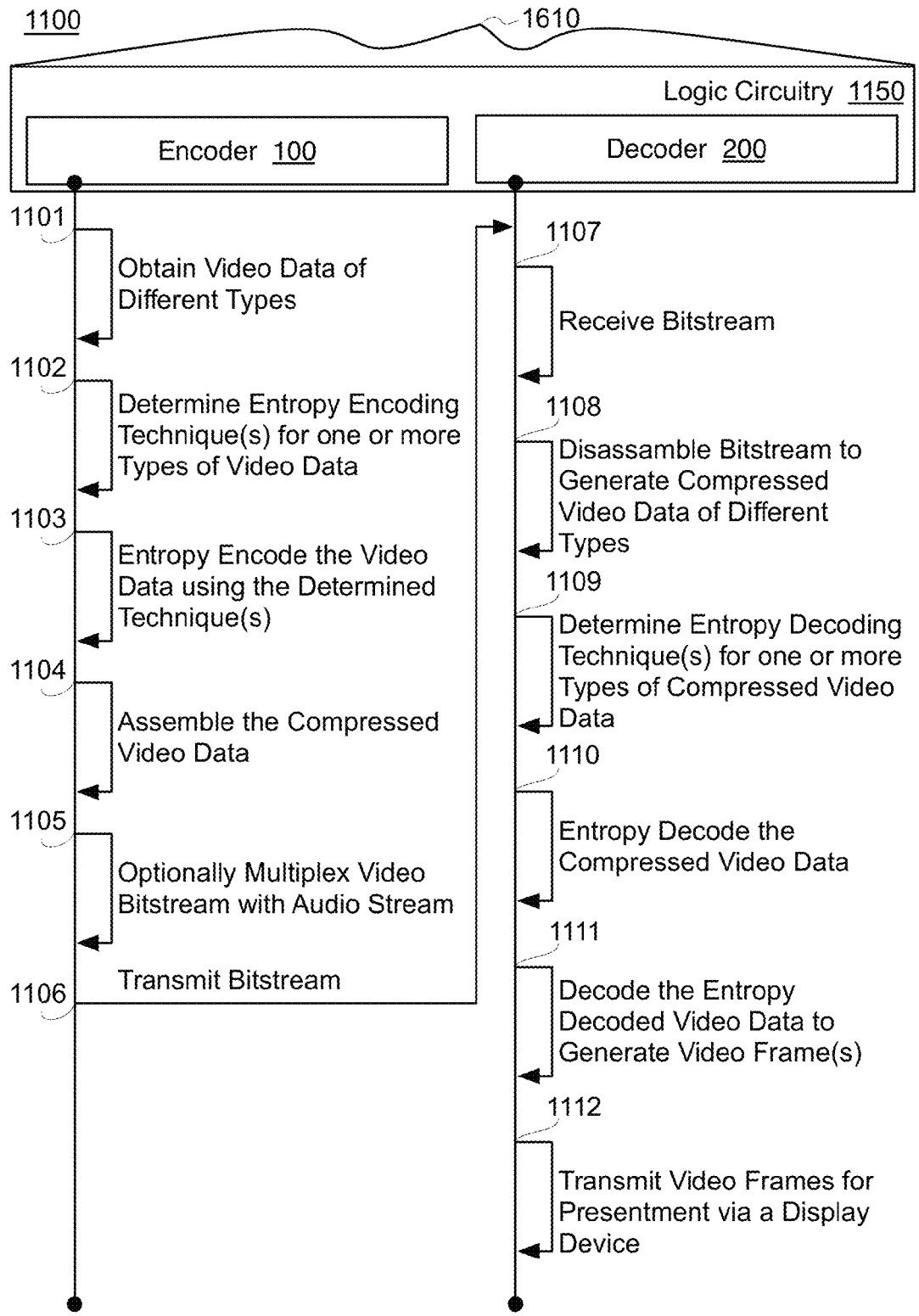
FIG. 11 is an illustrative diagram of an example video coding system and video coding process in operation.

FIG. 11 is an illustrative diagram of an example video coding system 1610 and video coding process 1100 in operation, arranged in accordance with at least some implementations of the present disclosure. In the illustrated implementation, process 1100 may include one or more operations, functions or actions as illustrated by one or more of actions 1100-1112. By way of non-limiting example, process 1100 will be described herein with reference to example video coding system 1610 including encoder 100 of FIG. 1 and decoder 200 of FIG. 2, as is discussed further herein below with respect to FIG. 16. In various examples, process 1100 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

Figure 16:
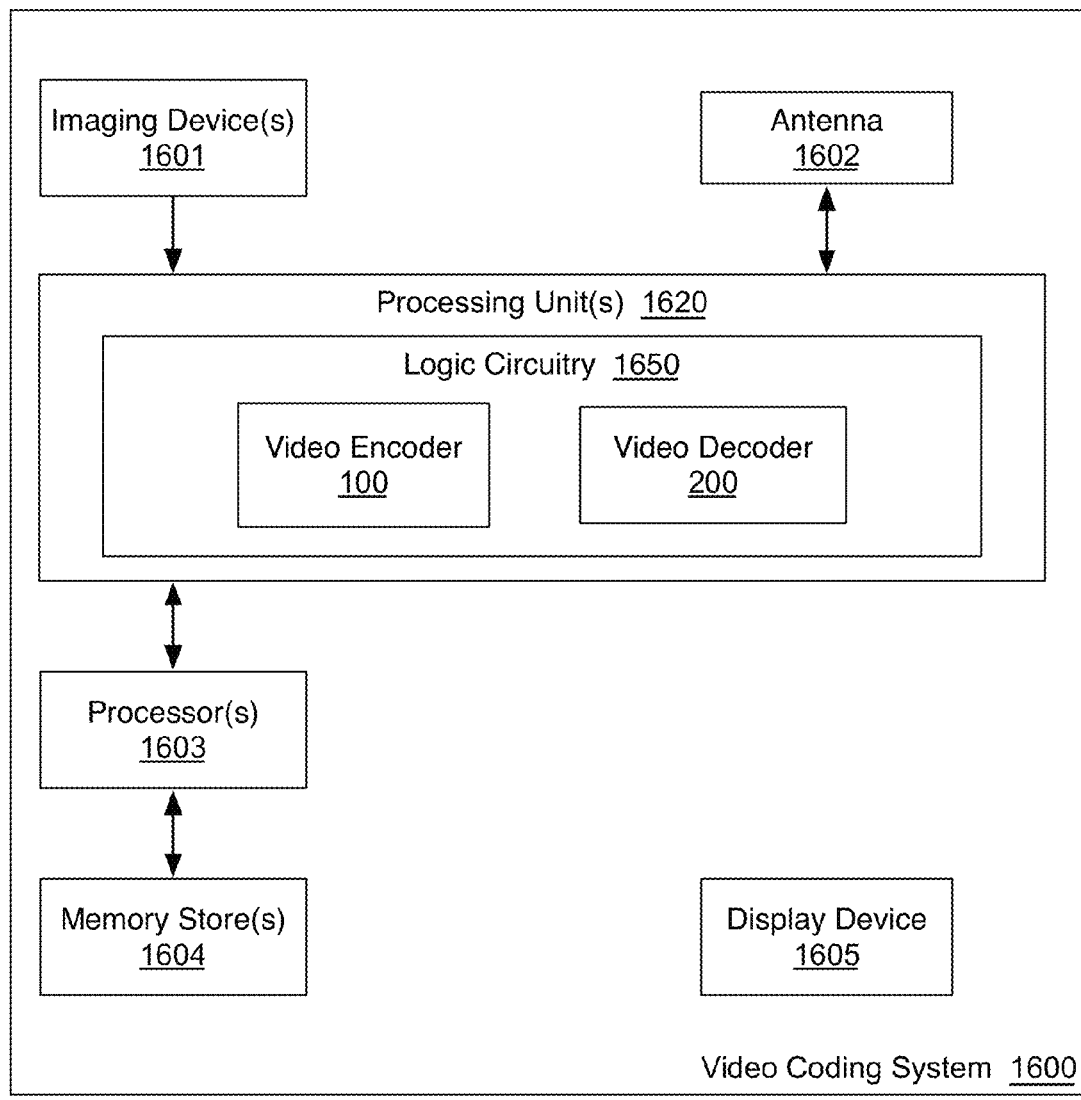
FIG. 16 is an illustrative diagram of an example video coding system.

In the illustrated implementation, video coding system 1610 may include logic circuitry 1150, the like, and/or combinations thereof. For example, logic circuitry 1150, may include encoder 100 and may include any modules as discussed with respect to FIG. 1 and/or FIGS. 3 and 5 and decoder 200 and may include any modules as discussed with respect to FIG. 2 and/or FIGS. 4 and 6. Although video coding system 1610, as shown in FIG. 16, may include one particular set of blocks or actions associated with particular modules, these blocks or actions may be associated with different modules than the particular module illustrated here. Although process 1100, as illustrated, is directed to encoding and decoding, the concepts and/or operations described may be applied to encoding and/or decoding separately, and, more generally, to video coding.

Process 1100 may begin at operation 1101, "Obtain Video Data of Different Types", where video data of different types may be received for entropy encoding. For example two or more types of video data may be received for entropy encoding. For example, two or more of video data 411-417 (and/or any sub-components of video data 411-417) may be received via adaptive entropy encoder 110. As discussed, the first and second (or additional) video data may be of different types such as any of the types or sub-component types as discussed with respect to video data 411-417 or elsewhere herein.

Process 1100 may continue from operation 1101 to operation 1102, "Determine Entropy Encoding Technique(s) for one or more Types of Video Data", where entropy encoding technique(s) may be determined for one or more of the video data types. As discussed, in some examples, one or more of encoder modules 401-407 may determine a coding technique for video data 411-417 from various coding technique options. For example, encoder module 401 may determine a coding technique for video data 411 from one of an adaptive symbol-run variable length coding technique, an adaptive proxy variable length coding technique, or a variable length coding table or tables compression technique. Further, encoder module 402 may determine a coding technique for intra-prediction partition data 625 of video data 402 from one of an adaptive symbol-run variable length coding technique and an adaptive proxy variable length coding technique, and so on as discussed herein.

Process 1100 may continue at operation 1103, "Entropy Encode the Video Data using the Determined Technique(s)", the video data may be entropy encoded using the determined technique(s). For example, first video data may be entropy encoded using a first entropy encoding technique to generate first compressed video data. In some examples, second, third, or more additional video data may be entropy encoded using second, third or more additional entropy encoding techniques as discussed herein to generate first, second, third, and so on respective compressed video data.

Process 1100 may continue from operation 1103 to operation 1104, "Assemble the Compressed Video Data", where the compressed video data of different types may be assembled to generate an output bitstream. For example, bitstream assembler 408 may assemble or multiplex the compressed video data to generate output bitstream 111 as discussed herein.

Process 1100 may continue from operation 1104 to operation 1105, "Optionally Multiplex Video Bitstream with Audio Stream", where the video bitstream may be optionally multiplexed with a coded or uncoded audio stream to generate an audio-visual bitstream.

Process 1100 may continue from operation 1105 or operation 1104 to operation 1106, "Transmit Bitstream", where the bitstream may be transmitted. For example, video coding system 1610 may transmit output bitstream 111 or bitstream 800 or the like via an antenna 1102 (please refer to FIG. 16).

Operations 1101-1106 may provide for video encoding and bitstream transmission techniques, which may be employed by an encoder system as discussed herein. The following operations, operations 1107-1112 may provide for video decoding and video display techniques, which may be employed by a decoder system as discussed herein.

Process 1100 may continue at operation 1107, "Receive Bitstream", where the encoded bitstream may be received. For example, input bitstream 100, 201, or bitstream 800 or the like may be received via decoder 200. In some examples, the bitstream may include different types of entropy encoded data as discussed herein.

Process 1100 may continue from operation 1107 to operation 1108, "Disassamble Bitstream to Generate Compressed Video Data of Different Types", where the received bitstream may be disassembled to determine different types of compressed video data. For example, bitstream 201 may be disassembled via bitstream disassembler 508 to generate compressed video data 511-517 (and any sub-component video data) as illustrated in FIG. 7. For example, the disassembled compressed video data may include first, second, third, or more compressed video data.

Process 1100 may continue from operation 1108 to operation 1109, "Determine Entropy Decoding Technique(s) for one or more Types of Compressed Video Data", entropy decoding technique(s) may be determined for one or more of the compressed video data types. In some examples, the entropy decoding technique(s) may be determined based on a flag or indicator or the like conveyed via the received bitstream. As discussed, in some examples, one or more of decoder modules 501-507 may determine a coding technique for compressed video data 511-517 from various coding technique options. For example, decoder module 401 may determine a coding technique for compressed video data 511 from one of an adaptive symbol-run variable length coding technique, an adaptive proxy variable length coding technique, or a variable length coding table or tables compression technique based on an indicator or indicators provided via the input bitstream. Further, decoder module 502 may determine a coding technique for compressed intra-prediction partition data 725 of video data 512 from one of an adaptive symbol-run variable length coding technique and an adaptive proxy variable length coding technique, and so on. A wide range of examples have been provided herein and will not be repeated here for the sake of brevity. As discussed, in some examples, two ore more types of video data may be received. In some examples, an entropy decoding technique may be determined for two, three, or more types of video data as described herein.

Process 1100 may continue from operation 1109 to operation 1610, "Entropy Decode the Compressed Video Data", where the compressed video data may be entropy decoded based on the determined entropy decoding techniques. For example, compressed video data 511-517 may be entropy decoded via decode modules 501-507.

Process 1100 may continue from operation 1610 to operation 1111, "Decode the Entropy Decoded Video Data to Generate Video Frame(s)", where the first and second video data (and any other entropy decoded video data) may be decoded to generate video frame(s). The video frames may be suitable for presentment to a user via a display device, for example. For example, the video frame may be determined based on the implementation of decode techniques discussed with respect to decoder 200.

Process 1100 may continue from operation 1111 to operation 1112, "Transmit Video Frames for Presentment via a Display Device", where generated video frame(s) may be transmitted for presentment via a display device. For example, the video frame(s) may be transmitted to a display device 1105 (as shown in FIG. 16) for presentment. In some examples, display device 1105 may display the video frames to a user, for example.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

Figure 12:
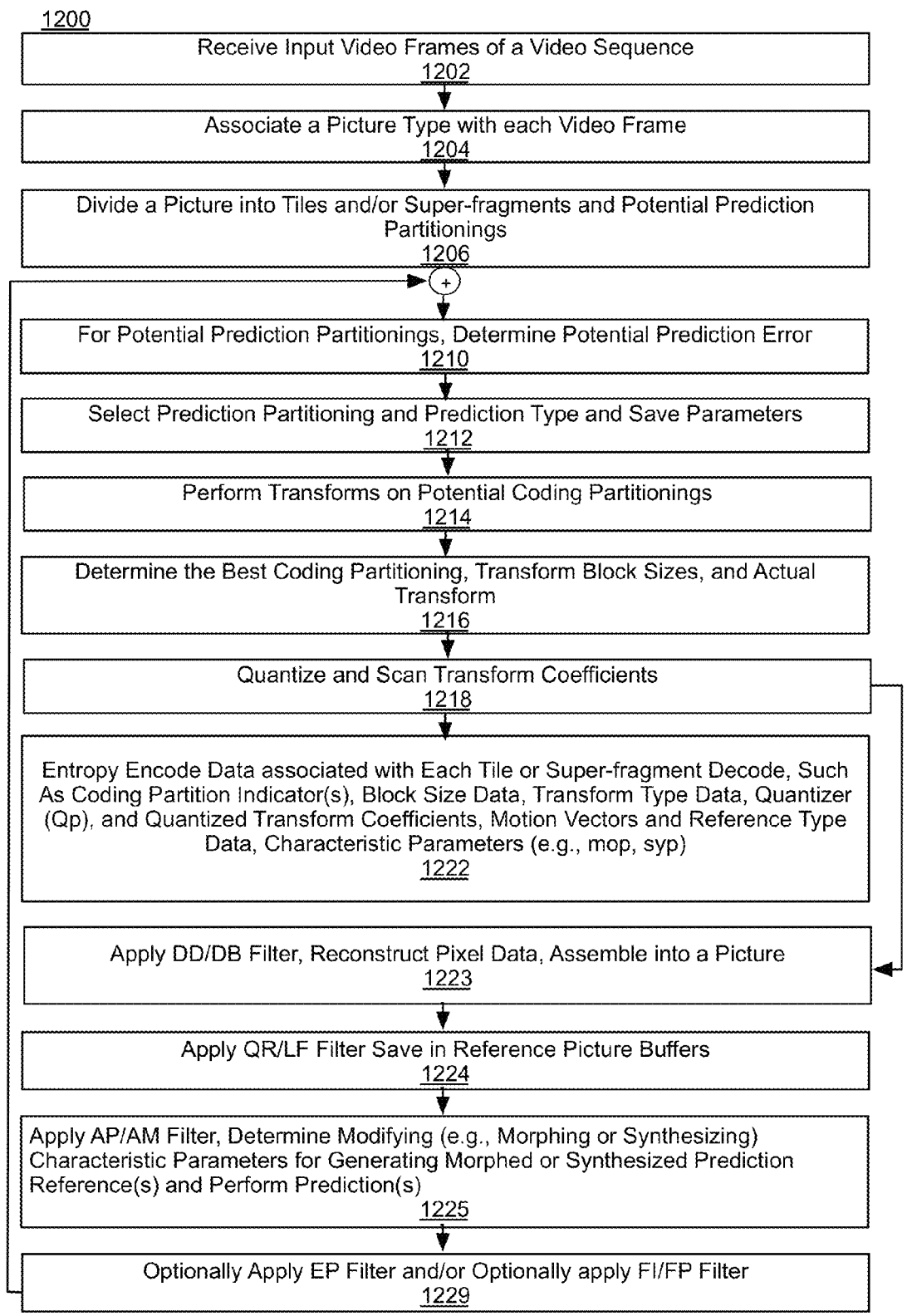
FIG. 12 is a flow diagram illustrating an example encoding process.

FIG. 12 is a flow diagram illustrating an example process 1200, arranged in accordance with at least some implementations of the present disclosure. Process 1200 may include one or more operations, functions or actions as illustrated by one or more operations. Process 1200 may form at least part of a next generation video coding process. By way of non-limiting example, process 1200 may form at least part of a next generation video encoding process as undertaken by encoder system 100 of FIG. 1 and/or any other encoder system or subsystems described herein.

Process 1200 may begin at operation 1202, "Receive Input Video Frames of a Video Sequence", where input video frames of a video sequence may be received via encoder 100 for example.

Process 1200 may continue at operation 1204, "Associate a Picture Type with each Video Frame", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1203 through 1211) may be performed on a frame or picture of a group of pictures and the processing may be repeated for all frames or pictures of a group and then repeated for all groups of pictures in a video sequence.

Process 1200 may continue at operation 1206, "Divide a Picture into Tiles and/or Super-fragments and Potential Prediction Partitionings", where a picture may be divided into tiles or super-fragments and potential prediction partitions via prediction partitions generator 105 for example.

Process 1200 may continue at operation 1210, "For Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1200 may continue at operation 1212, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 1200 may continue at operation 1214, "Perform Transforms on Potential Coding Partitionings", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1200 may continue at operation 1216, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1200 may continue at operation 1218, "Quantize and Scan Transform Coefficients", where transform coefficients associated with coding partitions (and/or transform blocks) may be quantized and scanned in preparation for entropy coding.

Process 1200 may continue at operation 1222, "Entropy Encode Data associated with Each Tile or Super-fragment Decode, Such As Coding Partition Indicator(s), Block Size Data, Transform Type Data, Quantizer (Qp), and Quantized Transform Coefficients, Motion Vectors and Reference Type Data, Characteristic Parameters (e.g., mop, syp)", where data may be entropy encoded. For example, the entropy encoded data may include the coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 1200 may continue at operation 1223 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 1200 may continue at operation 1224 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1200 may continue at operation 1225, "Apply AP/AM Filter, Determine Modifying (e.g., Morphing or Synthesizing) Characteristic Parameters for Generating Morphed or Synthesized Prediction Reference(s) and Perform Prediction(s)", where, modifying (e.g., morphing or synthesizing) characteristic parameters and prediction(s) may be performed and adaptive motion filtering or adaptive precision filtering (e.g., AP/AM Filter) may be applied. For example, modifying (e.g., morphing or synthesizing) characteristic parameters for generating morphed or synthesized prediction reference(s) may be generated and prediction(s) may be performed. Additionally, adaptive motion filtering or adaptive precision filtering may be applied at this point in the process.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to nine reference types may be supported in P-pictures, and up to ten reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 1212) may include a frame reference, morphing parameters, or synthesizing parameters associated with the prediction partition.

Process 1200 may continue at operation 1229 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Operations 1202 through 1229 may provide for video encoding and bitstream transmission techniques, which may be employed by an encoder system as discussed herein.

Figures 13, 14:
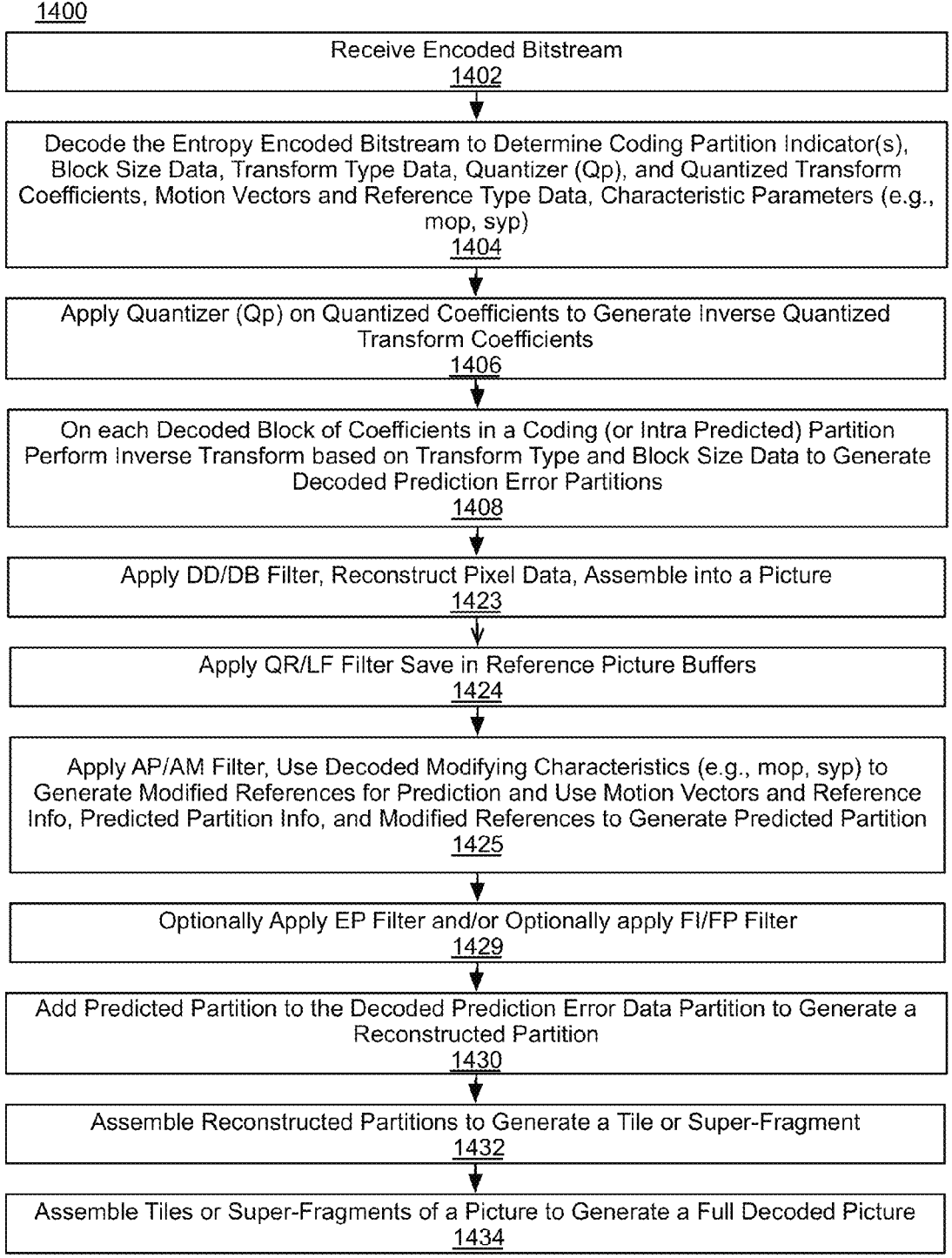
FIG. 13 illustrates an example bitstream.
FIG. 14 is a flow diagram illustrating an example decoding process.

FIG. 13 illustrates an example bitstream 1300, arranged in accordance with at least some implementations of the present disclosure. In some examples, bitstream 1300 may correspond to output bitstream 111 as shown in FIG. 1 and/or input bitstream 201 as shown in FIG. 2. Although not shown in FIG. 29 for the sake of clarity of presentation, in some examples bitstream 1300 may include a header portion and a data portion. In various examples, bitstream 1300 may include data, indicators, index values, mode selection data, or the like associated with encoding a video frame as discussed herein.

As discussed, bitstream 1300 may be generated by an encoder such as, for example, encoder 100 and/or received by a decoder 200 for decoding such that decoded video frames may be presented via a display device.

FIG. 14 is a flow diagram illustrating an example process 1400, arranged in accordance with at least some implementations of the present disclosure. Process 1400 may include one or more operations, functions or actions as illustrated by one or more operations. Process 1400 may form at least part of a next generation video coding process. By way of non-limiting example, process 1400 may form at least part of a next generation video decoding process as undertaken by decoder system 200 and/or any other decoder system or subsystems described herein.

Process 1400 may begin at operation 1402, "Receive Encoded Bitstream", where a bitstream may be received. For example, a bitstream encoded as discussed herein may be received at a video decoder. In some examples, bitstream 900 or 1300 may be received via decoder 200.

Process 1400 may continue at operation 1404, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where the bitstream may be decoded to determine coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 1400 may continue at operation 1406, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 1406 may be applied via adaptive inverse quantize module 203.

Process 1400 may continue at operation 1408, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 1400 may continue at operation 1423 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 1400 may continue at operation 1424 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1400 may continue at operation 1425, "Apply AP/AM Filter, Use Decoded Modifying Characteristics (e.g., mop, syp) to Generate Modified References for Prediction and Use Motion Vectors and Reference Info, Predicted Partition Info, and Modified References to Generate Predicted Partition", where modified references for prediction may be generated and predicted partitions may be generated as well, and where adaptive motion filtering or adaptive precision filtering (e.g., AP/AM Filter) may be applied. For example, where modified references for prediction may be generated based at least in part on decoded modifying characteristics (e.g., mop, syp) and predicted partitions may be generated based at least in part on motion vectors and reference information, predicted partition information, and modified references. Additionally, adaptive motion filtering or adaptive precision filtering may be applied at this point in the process.

Process 1400 may continue at operation 1429 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 1400 may continue at operation 1430, "Add Prediction Partition to the Decoded Prediction Error Data Partition to Generate a Reconstructed Partition", where a prediction partition my be added to the decoded prediction error data partition to generate a reconstructed prediction partition. For example, the decoded prediction error data partition may be added to the associated prediction partition via adder 206.

Process 1400 may continue at operation 1432, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 1400 may continue at operation 1434, "Assemble Tiles or Super-Fragments of a Picture to Generate a Full Decoded Picture", where the tiles or super-fragments of a picture may be assembled to generate a full decoded picture. For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

Figure 15A:
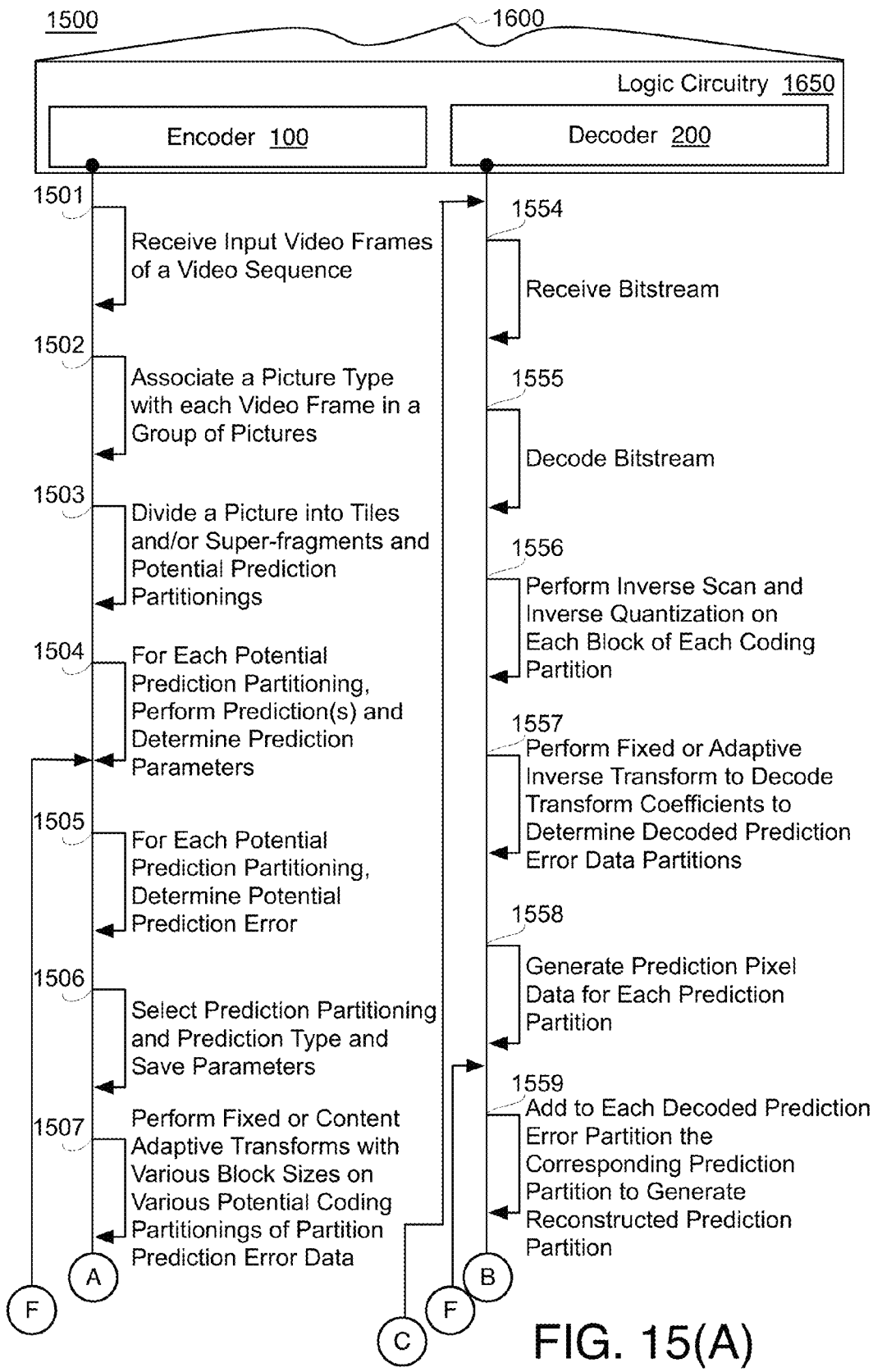
FIGS. 15(A), 15(B), and 15(C) provide an illustrative diagram of an example video coding system and video coding process in operation.
Figure 15B:
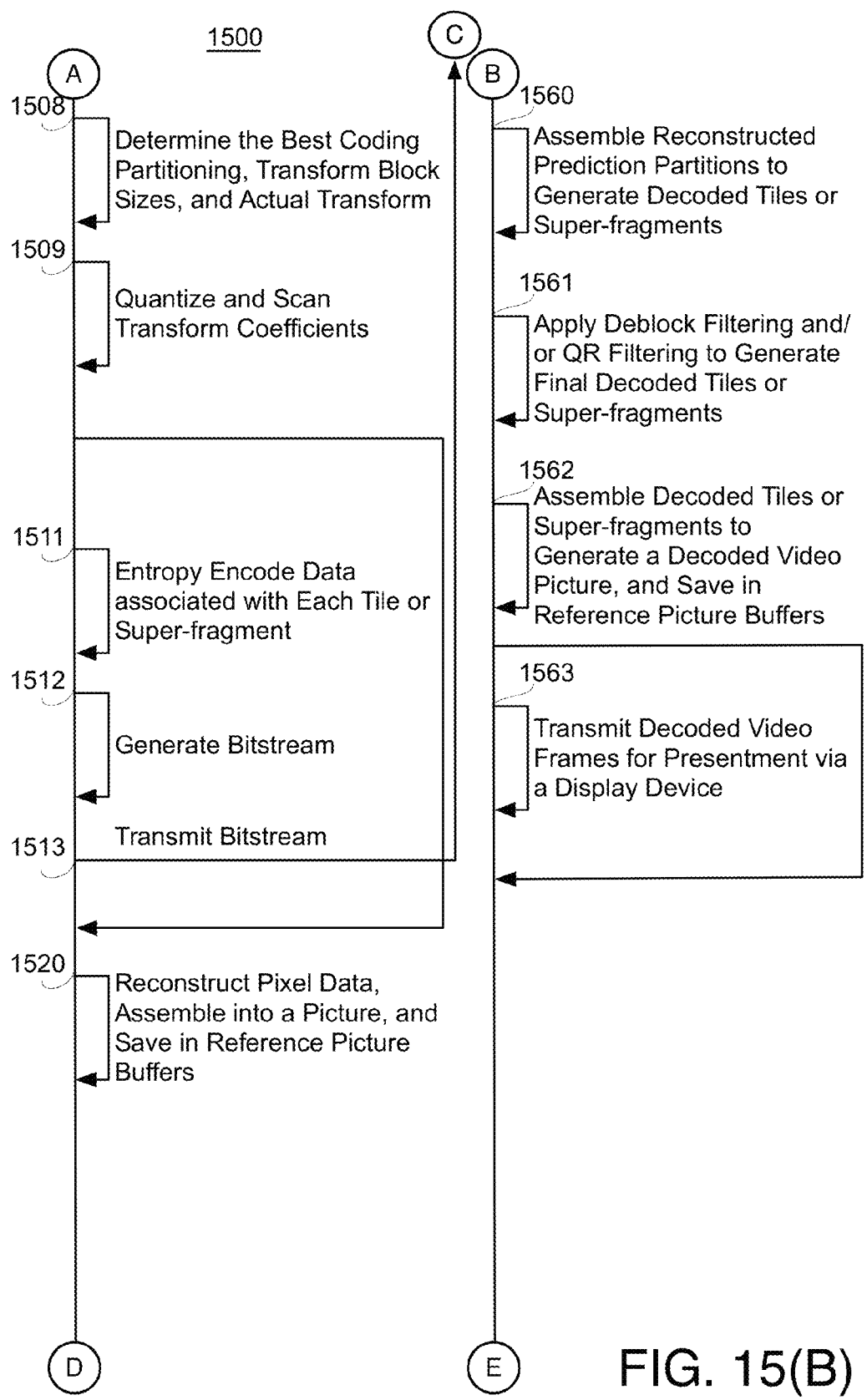
Figure 15C:
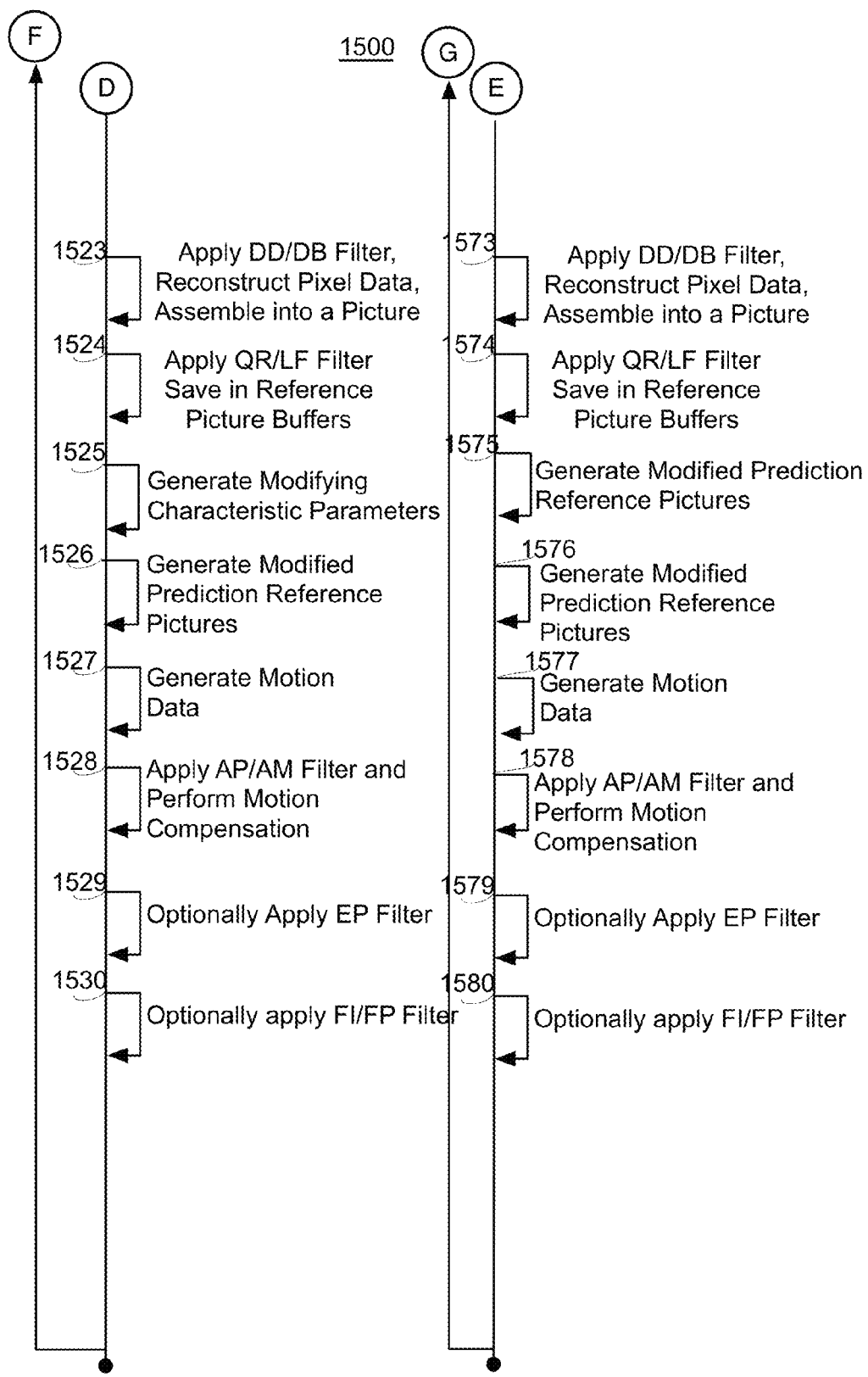

FIGS. 15(A), 15(B), and 15(C) provide an illustrative diagram of an example video coding system 1600 and video coding process 1500 in operation, arranged in accordance with at least some implementations of the present disclosure. In the illustrated implementation, process 1500 may include one or more operations, functions or actions as illustrated by one or more of actions 1501 through 1580. By way of non-limiting example, process 1500 will be described herein with reference to example video coding system 1600 including encoder 100 of FIG. 1 and decoder 200 of FIG. 2, as is discussed further herein below with respect to FIG. 16. In various examples, process 1500 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 1600 may include logic circuitry 1650, the like, and/or combinations thereof. For example, logic circuitry 1650 may include encoder system 100 of FIG. 1 and/or decoder system 200 of FIG. 2 and may include any modules as discussed with respect to any of the encoder systems or subsystems described herein and/or decoder systems or subsystems described herein. Although video coding system 1600, as shown in FIGS. 15(A)-(C) may include one particular set of blocks or actions associated with particular modules, these blocks or actions may be associated with different modules than the particular modules illustrated here. Although process 1500, as illustrated, is directed to encoding and decoding, the concepts and/or operations described may be applied to encoding and/or decoding separately, and, more generally, to video coding.

Process 1500 may begin at operation 1501, "Receive Input Video Frames of a Video Sequence", where input video frames of a video sequence may be received via encoder 100 for example.

Process 1500 may continue at operation 1502, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1503 through 1511) may be performed on a frame or picture of a group of pictures and the processing may be repeated for all frames or pictures of a group and then repeated for all groups of pictures in a video sequence.

Process 1500 may continue at operation 1503, "Divide a Picture into Tiles and/or Super-fragments and Potential Prediction Partitionings", where a picture may be divided into tiles or super-fragments and potential prediction partitions via prediction partitions generator 105 for example.

Process 1500 may continue at operation 1504, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 1512) may include a frame reference, morphing parameters, or synthesizing parameters associated with the prediction partition.

Process 1500 may continue at operation 1505, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1500 may continue at operation 1506, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 1500 may continue at operation 1507, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1500 may continue at operation 1508, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1500 may continue at operation 1509, "Quantize and Scan Transform Coefficients", where transform coefficients associated with coding partitions (and/or transform blocks) may be quantized and scanned in preparation for entropy coding.

Process 1500 may continue at operation 1511, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 1500 may continue at operation 1512, "Generate Bitstream" where a bitstream may be generated based on the entropy encoded data. As discussed, in some examples, the bitstream may include a frame or picture reference, morphing parameters, or synthesizing parameters associated with a prediction partition.

Process 1500 may continue at operation 1513, "Transmit Bitstream", where the bitstream may be transmitted. For example, video coding system 2400 may transmit output bitstream 111, bitstream 2100, or the like via an antenna 2402 (please refer to FIG. 34).

Process 1500 may continue at operation 1520, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 1500 may continue at operation 1523 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 1500 may continue at operation 1524 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1500 may continue at operation 1525, "Generate Modifying Characteristic Parameters", where, modified characteristic parameters may be generated. For example, a second modified prediction reference picture and second modifying characteristic parameters associated with the second modified prediction reference picture may be generated based at least in part on the second decoded prediction reference picture, where the second modified reference picture may be of a different type than the first modified reference picture.

Process 1500 may continue at operation 1526, "Generate Modified Prediction Reference Pictures", where modified prediction reference pictures may be generated, for example, a first modified prediction reference picture and first modifying characteristic parameters associated with the first modified prediction reference picture may be generated based at least in part on the first decoded prediction reference picture.

Process 1500 may continue at operation 1527, "Generate Motion Data", where, motion estimation data may be generated. For example, motion data associated with a prediction partition of a current picture may be generated based at least in part on one of the first modified prediction reference picture or the second modified prediction reference picture.

Process 1500 may continue at operation 1528, "Apply AP/AM Filter Perform Motion Compensation", where, motion compensation may be performed. For example, motion compensation may be performed based at least in part on the motion data and at least one of the first modified prediction reference picture or the second modified prediction reference picture to generate prediction partition data for the prediction partition and adaptive motion filtering or adaptive precision filtering (e.g., AP/AM Filter) may be applied. Process 1500 may feed this information back to operation 1504 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 1500 may continue at operation 1529 "Optionally Apply EP", where enhanced predicted partition (e.g., EP Filtering) may be optionally applied. In some examples, where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Process 1500 may continue at operation 1530 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Operations 1501 through 1530 may provide for video encoding and bitstream transmission techniques, which may be employed by an encoder system as discussed herein. The following operations, operations 1554 through 1568 may provide for video decoding and video display techniques, which may be employed by a decoder system as discussed herein.

Process 1500 may continue at operation 1554, "Receive Bitstream", where the bitstream may be received. For example, input bitstream 201, bitstream 2100, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 1500 may continue at operation 1555, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 1500 may continue at operation 1556, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 1500 may continue at operation 1557, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 1500 may continue at operation 1558, "Generate Prediction Pixel Data for Each Prediction Partition", where prediction pixel data may be generated for each prediction partition. For example, prediction pixel data may be generated using the selected prediction type (e.g., based on characteristics and motion, or intra-, or other types) and associated prediction parameters.

Process 1500 may continue at operation 1559, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 1500 may continue at operation 1560, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 1500 may continue at operation 1561, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 1500 may continue at operation 1562, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Process 1500 may continue at operation 1563, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 2405 (as shown in FIG. 34) for presentment.

Process 1500 may continue at operation 1573 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 1500 may continue at operation 1574 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in a picture buffer as a reference picture for prediction of other (e.g., following) pictures.

Process 1500 may continue at operation 1576, "Generate Modified Prediction Reference Pictures", where modified prediction reference pictures may be generated, for example, at least a portion of a third modified prediction reference picture may be generated based at least in part on the third modifying characteristic parameters. Similarly, at least a portion a fourth modified prediction reference picture may be generated based at least in part on the second modifying characteristic parameters associated.

Process 1500 may continue at operation 1577, "Generate Motion Data", where, motion estimation data may be generated. For example, motion data associated with a prediction partition of a current picture may be generated based at least in part on one of the third modified prediction reference picture or the third modified prediction reference picture.

Process 1500 may continue at operation 1578, "Apply AP/AM Filter and Perform Motion Compensation", where, motion compensation may be performed and where adaptive motion filtering or adaptive precision filtering (e.g., AP/AM Filter) may be applied. For example, motion compensation may be performed based at least in part on the motion data and at least one of the third modified prediction reference picture or the fourth modified prediction reference picture to generate prediction partition data for the prediction partition. Process 1300 may feed this information back to operation 1559 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 1500 may continue at operation 1579 "Optionally Apply EP Filter", where enhanced predicted partition (e.g., EP Filtering) may be optionally applied. In some examples, where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 1500 may continue at operation 1580 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Process 1500 may be implemented via any of the coder systems as discussed herein. Further, process 1500 may be repeated either in serial or in parallel on any number of instantiations of video data such as prediction error data partitions, original data partitions, or wavelet data or the like.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

FIG. 16 is an illustrative diagram of example video coding system 1600, arranged in accordance with at least some implementations of the present disclosure. In the illustrated implementation, video coding system 1600 may include imaging device(s) 1601, video encoder 100 and/or a video encoder implemented via logic circuitry 1650 of processing unit(s) 1620, video decoder 200 and/or a video decoder implemented via logic circuitry 1650 of processing unit(s) 1620, an antenna 1602, one or more processor(s) 1603, one or more memory store(s) 2004, and/or a display device 1605.

As illustrated, imaging device(s) 1601, antenna 1602, processing unit(s) 1620, logic circuitry 1650, video encoder 100, video decoder 200, processor(s) 1603, memory store(s) 1604, and/or display device 1605 may be capable of communication with one another. As discussed, although illustrated with both video encoder 100 and video decoder 200, video coding system 1600 may include only video encoder 100 or only video decoder 200 in various examples.

As shown, in some examples, video coding system 1600 may include antenna 1602. Antenna 1602 may be configured to transmit or receive an encoded bitstream of video data, for example. Further, in some examples, video coding system 1600 may include display device 1605. Display device 1605 may be configured to present video data. As shown, in some example, logic circuitry 1650 may be implemented via processing unit(s) 1620. Processing unit(s) 1620 may include application-specific integrated circuit (ASIC) logic, graphics processor(s), general purpose processor(s), or the like. Video coding system 1600 also may include optional processor(s) 1603, which may similarly include application-specific integrated circuit (ASIC) logic, graphics processor(s), general purpose processor(s), or the like. In some examples, logic circuitry 1650 may be implemented via hardware or video coding dedicated hardware or the like, and processor(s) 1603 may implemented general purpose software or operating systems or the like. In addition, memory stores 1604 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1604 may be implemented by cache memory. In some examples, logic circuitry 1650 may access memory stores 1604 (for implementation of an image buffer for example). In other examples, logic circuitry 1650 and/or processing unit(s) 1620 may include memory stores (e.g., cache or the like) for the implementation of an image buffer or the like.

In some examples, video encoder 100 implemented via logic circuitry may include an image buffer (e.g., via either processing unit(s) 1620 or memory store(s) 1604)) and a graphics processing unit (e.g., via processing unit(s) 1620). The graphics processing unit may be communicatively coupled to the image buffer. The graphics processing unit may include video encoder 100 as implemented via logic circuitry 1650 to embody the various modules as discussed with respect to FIG. 1 and FIGS. 3 and 5. For example, the graphics processing unit may include entropy encoder logic circuitry, and so on. The logic circuitry may be configured to perform the various operations as discussed herein. For example, the entropy encoder logic circuitry may be configured to receive first video data and second video data of different types for entropy encoding, determine a first entropy encoding technique for the first video data based at least in part on a parameter associated with the first video data such that the first entropy encoding technique comprises at least one of an adaptive symbol-run variable length coding technique or an adaptive proxy variable length coding technique, entropy encode the first video data using the first encoding technique to generate first compressed video data and the second video data using a second encoding technique to generate second compressed video data, and assemble the first compressed video data and the second compressed video data to generate an output bitstream. Video decoder 200 may be implemented in a similar manner.

In some examples, antenna 1602 of video coding system 1600 may be configured to receive an entropy encoded bitstream of video data. As discussed, the bitstream may include two or more compressed video data types. Video coding system 1600 may also include video decoder 200 coupled to antenna 1602 and configured to decode the encoded bitstream. For example, video decoder 200 may be configured to disassemble the entropy encoded bitstream to determine first compressed video data and second compressed video data, determine a first entropy decoding technique for the first compressed video data, such that the first entropy decoding technique comprises at least one of an adaptive symbol-run variable length coding technique or an adaptive proxy variable length coding technique, entropy decode the first compressed video data based on the first entropy decoding technique to generate first video data and the second compressed video data based on a second entropy decoding technique to generate second video data, and decode the first video data and the second video data to generate a video frame.

In embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 17:
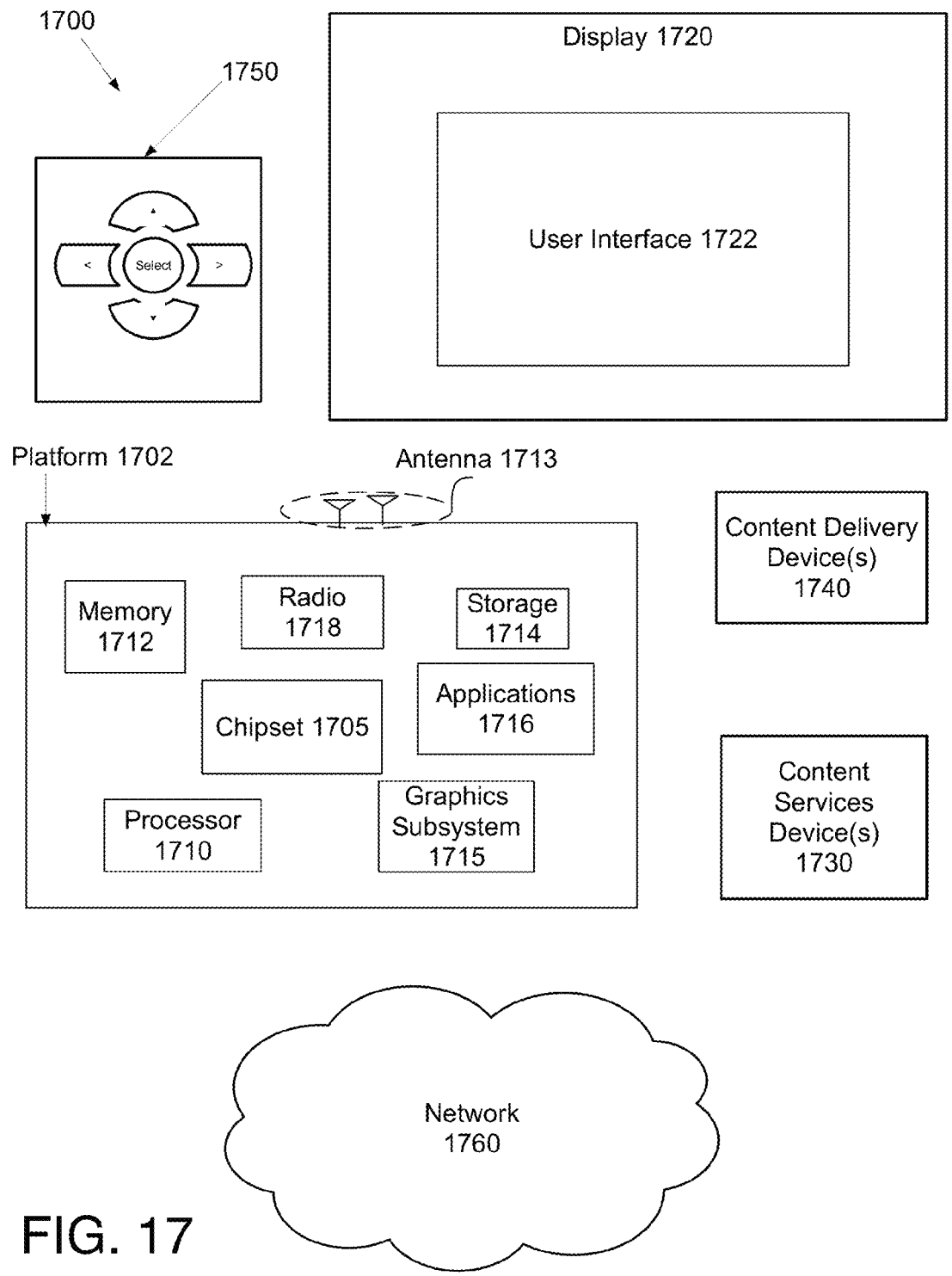
FIG. 17 is an illustrative diagram of an example system.

FIG. 17 is an illustrative diagram of an example system 1700, arranged in accordance with at least some implementations of the present disclosure. In various implementations, system 1700 may be a media system although system 1700 is not limited to this context. For example, system 1700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1700 includes a platform 1702 coupled to a display 1720. Platform 1702 may receive content from a content device such as content services device(s) 1730 or content delivery device(s) 1740 or other similar content sources. A navigation controller 1750 including one or more navigation features may be used to interact with, for example, platform 1702 and/or display 1720. Each of these components is described in greater detail below.

In various implementations, platform 1702 may include any combination of a chipset 1705, processor 1710, memory 1712, antenna 1713, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, DisplayPort, wireless HDMI, and/or wireless HD compliant techniques. Graphics subsystem 1715 may be integrated into processor 1710 or chipset 1705. In some implementations, graphics subsystem 1715 may be a stand-alone device communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of unidirectionally or bidirectionally communicating content between content providers and platform 1702 and/display 1720, via network 1760 or directly. It will be appreciated that the content may be communicated unidirectionally and/or bidirectionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of controller 1750 may be used to interact with user interface 1722, for example. In various embodiments, navigation controller 1750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1750 may be replicated on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722, for example. In various embodiments, controller 1750 may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off" In addition, chipset 1705 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various embodiments, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various embodiments, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 17.

Figure 18:
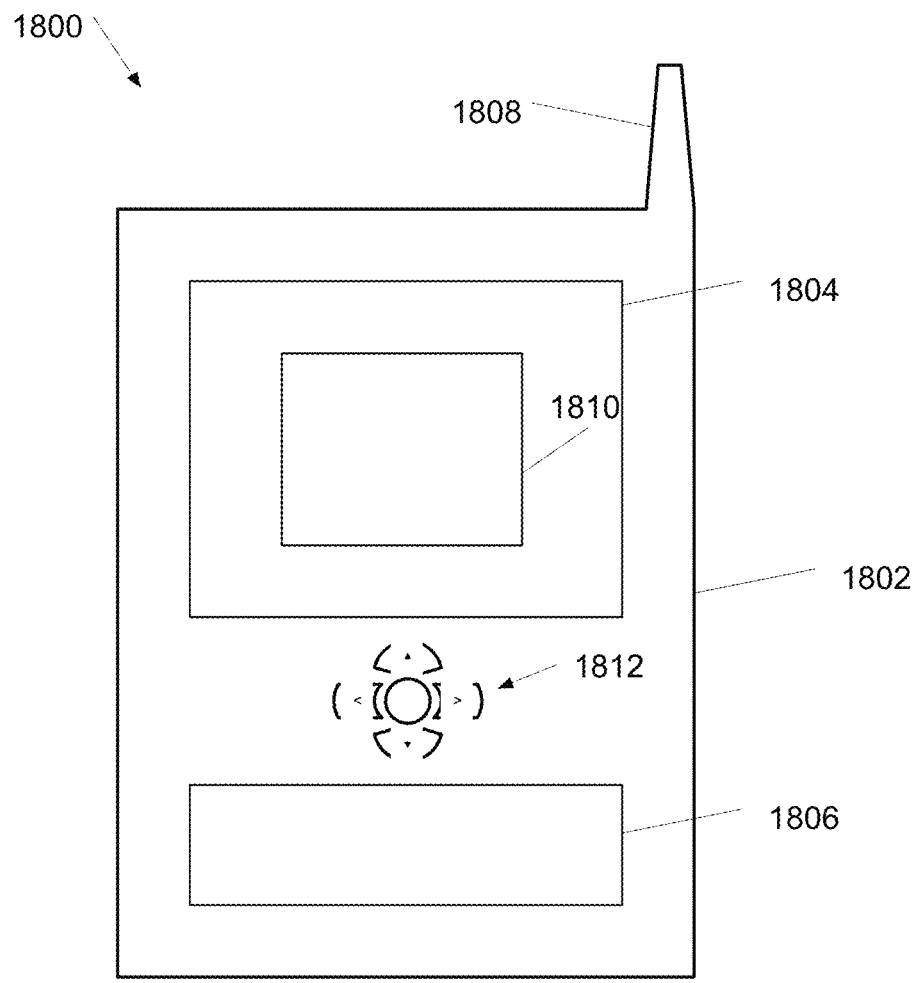
FIG. 18 illustrates an example device.

As described above, system 1700 may be embodied in varying physical styles or form factors. FIG. 18 illustrates implementations of a small form factor device 1800 in which system 1800 may be embodied. In various embodiments, for example, device 1800 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 18, device 1800 may include a housing 1802, a display 1804, an input/output (I/O) device 1806, and an antenna 1808. Device 1800 also may include navigation features 1812. Display 1804 may include any suitable display unit for displaying information appropriate for a mobile computing device. I/O device 1806 may include any suitable I/O device for entering information into a mobile computing device. Examples for I/O device 1806 may include an alphanumeric keyboard, a numeric keypad, a touch pad, input keys, buttons, switches, rocker switches, microphones, speakers, voice recognition device and software, and so forth. Information also may be entered into device 1800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

As discussed, systems, apparatus, articles, and methods are described herein related to content adaptive entropy coding for video systems. In some examples, systems, apparatus, articles, and methods are described herein related to content adaptive entropy coding for modes and reference types data for portions of video frames for video systems. Further, examples include content adaptive entropy coding for splits data (e.g., splits) and horizontal/vertical data (e.g., whether the splits are horizontal or vertical splits). For example, the splits data may include split bits indicating whether a block or partition of a picture is further split or not. The horizontal/vertical data may indicate whether the split (if indicated) is horizontal or vertical. The splits data may continue for sub-blocks (split portions of a block), and so on until each block or sub-block or the like is no longer split. Modes data may indicate which mode a block or partition or the like is being used to code the block or partition. For example, the modes may include intra mode, skip mode, split mode, auto mode, inter mode, or multi mode, or the like, as is discussed further herein. The reference types data may indicate a reference frame type for the block or partition in certain modes. For example, a single reference frame may be used in inter mode code and two (or more) reference frames may be used in multi mode coding.

In some examples, splits data, horizontal/vertical data, modes data, and reference type data may be loaded for a portion of a video frame or a video frame. An estimated entropy coding bit cost may be determined as a sum of an entropy coding bit cost for jointly coding the splits data and the modes data and an entropy coding bit cost for coding the horizontal/vertical data (e.g., a total cost as a sum of the cost for jointly coding splits data and modes data and the cost of coding the horizontal/vertical data). Another estimated entropy coding bit cost may be determined as a sum of an entropy coding bit cost for separately coding the splits data and the modes data, and an entropy coding bit cost for coding the horizontal/vertical data (e.g., a total cost as a sum of the cost for separately coding splits data and modes data and the cost of coding the horizontal/vertical data). Based on the bit costs, a selection may be made between jointly and separately coding the splits data and the modes data such that the lower bit cost is used. Based on the selection, the splits data and the modes data may be entropy coded jointly or separately and a joint or separate coding header may be provided to indicate the selected coding method. Further, the horizontal/vertical data may be entropy coded and the reference type data may be entropy coded. The entropy coded splits data, modes data, horizontal/vertical data, and reference type data may be outputted to a bitstream for use by a decoder, for example.

The encoded bitstream may be received and decoded to determine a joint or separate coding header associated with splits data and modes data a portion of a video frame or a video frame. The splits data and the modes data may be decoded jointly when the joint or separate coding header indicates joint coding and separately when the joint or separate coding header indicates separate coding. The horizontal/vertical data and reference type data may also be entropy decoded from the bitstream. The entropy decoded splits, modes, horizontal/vertical, and reference types data may be used, as discussed herein, with other entropy decoded data to reconstruct video frames for presentment to a user.

As discussed herein, encoder module 403 (please refer to FIG. 6) may receive video data 413, which may include input data defining partitions of picture portions of a video frame or frames. Encoder module 403 may receive modes and splits data 635 (e.g., for joint coding), modes information (e.g., modes) data 636 and split/non-split information (e.g., splits) data 637 (e.g., for separate coding), and/or prediction reference information (e.g., reference type) data 638. Encoder module 403 may also receive horizontal/vertical data as a part of modes and splits data 635 or splits data 637 or separately therefrom. Further, as shown, in some examples, data 635, 636, 637, and 638 may be received to separate modules. In some examples, video data 413 may be received together to encoder module 403 and/or other module structures or data structures may be used by encoder module 403. In particular, any data that is duplicative among data 635, 636, 637, and 638 (e.g., splits data and modes data among data 635 and 636, 637) may only be received once by encoder module 403. Encoder module 403 may determine joint and separate entropy coding bit costs for jointly coding the splits and modes data and for separately coding the splits and modes data, respectively. Encoder module 403 may entropy encode the splits and modes data jointly or separately based on the lower bit cost, as well as entropy encode the reference type data and horizontal/vertical data as is discussed further herein. Encoder module 403 may transmit the entropy encoded splits data, modes data, horizontal/vertical data, and reference type data to bitstream assembler 408, which may write the entropy encoded data to bitstream 111.

Figure 19:
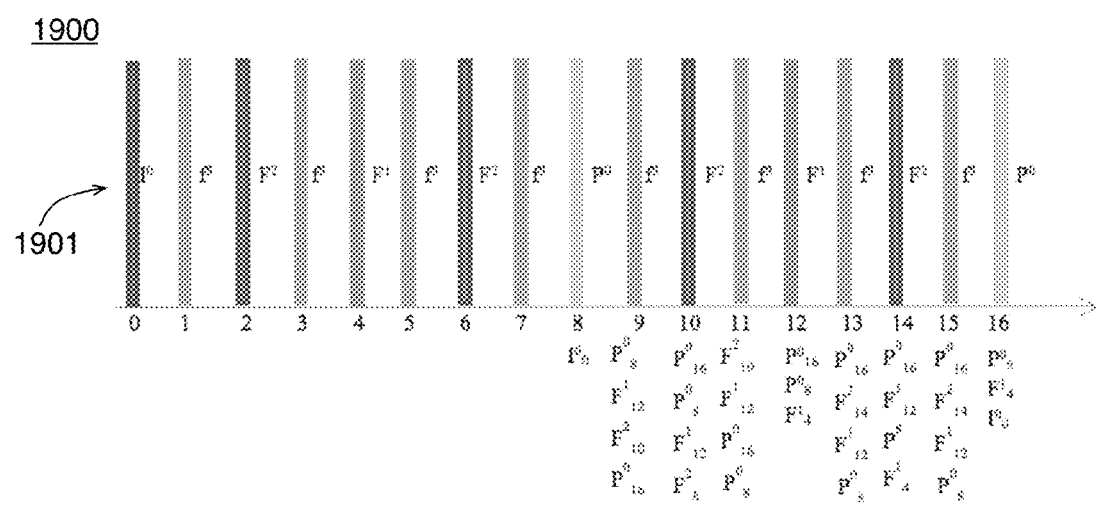
FIG. 19 is an illustrative diagram of example picture structures and prediction dependencies.

As discussed, next generation video coding may use 3 picture types, I-, P-, and B/F-pictures. FIG. 19 is an illustrative diagram of example picture structures and prediction dependencies 1900, arranged in accordance with at least some implementations of the present disclosure. As shown, picture structures and prediction dependencies 1900 may include pictures 1901 including I-, P-, and/or B/F-pictures. The illustrated pictures may also be ranked. For example, $I^0$ and $P^0$ pictures may be rank 0 pictures, $F^1$ may be a rank 1 pictures, may correspond to first level hierarchy, and may be used as references (e.g., for coding another picture), $F^2$ may be rank 2 pictures, may correspond to second level hierarchy, and may be used as references, and $f^3$ may be rank 3 pictures that may correspond to the third level hierarchy, but may not be used as references (e.g., no other pictures depend on them).

As discussed, a picture may divided into tiles or the like (e.g., super-fragments, largest coding units, or the like). In various implementations, two tile sizes (e.g., 32×32 and 64×64) may be employed. Further, the tiles may divided into partitions (e.g., smaller units) for prediction (e.g., prediction partitions) and/or coding (e.g., coding partitions). In some examples, prediction partitions of a tile may be given one of 6 modes as follows, which may be available both in P- and in B/F-pictures:

intra
skip
split
auto
inter
multi

For example, partitions that are intra coded may be given an intra mode. Partitions for which neither any motion vector nor any transform coded data are provided may be given a skip mode. Partitions for which transform coefficients are coded but no motion vector is provided may be given an auto mode. Partitions that need to be divided further may be given a split mode (and may be described as split partitions). Finally, partitions that have multiple prediction references may be given a multi mode. As discussed, each partition may be provided a mode as discussed. Such information may be provided as modes data as discussed herein. Further, for modes inter and multi, the reference picture type may be provide as reference type data.

Figure 20:
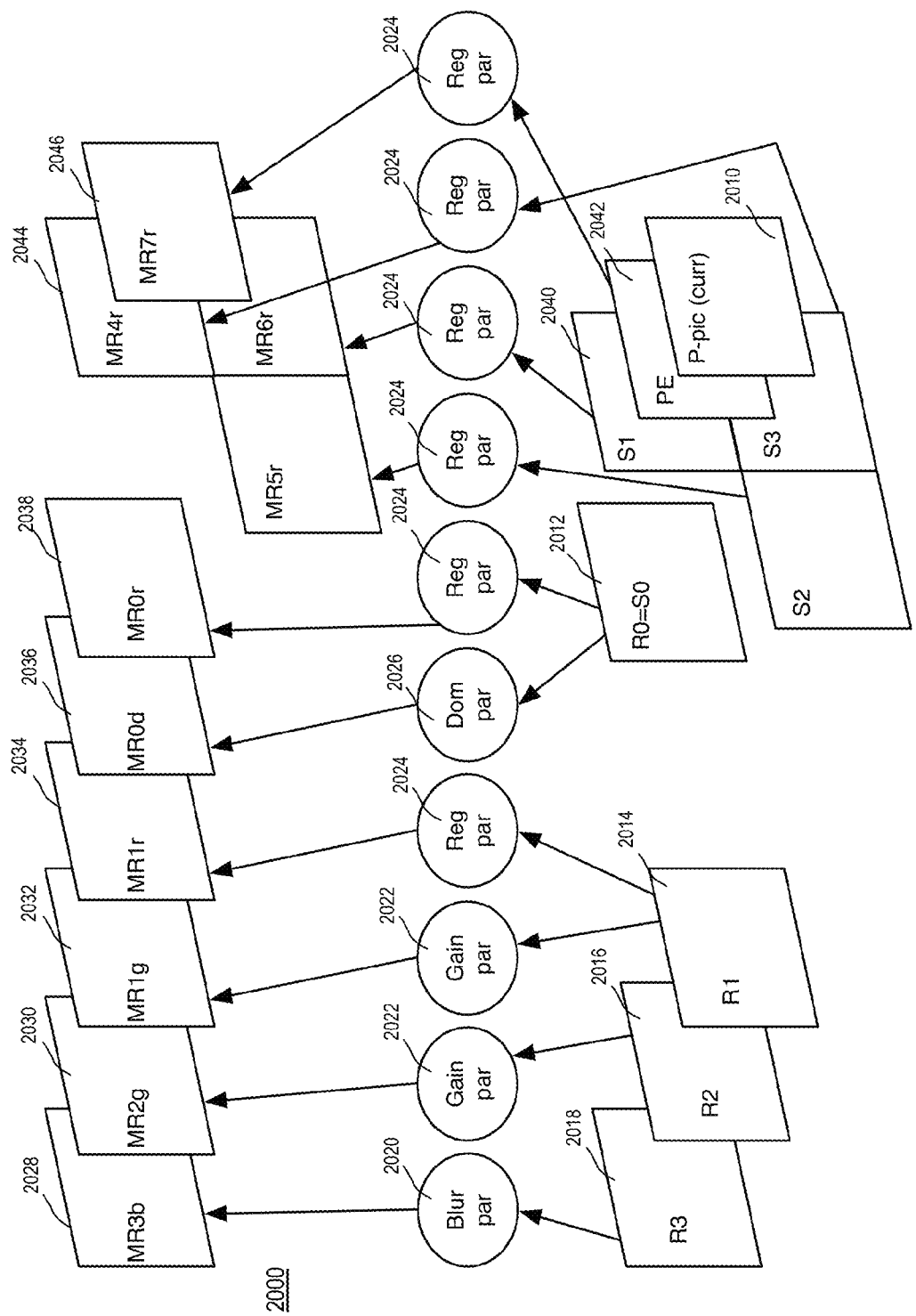
FIG. 20 is an illustrative diagram of example prediction reference types.

FIG. 20 is an illustrative diagram of example prediction reference pictures 2000, arranged in accordance with at least some implementations of the present disclosure. For example, the discussed NGV coder (e.g., encoder 100 and/or decoder 200) may implement P-picture coding using a combination of morphed prediction references 2028-2038 (e.g., MR0 through 3) and/or synthesized prediction references 2012 and 2040-2046 (e.g., S0 through S3, MR4 through 7). As discussed, NGV coding may use 3 picture types referred to as I-pictures, P-pictures, and F/B-pictures. In the illustrated example, the current picture to be coded 2010 (a P-picture) is shown at time t=4. During coding, the proposed implementation of the NGV coder (e.g., encoder 100 and/or decoder 200) may use one or more of 4 previously decoded references R0 2012, R1 2014, R2 2016, and R3 2018. Unlike other solutions that may simply use these references directly for prediction, the proposed implementation of the NGV coder (e.g., encoder 100 and/or decoder 200) may generate modified (morphed or synthesized) references from such previously decoded references and then use motion compensated coding based at least in part on such generated modified (morphed or synthesized) references.

In some examples, the proposed implementation of the NGV coder (e.g., encoder 100 and/or decoder 200) may incorporate a number of components and the combined predictions generated by these components in an efficient video coding algorithm. For example, the proposed implementation of the NGV coder may include one or more of the following features: 1. Gain Compensation (e.g., explicit compensation for changes in gain/brightness in a scene); 2. Blur Compensation (e.g., explicit compensation for changes in blur/sharpness in a scene); 3. Dominant/Global Motion Compensation (e.g., explicit compensation for dominant motion in a scene); 4. Registration Compensation (e.g., explicit compensation for registration mismatches in a scene); 5. Super Resolution (e.g., explicit model for changes in resolution precision in a scene); 6. Projection (e.g., explicit model for changes in motion trajectory in a scene); the like, and/or combinations thereof.

In the illustrated example, motion compensation may be applied to a current picture 2010 (e.g., labeled in the figure as P-pic (curr)) as part of the local decode loop. In some instances, such motion compensation may be based at least in part on future frames (not shown) and/or previous frame R0 2012 (e.g., labeled in the figure as R0), previous frame R1 2014 (e.g., labeled in the figure as R1), previous frame R2 2016 (e.g., labeled in the figure as R2), and/or previous frame R3 2018 (e.g., labeled in the figure as R3).

For example, in some implementations, prediction operations may include inter- and/or intra-prediction. Inter-prediction may be performed by one or more modules including a morphing analyzer and generation module and/or a synthesizing analyzer and generation module. Such a morphing analyzer and generation module may analyze a current picture to determine parameters for changes in blur 2020 (e.g., labeled in the figure as Blur par), changes in gain 2022 (e.g., labeled in the figure as Gain par), changes in registration 2024 (e.g., labeled in the figure as Reg par), and changes in dominant motion 2026 (e.g., labeled in the figure as Dom par), or the like with respect to a reference frame or frames with which it is to be coded.

The determined morphing parameters 2020, 2022, 2024, and/or 2026 may be used to generate morphed reference frames. Such generated morphed reference frames may be stored and may be used for computing motion vectors for efficient motion (and characteristics) compensated prediction of a current frame. In the illustrated example, determined morphing parameters 2020, 2022, 2024, and/or 2026 may be used to generate morphed reference frames, such as blur compensated morphed reference frame 2028 (e.g., labeled in the figure as MR3b), gain compensated morphed reference frame 2030 (e.g., labeled in the figure as MR2g), gain compensated morphed reference frame 2032 (e.g., labeled in the figure as MR1g), registration compensated morphed reference frame 2034 (e.g., labeled in the figure as MR1r), dominant motion compensated morphed reference frame 2036 (e.g., labeled in the figure as MR0d), and/or registration compensated morphed reference frame 2038 (e.g., labeled in the figure as MR0r), the like or combinations thereof, for example.

Similarly, a synthesizing analyzer and generation module may generate super resolution (SR) pictures 2040 (e.g., labeled in the figure as S0 (which is equal to previous frame R0 2012), S1, S2, S3) and projected interpolation (PI) pictures 2042 (e.g., labeled in the figure as PE) or the like for determining motion vectors for efficient motion compensated prediction in these frames. Such generated synthesized reference frames may be stored and may be used for computing motion vectors for efficient motion (and characteristics) compensated prediction of a current frame.

Additionally or alternatively, the determined morphing parameters 2020, 2022, 2024, and/or 2026 may be used to morph the generate synthesis reference frames super resolution (SR) pictures 2040 and/or projected interpolation (PI) pictures 2042. For example, a synthesizing analyzer and generation module may generate morphed registration compensated super resolution (SR) pictures 2044 (e.g., labeled in the figure as MR4r, MRSr, and MR6r) and/or morphed registration compensated projected interpolation (PI) pictures 2046 (e.g., labeled in the figure as MR7r) or the like from the determined registration morphing parameter 2024. Such generated morphed and synthesized reference frames may be stored and may be used for computing motion vectors for efficient motion (and characteristics) compensated prediction of a current frame.

In some implementations, changes in a set of characteristics (such as gain, blur, dominant motion, registration, resolution precision, motion trajectory, the like, or combinations thereof, for example) may be explicitly computed. Such a set of characteristics may be computed in addition to local motion. In some cases previous and next pictures/slices may be utilized as appropriate; however, in other cases such a set of characteristics may do a better job of prediction from previous picture/slices. Further, since there can be error in any estimation procedure, (e.g., from multiple past or multiple past and future pictures/slices) a modified reference frame associated with the set of characteristics (such as gain, blur, dominant motion, registration, resolution precision, motion trajectory, the like, or combinations thereof, for example) may be selected that yields the best estimate. Thus, the proposed approach that utilizes modified reference frames associated with the set of characteristics (such as gain, blur, dominant motion, registration, resolution precision, motion trajectory, the like, or combinations thereof, for example) may explicitly compensate for differences in these characteristics. The proposed implementation may address the problem of how to improve the prediction signal, which in turn allows achieving high compression efficiency in video coding.

As discussed, a mode may be assigned to a partition. Further, depending on the mode, reference pictures may be used for coding the partition. The reference pictures may be previously decoded reference frames (or pictures), previously decoded morphed frames, or previously decoded synthesized frames. In some examples, the available reference frames or pictures available for coding may depend on the picture type of the picture being coded and/or the mode of the partition being coded.

For example, in the coding of P-pictures for inter mode, nine reference types may be used:

TABLE A

Example Reference Types for P-Pictures in Inter Mode

| No. | Ref Types in P-pictures for Inter Mode |
|---|---|
| 0. | MR0n (=past SR0) (Past_None) |
| 1. | MR1n (MRF1_None) |
| 2. | MR2n (MRF2_None) |
| 3. | MR3n (MRF3_None) |
| 4. | MR5n (Past_SR1) |
| 5. | MR6n (Past_SR2) |
| 6. | MR7n (Past_SR3) |
| 7. | MR0d (Past_DMC) |
| 8. | MR0g (Past_Gain) |

As discussed and as shown in Table A, the reference type data may include reference types for inter mode blocks or partitions of a P-picture and the reference types for the inter mode blocks or partitions may include previously decoded frames (MR0n-MR3n, where "n" means no morphing parameters), previously decoded super-resolution based frames (MR5n-MR7n and MR0n, where "n" means no morphing parameters, and, as shown, MR5n-MR7n and MR0n are past super resolution frames), a previously decoded dominant motion morphed frame (MR0d), or a previously decoded gain morphed frame (MR0g), or the like.

For example, in the coding of P-pictures for multi mode, a first reference picture may be a previously decoded reference frame (e.g., MR0n) and a second reference frame may be chosen as shown in Table B:

TABLE B

Example Reference Types for P-Pictures in Multi Mode

| No. | Ref Types in P-pictures for Multi Mode (First Reference Type is MR0n "Past None", Second Reference Type is chosen from below) |
|---|---|
| 0. | MR1n (MRF1_None) |
| 1. | MR2n (MRF2_None) |
| 2. | MR3n (MRF3_None) |

As discussed and as shown in Table B, the reference type data may include reference types for multi mode blocks or partitions of a P-picture and the reference types for the multi mode blocks or partitions may include a first reference type including a previously decoded frame (e.g., MR0n) and a second reference type including a second previously decoded frame (e.g., one of MR1n-MR3n).

For example, in the coding of B/F-pictures for inter mode, ten reference types may be used:

TABLE C

Example Reference Types for B/F-Pictures in Inter Mode

| No. | Ref Types in B/F-pictures for Inter Mode |
|---|---|
| 0. | MR0n (=past SR0) (Past_None) |
| 1. | MR7n (Proj_None) |
| 2. | MR3n (Futr_None) |
| 3. | MR1n (MRF1_None) |
| 4. | MR4n (Futr_SR1) |
| 5. | MR5n (Futr_SR2) |
| 6. | MR6n (Futr_SR3) |
| 7. | MR0d (Past_DMC) |
| 8. | MR3d (Futr_DMC) |
| 9. | MR0g/MR3g (Past_Gain, Futr_Gain) |

As discussed and as shown in Table C, the reference type data may include reference types for inter mode blocks or partitions of a B/F-picture and the reference types for the inter mode blocks or partitions may include previously decoded frames (MR0n, MR3n, MR1n; please note previously decoded frames may include "past" or "future" frames), a projected reference frame (MR7n), a previously decoded super-resolution based frame (MR4n, MR5n, MR6n) a previously decoded dominant motion morphed frame (MR0d, MR3d), or a previously decoded gain morphed frame (MR0g, MR3g).

For example, in the coding of B/F-pictures for multi mode, several options may be provided.

In a first option, a first reference picture may be a previously decoded reference frame (e.g., MR0n) and a second reference frame may be chosen as shown in Table D:

TABLE D

Example Reference Types for P-Pictures in Multi Mode

| No. | Ref Types in B/F-pictures for Multi Mode (First Reference Type is MR0n "Past None", Second Reference Type is chosen from below) |
|---|---|
| 0. | MR3n (=future SR0; Futr_None) |
| 1. | MR1n (MRF1_None) |
| 2. | MR4n (Futr_SR1) |
| 3. | MR5n (Futr_SR2) |
| 4. | MR6n (Futr_SR3) |
| 5. | MR7n (Proj_None) |
| 6. | MR3d (Futr_DMC) |
| 7. | MR3g (Futr_Gain) |

In a second option, a first reference picture may be a previously decoded reference frame (e.g., MR0n) and a second reference frame may be a projected reference frame (e.g., MR7n (Proj_None).

In a third option, a first reference picture may be a previously decoded reference frame (e.g., MR3n (Futr_None)) and a second reference frame may be a projected reference frame (e.g., MR7n (Proj_None)).

As discussed and as shown in Table D and as described in the second and third options, the reference type data may include reference types for multi mode blocks or partitions of a B/F-picture and the reference types for the multi mode blocks or partitions may include a first reference type including a previously decoded frame (either a "past" or "future" reference frame; e.g., MR0n or MR3n) and a second reference type including a second previously decoded frame (MR1n, MR3n), a previously decoded super-resolution based frame (MR4n, MR5n, MR6n), a projected reference frame (MR7n), a previously decoded dominant motion morphed frame (MR3d), or a previously decoded gain morphed frame (MR3g).

As discussed herein, video data including modes and reference type data may be entropy encoded. Also as discussed, the modes data may indicate modes for blocks or partitions of a video frame or portions of a video frame. In some examples, the modes data may indicate one of six modes (intra mode, skip mode, split mode, auto mode, inter mode, or multi mode) for a block or partition and the reference type data may indicate one or more reference picture or frame types for the blocks or partitions discussed in detail with respect to Tables A-D and elsewhere herein.

Figure 21:
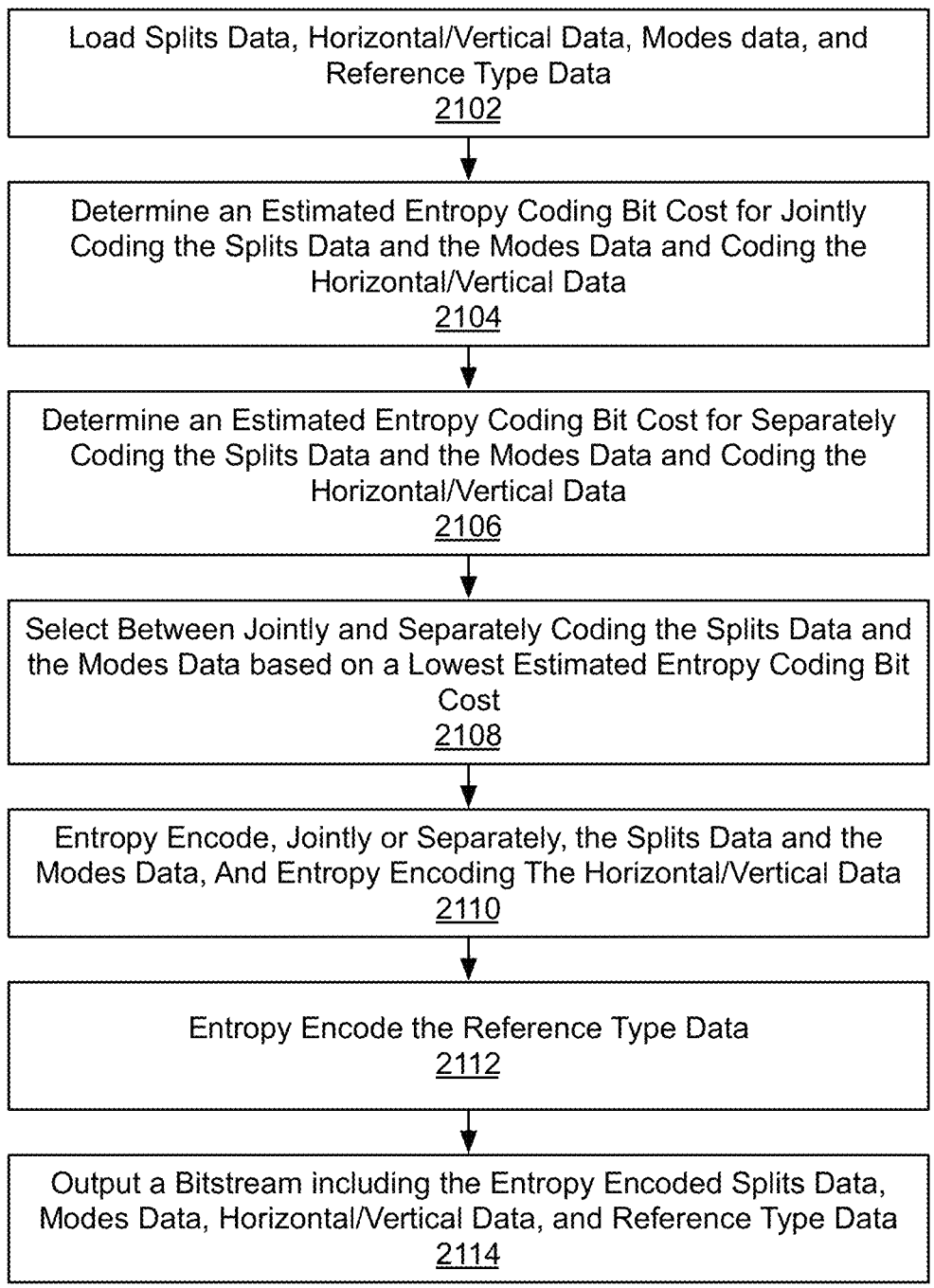
FIG. 21 is a flow diagram illustrating an example process.

FIG. 21 is a flow diagram illustrating an example process, arranged in accordance with at least some implementations of the present disclosure. Process 2100 may include one or more operations, functions or actions as illustrated by one or more of operations 2102, 2104, 2106, 2108, 2110, 2112, and/or 2114. Process 2100 may form at least part of a next generation video coding process. By way of non-limiting example, process 2100 may form at least part of a next generation video encoding process as undertaken by encoder system 100 of FIG. 1.

Process 2100 may begin at operation 2102, "Load Split Data, Horizontal/Vertical Data, Modes data, and Reference Type Data", where split data, horizontal/vertical data, modes data, and reference type data may be loaded. For example, the data may be loaded by adaptive entropy encoder module 110 for processing. As discussed, the splits data may include split bits indicating whether a block or partition of a video frame is further split or not and the horizontal/vertical data indicating whether each split in the splits data is a horizontal or a vertical split. Further, as discussed, the modes data may include modes for blocks or partitions of the video frame. For example, the modes data may include the following modes: intra mode, skip mode, split mode, auto mode, inter mode, or multi mode. The data may be loaded for a video frame or a portion of a video frame such as a slice or other portion of the video frame.

Process 2100 may continue at operation 2104, "Determine an Estimated Entropy Coding Bit Cost for Jointly Coding the Splits Data and the Modes Data and Coding the Horizontal/Vertical Data", where an estimated entropy coding bit cost for jointly coding the splits data and the modes data, and coding the horizontal/vertical data may be determined.

Process 2100 may continue at operation 2106, "Determine an Estimated Entropy Coding Bit Cost for Separately Coding the Splits Data and the Modes Data and Coding the Horizontal/Vertical Data", where an estimated entropy coding bit cost for separately coding the splits data and the modes data, and coding the horizontal/vertical data may be determined. As discussed, estimated entropy coding bit costs may be determined for jointly and separately coding the splits data and the modes data. Further details for such entropy coding and bit costs are provided herein below. For example, when separately coding the splits data and the modes data, the splits data may be coded with the horizontal/vertical data and the cost of entropy coding the modes data (e.g., separately) may be based on a smallest bit cost using six techniques (e.g., VLC without prediction, VLCS1 without prediction, VLCS2 without prediction, VLC with prediction, VLCS1 with prediction, and VLCS2 with prediction).

Process 2100 may continue at operation 2108, "Select Between Jointly and Separately Coding the Splits Data and the Modes Data based on a Lowest Estimated Entropy Coding Bit Cost", where a selection may be made between jointly and separately coding the splits data and the modes data based on a lowest estimated entropy coding bit cost. For example, a lowest of the estimated entropy coding bit cost for jointly coding the splits data and the modes data and the estimated entropy coding bit cost for separately coding the splits data and the modes data may be used to determined between jointly and separately coding the splits data and the modes data.

Process 2100 may continue at operation 2110, "Entropy Encode, Jointly or Separately, the Splits Data and the Modes Data, And Entropy Encoding The Horizontal/Vertical Data", where the splits data and the modes data may be entropy encoded jointly or separately based on the selected entropy coding method, and where the horizontal/vertical data may be entropy encoded.

Process 2100 may continue at operation 2112, "Entropy Encode the Reference Type Data", where the reference type data may be entropy encoded. For example, the inter reference type data (e.g., reference types for inter mode partitions) may be entropy coded based on a lowest bit cost method. In some examples, inter reference type data for P-pictures may be coded based on one of three coding techniques (e.g., VLC with default prediction, VLC with modified default prediction, and VLC with prediction) and inter reference type data for B/F-pictures may be coded based on one of seven coding techniques (e.g., VLC with default prediction, VLC with modified default prediction, VLC without prediction, VLC with prediction, VLCS1 with prediction, VLC with default-like prediction, and VLCS1 with default-like prediction), as is discussed further herein. For example, an inter-block reference type coding technique indicator indicating the selected technique may be included in the bitstream for use by the decoder.

In some examples, multi reference type data (e.g., reference types for multi mode partitions) may be entropy coded by selecting a variable length coding (VLC) table for the multi-block reference type data based on a number of multi-reference types in the multi-block reference type data (e.g., how many multi-reference types are include in the reference type data) and encoding the multi-block reference type data based on the variable length coding table.

Process 2100 may continue at operation 2114, "Output a Bitstream including the Entropy Encoded Splits Data, Modes Data, Horizontal/Vertical Data, and Reference Type Data", where a bitstream may be outputted including the entropy encoded splits data, modes data, horizontal/vertical data, and reference type data. For example, the bitstream may be output by encoder 100 as output bitstream 111.

Process 2100 may provide a method for encoding video data and may be implemented, as discussed herein, via a video encoder such as encoder 100.

Figure 22:
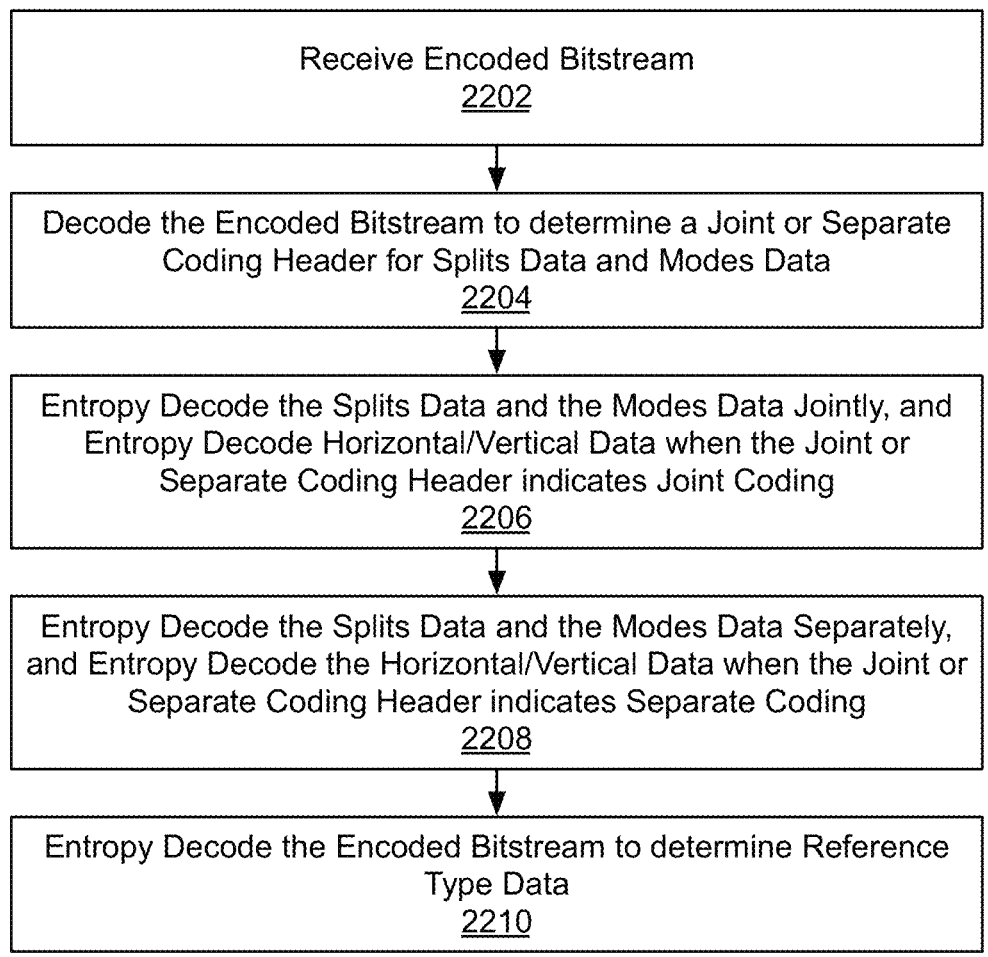
FIG. 22 is a flow diagram illustrating an example process.

FIG. 22 is a flow diagram illustrating an example process, arranged in accordance with at least some implementations of the present disclosure. Process 2200 may include one or more operations, functions or actions as illustrated by one or more of operations 2202, 2204, 2206, 2208, and/or 2210. Process 2200 may form at least part of a next generation video coding process. By way of non-limiting example, process 2200 may form at least part of a next generation video decoding process as undertaken by decoder system 200 of FIG. 2.

Process 2200 may begin at operation 2202, "Receive Encoded Bitstream", where an encoded bitstream may be received. For example, an encoded bitstream may be received via a decoder such as via adaptive entropy decoder 202 of decoder 200. The encoded bitstream may include, for example, a joint or separate coding header associated with splits data and modes data, entropy encoded splits data and entropy encoded modes data (either jointly or separately coded), entropy encoded horizontal/vertical data, entropy encoded reference type data, an inter-block reference type coding technique indicator, and/or an index of an actual mode event for a first block of the video frame.

Process 2200 may continue at operation 2204, "Decode the Encoded Bitstream to determine a Joint or Separate Coding Header for Splits Data and Modes Data", where the encoded bitstream may be decoded to determine a joint or separate coding header associated with splits data and modes data for a portion of a video frame (e.g., a slice or other portion of a video frame) or for a video frame. For example, the joint or separate coding header may indicate whether the associated splits data and modes data are jointly or separately coded.

Process 2200 may continue at operation 2206, "Entropy Decode the Splits Data and the Modes Data Jointly, and Entropy Decode Horizontal/Vertical Data when the Joint or Separate Coding Header indicates Joint Coding", where the splits data and the modes data may be jointly entropy decoded when the joint or separate coding header indicates joint coding and, where the horizontal/vertical data may be entropy decoded.

Process 2200 may continue at operation 2208, "Entropy Decode the Splits Data and the Modes Data Separately, and Entropy Decode the Horizontal/Vertical Data when the Joint or Separate Coding Header indicates Separate Coding", where the splits data and the modes data may be separately entropy decoded when the joint or separate coding header indicates separate coding and, where the horizontal/vertical data may be entropy decoded.

Process 2200 may continue at operation 2210, "Entropy Decode the Encoded Bitstream to determine Reference Type Data", where the encoded bitstream may be entropy decoded to determine reference type data. In some examples, decoding inter reference type data for P-pictures may include determining an inter-block reference type coding technique indicator from the bitstream indicating at least one of a coding based on proxy variable length coding using default prediction, a coding based on proxy variable length coding using modified default prediction, or a coding based on proxy variable length coding using prediction and decoding inter reference type data for B/F-pictures may include determining an inter-block reference type coding technique indicator from the bitstream indicating at least one of a coding based on proxy variable length coding using default prediction, a coding based on proxy variable length coding using modified default prediction, a coding based on proxy variable length coding without using prediction, a coding based on proxy variable length coding using prediction, a coding based on proxy variable length coding with a most frequent symbol coded with a symbol-run coding using prediction, or a coding based on proxy variable length coding using default-like prediction, and entropy decoding the inter block reference type data (either for P- or B/F-pictures) based on the indicated technique.

In some examples, multi reference type data (e.g., reference types for multi mode partitions) may be entropy decoded by selecting a variable length coding (VLC) table for the multi-block reference type data based on a number of multi-reference types in the multi-block reference type data (e.g., how many multi-reference types are include in the reference type data) and decoding the multi-block reference type data based on the variable length coding table. Such a process may be analogous to the encoding process for the multi reference type data.

Figure 23:
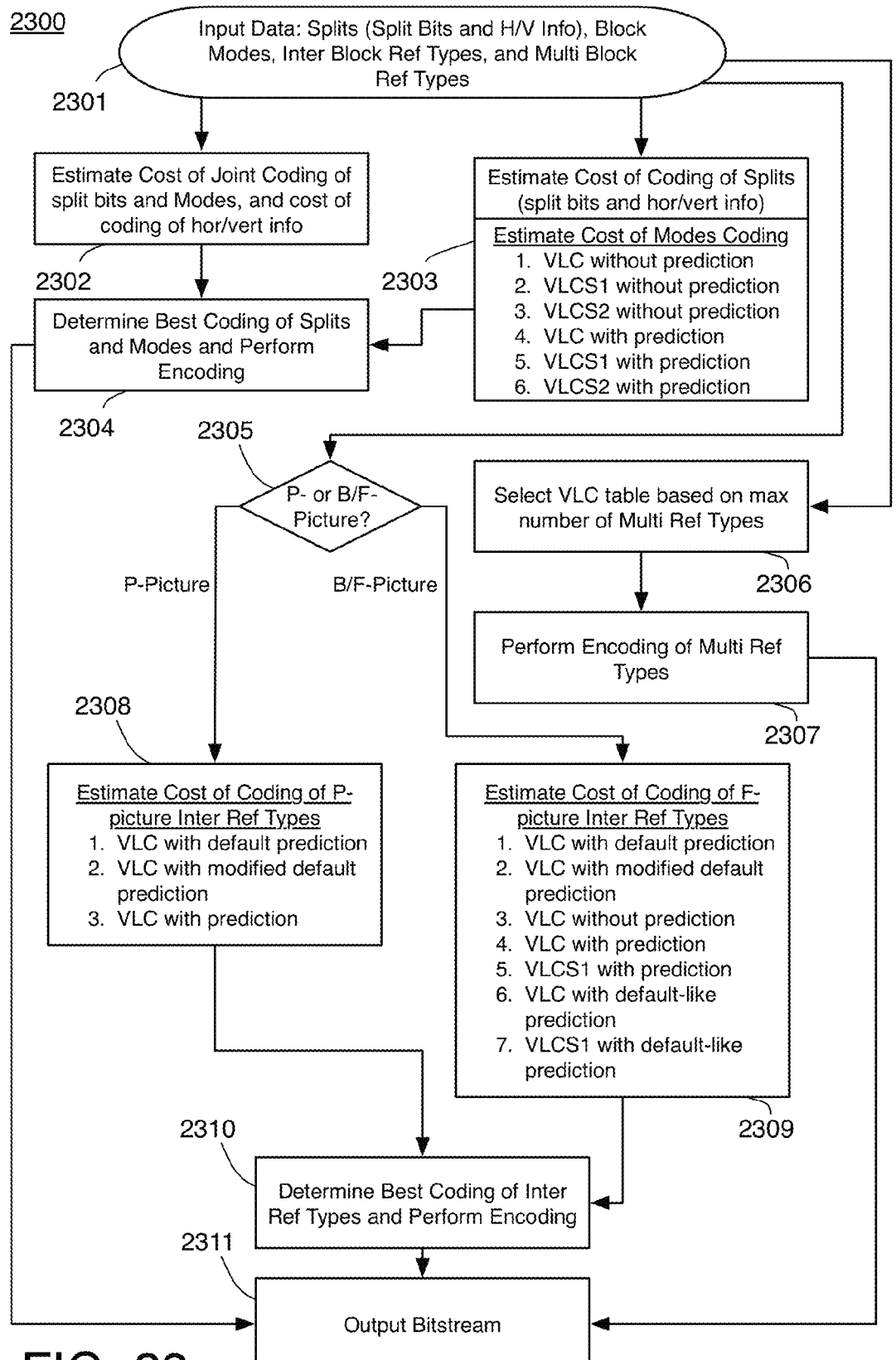
FIG. 23 is a flow diagram illustrating an example process.

FIG. 23 is a flow diagram illustrating an example process, arranged in accordance with at least some implementations of the present disclosure. Process 2300 may include one or more operations, functions or actions as illustrated by one or more of operations 2301-2311. Process 2300 may form at least part of a next generation video coding process. By way of non-limiting example, process 2300 may form at least part of a next generation video encoding process as undertaken by encoder system 100 of FIG. 1.

Process 2300 may begin at operation 2301, "Input Data: Splits (Split Bits and H/V Info), Block Modes, Inter Block Ref Types, and Multi Block Ref Types", where splits data, horizontal/vertical data, modes data, and reference type data for a video frame or a portion of a video frame may be loaded or input. For example, frame-level modes and splits may be read.

Process 2300 may continue at operation 2302, "Estimate Cost of Joint Coding of split bits and Modes, and cost of coding of hor/vert info", where the bit cost of jointly coding splits data (e.g., split bits) and modes data may be determined, and the cost of coding horizontal/vertical data may be determined. For example, the following may be performed: set an initial level to 0 (tile-level), collect SM (splits, modes) mask: splits and modes of current frame at a current split level, collect HV (horizontal/vertical) info for all splits in SM; if the length of SM mask is 0 or 1, set VLC table index to 31; if the length of SM mask is greater than 1 and the split level is 0, then estimate coding of most common event with symbol-run and the rest with VLC; if length of SM mask is greater than 1 and split level is greater than 0, then: estimate cost of 32 different VLC tables, select one with smallest bits, account for 5 bit VLC index code; account for HV info at current level (bitmap coded), and if there are splits in SM increase split level by 1 and repeat steps at higher split level.

Process 2300 may also continue from operation 2301 at operation 2303, which may be made up of two operations: "Estimate Cost of Coding of Splits (split bits and hor/vert info)" and "Estimate Cost of Modes Coding". At operation "Estimate Cost of Coding of Splits (split bits and hor/vert info)", the bit cost of separately coding splits data (e.g., split bits) and modes data may be determined, and the cost of coding horizontal/vertical data may be determined. For example, the following may be performed to determine the cost of separately coding splits data (and also encoding hor/vert data): set initial level to 0 (tile-level), collect S mask: splits of current frame at a current split level, collect HV (horizontal/vertical) info for splits S, estimate cost of coding splits (S) at current split level as follows: if length of S is less or equal to 10 code S with bitmap so account no overhead just the length of S as the estimated cost, otherwise: estimate cost of S coded with bitmap, estimate cost of S coded with inverted symbol-run (table 1), estimate cost of S coded with inverted Proxy VLC (table 2), estimate cost of S coded with differenced Proxy VLC (table 2), select the method of coding S that yields smallest bitcost, and account for the cost of selected method plus the method overhead, get best coding method for HV info (Proxy VLC or bitmap), estimate bits for HV info, and add estimated bits for S and HV info as final splits cost estimate.

At operation, "Estimate Cost of Modes Coding", where the costs of (separately) entropy coding modes may be estimated. For example, the costs of entropy coding modes using six techniques may be estimated: VLC without prediction, VLCS1 without prediction, VLCS2 without prediction, VLC with prediction, VLCS1 with prediction, and VLCS2 with prediction.

For example, for instances without prediction the following may be performed. Estimate a cost of modes coding based on proxy VLC without prediction by estimating running through all VLC sets, counting bits for each VLC set, selecting a minimal cost VLC set, and accounting for the selected VLC index cost header. Estimate a cost of modes coding without prediction and with symbol-run (level 1) used (e.g., based on proxy variable length coding with a most frequent symbol coded with a symbol-run coding) by estimating a cost of coding the most common event with symbol-run coding, removing that event from the events set, running through all VLC sets, counting bits for each VLC set, selecting a minimal cost VLC set, accounting for the selected VLC index header cost, and adding symbol-run cost and VLC cost to get total estimated cost for no prediction symbol-run level 1. Estimate cost of modes coding without prediction and with symbol-run (level 2) used (e.g., based on proxy variable length coding with a most frequent symbol and a second most frequent symbol coded with a symbol-run coding) by estimating a cost of coding the most common event with symbol-run coding, removing that event from the events set, estimating a cost of coding the 2nd most common event with symbol-run coding, removing that event from the events set, running through all VLC sets, counting bits for each VLC set, selecting a minimal cost VLC set, accounting for selected VLC index header cost, and adding two symbol-run costs and VLC cost to get total estimated cost for no prediction symbol-run level 2.

For instances with prediction, predicted value modes may be created based on neighboring modes and the following may be performed. Estimate cost of modes based on proxy VLC coding using prediction by running through all VLC sets, counting bits for each VLC set, selecting a minimal cost VLC set, and accounting for selected VLC index header cost. Estimate cost of modes coding based on proxy VLC using prediction and with symbol-run (level 1) used (e.g. based on proxy variable length coding with a most frequent symbol coded with a symbol-run coding) by estimating a cost of coding the most common event with symbol-run coding, removing that event from the events set, running through all VLC sets, counting bits for each VLC set, selecting a minimal cost VLC set, accounting for selected VLC index header cost, and adding symbol-run cost and VLC cost to get total estimated cost for prediction symbol-run level 1. Estimate cost of modes coding based on proxy VLC using prediction and with symbol-run (level 2) used (e.g., based on proxy variable length coding with a most frequent symbol and a second most frequent symbol coded with a symbol-run coding) by estimating a cost of coding the most common event with symbol-run coding, removing that event from the events set, estimating a cost of coding the 2nd most common event with symbol-run coding, removing that event from the events set, running through all VLC sets, counting bits for each VLC set, selecting a minimal cost VLC set, accounting for selected VLC index header cost, and adding two symbol-run costs and VLC cost to get total estimated cost for prediction symbol-run level 2.

The lowest bit count of the six options may be determined and, if selected over joint coding, a selected method index header (e.g., a separate modes coding technique header) may be encoded and the splits data (along with horizontal/vertical data) and modes data may be entropy coded.

Process 2300 may continue from operations 2302 and 2303 at operation 2304, "Determine Best Coding of Splits and Modes and Perform Encoding", where a best coding of splits and modes (along with horizontal/vertical) information may be determined. For example, a lowest bit cost between those determined at operations 2302 and 2303 may be used to determine the best coding method.

Process 2300 may also continue from operation 2301 at decision operation 2305, "P- or B/F-Picture?", where it may be determined whether the current frame or picture is a P- or B/F-Picture.

As shown, when the picture type is P-Picture, process 2300 may continue at operation 2308, "Estimate Cost of Coding of P-picture Inter Ref Types", where bit costs of coding of P-pictures inter reference types data may be estimated using three techniques: VLC with default prediction, VLC with modified default prediction, and VLC with prediction. For example, the following may be performed.

Read frame-level reference types for inter blocks and compute number of possible events for the inter ref types.

Estimate cost of coding ref types with based on proxy VLC with default prediction by selecting a VLC table based on the number of possible events and, for each ref type, creating prediction from up to 3 neighboring (e.g., neighboring blocks or partitions) ref types, accounting for 1 bit overhead to indicate if prediction is correct; otherwise if incorrect, accounting for the prediction difference using the length of the codeword from the selected VLC table.

Estimate cost of coding ref types with based on proxy VLC with modified default prediction by selecting a VLC table based on the number of possible events and, for each reference type, creating prediction from up to 3 neighboring ref types, accumulating 1 bit overhead to indicate if prediction is correct into a 1d mask PNP; otherwise if incorrect, accounting for the prediction difference using the length of the codeword from the selected VLC table, estimating the cost of coding the PNP mask with a Proxy VLC method (e.g., tables 0, 1, 2, and 3), selecting Proxy VLC table with smallest cost estimate, and adding VLC cost and cost of PNP mask coded with the selected Proxy VLC table as the final cost estimate.

Estimate cost of coding reference types with based on proxy VLC with prediction (e.g., full prediction or advanced prediction) by estimating a global ordering of the ref types events in the current frame by computing an actual global ordering of ref type events based on statistics of the current frame and determining a closest ordering G to the actual one from the codebook of pre-computed event orderings, estimating the cost of coding prediction differences between ref types and predicted ref types by selecting a VLC table set based on the number of possible ref type events, estimating a cost of each VLC table in the selected set, selecting a VLC table with the smallest estimated cost, and adding the VLC index header cost to the selected VLC cost as the total estimate.

Based on the selected technique (e.g., a ref types coding method with the smallest cost from default prediction, modified default prediction, and prediction (e.g., full or advanced prediction)), a header may be encoded (e.g., inter-block reference type coding technique indicator) and the payload may be entropy encoded.

When the picture type is B/F-Picture, process 2300 may continue at operation 2309, "Estimate Cost of Coding of F-picture Inter Ref Types", where bit costs of coding of B/F-pictures inter reference types data may be estimated using seven techniques: VLC with default prediction, VLC with modified default prediction, VLC without prediction, VLCS1 with prediction, VLC with default-like prediction, and VLCS1 with default-like prediction. For example, the following may be performed.

Read frame-level reference types for inter blocks, compute number of possible events for the inter ref types.

Estimate cost of coding ref types based on proxy VLC with default prediction by selecting a VLC table based on the number of possible events and, for each reference type creating prediction from up to 3 neighboring (e.g., neighboring blocks or partitions) ref types, accounting for 1 bit overhead to indicate if prediction is correct; otherwise if incorrect, accounting for the prediction difference using the length of the codeword from the selected VLC table.

Estimate cost of coding ref types based on proxy VLC with modified default prediction by selecting a VLC table based on the number of possible events and, for each reference type creating prediction from up to 3 neighboring ref types, accumulating 1 bit overhead to indicate if prediction is correct into a 1d mask PNP; otherwise if incorrect, accounting for the prediction difference using the length of the codeword from the selected VLC table, estimating a cost of coding PNP mask with a Proxy VLC method (tables 0, 1, 2, and 3), selecting a Proxy VLC table with smallest cost estimate, and adding VLC cost and cost of PNP mask coded with the selected Proxy VLC table as the final cost estimate.

Estimate cost of coding ref types based on proxy VLC without prediction by estimating a cost of each VLC table in the VLC table set for coding ref types without prediction, selecting a VLC table with smallest estimated cost, and adding a cost of VLC index header cost to the selected VLC cost as the total estimate.

In order to use prediction (e.g., full prediction or advanced prediction) estimate a global ordering of the ref types events in the current frame by computing actual global ordering of ref type events based on statistics of the current frame and determining a closest ordering G to the actual one from the codebook of pre-computed event orderings, and predicting ref types using G and neighboring ref types.

Estimate cost of coding reference types with based on proxy VLC with prediction by estimating a cost of coding prediction differences between ref types and predicted ref types by selecting VLC table set based on the number of possible ref type events, estimating a cost of each VLC table in the selected set, selecting a VLC table with smallest estimated cost, and adding a cost of VLC index header cost to the selected VLC cost as the total estimate.

Estimate cost of coding reference types with based on proxy VLCS1 (e.g., with a most frequent symbol coded with a symbol-run coding using prediction) with prediction by estimating a cost of coding prediction differences between ref types and predicted ref types where prediction difference of 0 is coded with symbol-run coding by selecting a VLC table set based on the number of possible ref type events, estimating a cost of coding the zero event vs. non-zero event with symbol-run, removing 0 event from the array of events to code, estimating a cost of each VLC table in the selected set, selecting a VLC table with smallest estimated cost, and adding a cost of VLC index header cost and the skip run cost to the selected VLC cost as the total cost estimate.

Estimate cost of coding reference types with based on proxy VLC with default-prediction by predicting ref types using G and neighboring ref types using the prediction method from the default method, estimating a cost of coding prediction differences between ref types and predicted (default-like prediction) ref types by selecting a VLC table set based on the number of possible ref type events, estimating a cost of each VLC table in the selected set, selecting a VLC table with smallest estimated cost, and adding a cost of VLC index header cost to the selected VLC cost as the total estimate.

Estimate cost of coding reference types with based on proxy VLCS1 with default-prediction by estimating a cost of coding prediction differences between ref types and predicted (default-like prediction) ref types where prediction difference of 0 is coded with symbol-run by selecting a VLC table set based on the number of possible ref type events, estimating a cost of coding the zero event vs. non-zero event with symbol-run, removing 0 event from the array of events to code, estimating a cost of each VLC table in the selected set, selecting VLC table with smallest estimated cost, and adding a cost of VLC index header cost and the skip run cost to the selected VLC cost as the total cost estimate.

Based on the selected technique (e.g., a ref types coding method with the smallest cost), a header may be encoded (e.g., inter-block reference type coding technique indicator) and the payload may be entropy encoded.

Process 2300 may continue from operation 2308 or 2309 at operation 2310, "Determine Best Coding of Inter Ref Types and Perform Encoding", where the best coding of inter reference types may be determined (e.g., based on a smallest bit cost using the described techniques) and the inter reference types may be entropy coded.

Process 2300 may also continue from operation 2301 at operation 2306, "Select VLC table based on max number of Multi Ref Types", where a VLC table may be selected based on a maximum number of multi reference types. For example, a variable length coding table may be selected for the multi-block reference type data based on a number of multi-reference types in the multi-block reference type data. In P-picture examples, the following may be performed: read frame-level reference types for multi blocks, collect 1d array of 2nd reference type for all multi blocks, compute number of possible events for the 2nd multi ref types, select a table with 2 events if the number of events is less or equal to 2, otherwise select a VLC table with 3 events, and (e.g., at operation 2307) encode each multi block ref type event with a codeword from the selected VLC table. In B/F-picture examples, the following may be performed: read frame-level reference types and sub-modes for multi blocks, collect 1d array of 2nd reference type for all multi blocks whose sub-mode is 0, compute number of possible events for the 2nd multi ref types, select a VLC table set according to the possible number of events, estimate cost of each VLC table in the selected set of tables, select the VLC table with minimal cost, and (e.g., at operation 2307) encode each multi event with a codeword from the selected VLC table.

Process 2300 may continue at operation 2307, "Perform Encoding of Multi Ref Types", where, as discussed, the multi reference types may be encoded using the selected or determined technique. For example, as discussed with respect to operations 2306 and 2307, a variable length coding table may be selected for the multi-block reference type data based on a number of multi-reference types in the multi-block reference type data and the multi-block reference type data may be encoded based on the variable length coding table.

Process 2300 may continue from operations 2304, 2307, and 2310 at operation 2311, "Output Bitstream", where the described entropy encoded data may be outputted to a bitstream.

As discussed, modes and reference types may be entropy encoded. For example, the proposed entropy coding may be based on a combination of symbol-run coding, Proxy VLC entropy coding, and bitmap (no compression) coding. Next, details of symbol-run and proxy VLC entropy coding are provided.

A symbol-run entropy coder may operate on regular bitstream or inverted bitstream (e.g., where 0s and 1s are flipped). A symbol-run entropy coder may (attempt to) compress the incoming bitstream by encoding the runs of 0s. In this method each value of '1' along with the run of preceding '0's may be coded as a single codeword. If there is more than 33 consecutive '0's, an escape (ESC) may be coded. After the last value of '1' is coded, an end of block codeword (EOB) may be sent. Table 1 shows example codewords and corresponding addresses (address−1=run of '0' that precedes a '1'), along with an escape (ESC) for runs greater than 33 and an end of block (EOB).

TABLE 1

| Symbol-run sub-method codewords | | |
|---|---|---|
| Code | Address | Codelength |
| 01 | 1 | 2 |
| 001 | 2 | 3 |
| 111 | 3 | 3 |
| 0001 | 4 | 4 |
| 1001 | 5 | 4 |
| 1100 | 6 | 4 |
| 1101 | 7 | 4 |
| 10101 | 8 | 5 |
| 10111 | 9 | 5 |
| 100000 | 10 | 6 |
| 100011 | 11 | 6 |
| 101101 | 12 | 6 |
| 101001 | 14 | 6 |
| 0000001 | 14 | 7 |
| 1000100 | 15 | 7 |
| 0000011 | 16 | 7 |
| 1000101 | 17 | 7 |
| — | — | — |
| 1011001 | 18 | 7 |
| 00000001 | 19 | 8 |
| 10100001 | 20 | 8 |
| 10100010 | 21 | 8 |
| 00000101 | 22 | 8 |
| 10100011 | 23 | 8 |
| 10110001 | 24 | 8 |
| 101000000 | 25 | 9 |
| 000000000 | 26 | 9 |
| 000001001 | 27 | 9 |
| 101100000 | 28 | 9 |
| 000000001 | 29 | 9 |
| 101000001 | 30 | 9 |
| 101100001 | 31 | 9 |
| 0000010000 | 32 | 10 |
| 0000010001 | 33 | 10 |
| 100001 | ESC | 6 |
| 00001 | EOB | 5 |

A Proxy VLC entropy coder may replace each triple of bits in the bitstream with a VLC codeword. It may operate on regular bitstream or inverted bitstream (e.g. where 0s and 1s are flipped). The following tables, labeled collectively as Table 2 provide example tables.

TABLE 2

Proxy VLC entropy coder sub-method codewords

| Bits Triple | VLC | Codelength | Bits Triple | VLC | Codelength |
|---|---|---|---|---|---|
| 000 | 00 | 2 | 100 | 101 | 3 |
| 001 | 010 | 3 | 101 | 110 | 3 |
| 010 | 011 | 3 | 110 | 1110 | 4 |
| 011 | 100 | 3 | 111 | 1111 | 4 |

| Bits Triple | VLC | Codelength | Bits Triple | VLC | Codelength |
|---|---|---|---|---|---|
| 000 | 00 | 2 | 100 | 101 | 3 |
| 001 | 010 | 3 | 101 | 1111 | 4 |
| 010 | 011 | 3 | 110 | 100 | 3 |
| 011 | 1110 | 4 | 111 | 110 | 3 |

| Bits Triple | VLC | Codelength | Bits Triple | VLC | Codelength |
|---|---|---|---|---|---|
| 000 | 00 | 2 | 100 | 101 | 3 |
| 001 | 010 | 3 | 101 | 1111 | 4 |
| 010 | 011 | 3 | 110 | 1110 | 4 |
| 011 | 100 | 3 | 111 | 110 | 3 |

| Bits Triple | VLC | Codelength | Bits Triple | VLC | Codelength |
|---|---|---|---|---|---|
| 000 | 00 | 2 | 100 | 101 | 3 |
| 001 | 010 | 3 | 101 | 110 | 3 |
| 010 | 011 | 3 | 110 | 110 | 3 |
| 011 | 100 | 3 | 111 | 1111 | 4 |

| Bits Triple | VLC | Codelength | Bits Triple | VLC | Codelength |
|---|---|---|---|---|---|
| 000 | 011 | 3 | 100 | 101 | 3 |
| 001 | 010 | 3 | 101 | 110 | 3 |
| 010 | 1111 | 4 | 110 | 1110 | 4 |
| 011 | 100 | 3 | 111 | 00 | 2 |

| Bits Triple | VLC | Codelength | Bits Triple | VLC | Codelength |
|---|---|---|---|---|---|
| 000 | 101 | 3 | 100 | 00 | 2 |
| 001 | 1110 | 4 | 101 | 1111 | 4 |
| 010 | 011 | 3 | 110 | 010 | 3 |
| 011 | 100 | 3 | 111 | 110 | 3 |

In addition to inverted bitstream mode, in the VLC coder case, a differential bitstream mode may also be provided. In such examples, the first bit in the bitstream remains as is, while all other bits are replaced by the differential (modulo 2) between the current bit and the previous one. Once differentials are created, the VLC coder may be applied on the differential bitstream.

Figure 24:
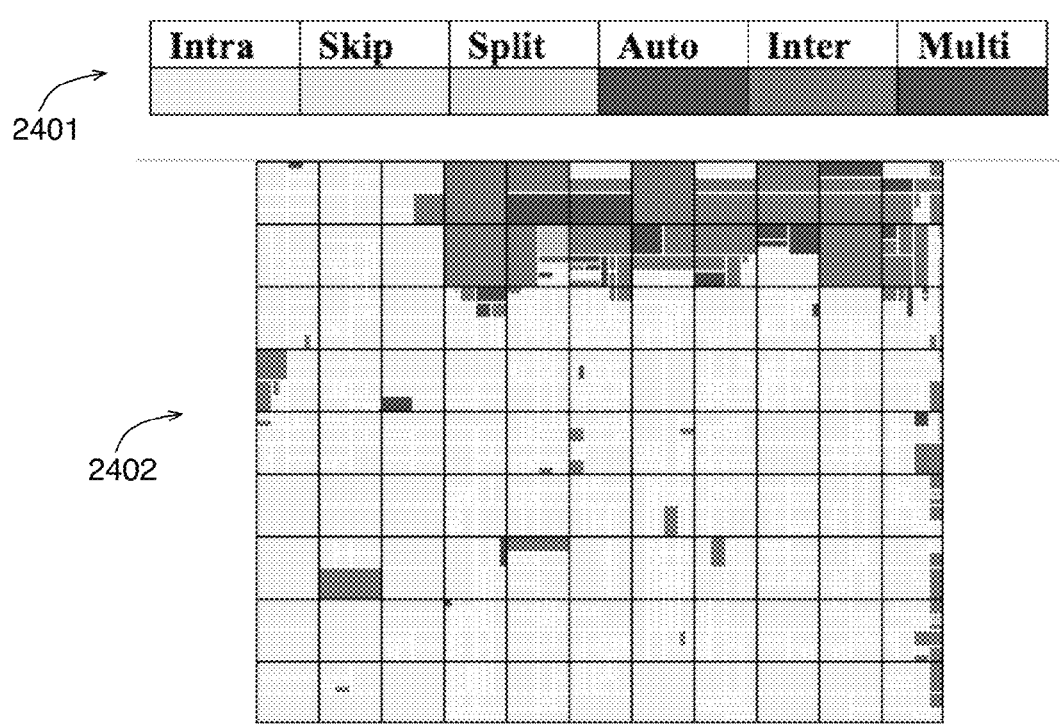
FIG. 24 is an illustrative diagram of example splits and modes for an example P-picture.
Figure 25:
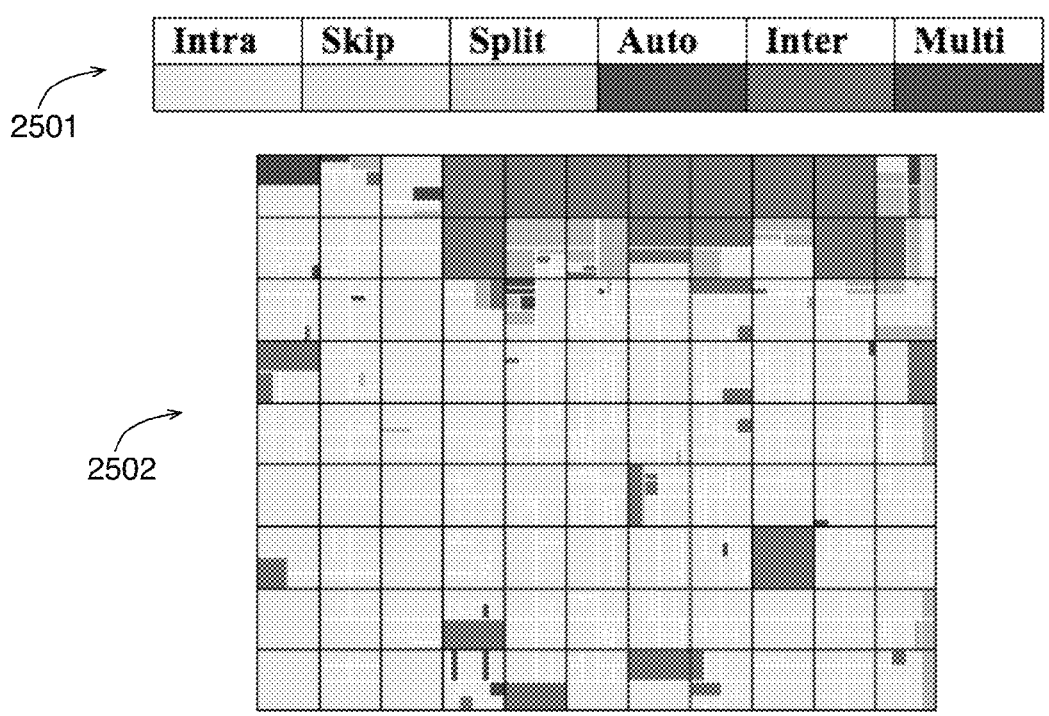
FIG. 25 is an illustrative diagram of example splits and modes for an example P-picture.

As discussed, splits data and modes data may be jointly coded or separately coded. FIG. 24 is an illustrative diagram of example splits and modes 2401 for an example P-picture 2402 and FIG. 25 is an illustrative diagram of example splits and modes 2501 for an example P-picture 2502. FIG. 24 illustrates splits and modes 2401 for example P-picture 2402. In the example of FIG. 24, P-picture 2402 may have a quantizer, Qp, of 8 and a picture order count, POC, of 8. In the example of FIG. 25, P-picture 2502 may have a quantizer, Qp, of 32 and a picture order count, POC, of 8. For example, P-pictures 2402 and 2502 may be example pictures for the football test sequence. The techniques discussed with respect to FIGS. 24 and 25 and tables 3-12 may be associated with coding splits data and modes data for P-pictures, such as, for example, Luma P-pictures.

In joint coding, splits and block modes may be coded as pieces of information together as a collection of events. For example, at each level of the prediction tree, a terminating block may be declared as one of 5 types: Intra, Skip, Auto, Inter or Multi, while if a block does not terminate at that level it may be declared Split. There may be two modes of this method (e.g., indicated via a 1 bit overhead switch). In a first mode (e.g., simple mode), the first level may be coded separately with symbol-run used to code skip vs. non-skip modes and single VLC table to code all other events. The following levels in simple mode may use a fixed single VLC table to code remaining events. Also at each level, after the modes and splits are coded, additional information may be coded that may determine if the split blocks should be split horizontally or vertically (horizontal/vertical data or HV info). In the simple mode of the method, HV info is coded as bitmap (e.g., without compression). A second mode (e.g., regular mode) may use a set of VLC tables to represent each event, at each level. Also at each level, after the modes and splits are coded, additional information may be coded that may determine if the split blocks should be split horizontally or vertically (horizontal/vertical data or HV info). In the regular mode of the method, the coding of HV info is done either as bitmap or with a Proxy VLC, which results in a 1 bit overhead to indicate bitmap or Proxy VLC coding.

In separate coding, all prediction tree splits (e.g., splits data) may be separated from block modes (e.g., modes data) and coded with multi-level entropy coder. For example, the coding may include, for each level in the prediction tree, accumulating split/no-split bits. If tiles are 32×32 pixels there may be up to 6 levels and if tiles are 64×64 there are up to 7 levels possible, for example. Encode each level with an entropy coder (e.g., a basic entropy coder). For example, a basic entropy encoder may be an entropy coder based on a combination of symbol-run coding, proxy VLC entropy coding, and bitmap coding. Symbol-run coding and proxy VLC entropy coding may operate on regular bitstream, an inverted bitstream, or a differential bitstream, thus resulting in a variety of different sub-methods (symbol run on bitstream, symbol run on inverted bitstream, symbol run on differential bitstream, proxy VLC on bitstream, proxy VLC on inverted bitstream, proxy VLC on differential bitstream, and/or bitmap coding). A 2-3 bits switching overhead may be used to indicated the selected sub-method.

For example, the following overhead may be used to switch between the most efficient of the methods: (1) symbol-run, (2) symbol-run on inverted bitstream, (3) Proxy VLC coder, (4) Proxy VLC coder on inverted bitstream, (5) Proxy VLC coder on differential bitstream, and (6) bitmap.

TABLE 3

Example entropy coder switching overhead bits

| Symbol-run Sub-method | Header | Header Code length |
|---|---|---|
| Bitmap | 00 | 2 |
| Symbol-run | 01 | 2 |
| Symbol-run on inverted bitstream | 100 | 3 |
| Proxy VLC coder | 101 | 3 |
| Proxy VLC coder on inverted bitstream | 110 | 3 |
| Proxy VLC coder on differential bitstream | 111 | 3 |

For example, in VLC coding for coding block modes (e.g., modes data), a number of VLC combinations may be constructed based on the statistical analysis. With the given histogram, the VLC combination with lowest bit cost may be selected, and the selection index may be encoded as the header. Then each block mode may be coded with a corresponding codeword from the selected VLC set. The following table shows example VLC combinations and corresponding headers implemented.

TABLE 4

VLC combinations and corresponding headers in
VLC coding method for block modes in P-pictures

| VLC Set Index | Header | Header bit length | Intra Blocks Code | Skip Blocks Code | Split Blocks Code | Auto Blocks Code | Inter Blocks Code | Multi Blocks Code |
|---|---|---|---|---|---|---|---|---|
| 0 | 00 | 2 | — | 1 | — | 000 | 01 | 001 |
| 1 | 01 | 2 | 0000 | 01 | — | 001 | 1 | 0001 |
| 2 | 100 | 3 | — | 01 | — | 000 | 1 | 001 |
| 3 | 101 | 3 | 0000 | 1 | — | 0001 | 01 | 001 |
| 4 | 110 | 3 | 000 | 1 | — | — | 01 | 001 |
| 5 | 111 | 3 | 000 | 01 | — | — | 1 | 001 |

In some examples, to allow for more efficient coding, a combination of VLC coding and a symbol-run coding may be used. For example, in Skip level 1 and VLC method (e.g., coding based on proxy VLC with a most comment event encoded using symbol-run coding), a most common event may be encoded using a symbol-run method, and all of the remaining events may be coded with the VLC. The symbol-run method used to encode the most common event (level 1 event) may be analogous to the methods referred to herein as symbol-run-based entropy coder or elsewhere herein. Example VLC tables used in this method are shown in the following table.

TABLE 5

VLC combinations and corresponding headers in Skip Level
1 and VLC coding method for block modes in P-pictures

| VLC Set Index | Header | Header bit length | Intra Blocks Code | Skip Blocks Code | Split Blocks Code | Auto Blocks Code | Inter Blocks Code | Multi Blocks Code |
|---|---|---|---|---|---|---|---|---|
| 0 | 2 | 00 | — | — | — | — | — | — |
| 1 | 2 | 01 | — | — | — | 00 | 1 | 01 |
| 2 | 2 | 10 | — | — | — | 0 | 1 | — |
| 3 | 3 | 110 | 000 | 1 | — | 001 | — | 01 |
| 4 | 3 | 111 | 000 | 1 | — | 01 | — | 001 |

In some examples, it is more efficient to proceed and code one additional event with symbol-run coder (e.g., the second most frequent event). In Skip level 1 and Skip level 2 and VLC method (e.g., coding based on proxy VLC with a most comment event and a second most common event encoded using symbol-run coding), the two most common events may be encoded using symbol-run method, and all of the remaining events may be coded with the VLC. Again, the symbol-run method used to encode the two most common events (level 1 and level 2 event) may be analogous to the symbol-run-based entropy coder methods discussed herein. Example VLC tables used in this method are shown in the following table.

TABLE 6

VLC combinations and corresponding headers in Skip Level 1 and Skip
Level 2 and VLC coding method for block modes in P-pictures

| VLC Set Index | Header | Header bit length | Intra Blocks Code | Skip Blocks Code | Split Blocks Code | Auto Blocks Code | Inter Blocks Code | Multi Blocks Code |
|---|---|---|---|---|---|---|---|---|
| 0 | 00 | 2 | 0 | — | — | 1 | — | — |
| 1 | 01 | 2 | 0 | — | — | — | — | 1 |
| 2 | 10 | 2 | 1 | — | — | 00 | — | 01 |
| 3 | 110 | 3 | — | 0 | — | 1 | — | — |
| 4 | 111 | 3 | — | 0 | — | 1 | — | — |

Paragraph after Table

As discussed, in coding block modes, estimated bit costs may be made for with or without prediction. For example, block modes may often be spatially correlated such that it may be advantageous to create a spatial prediction mechanism to reduce bit cost. For example, the prediction may be performed using modes of the previously decoded neighboring blocks immediately to the left, top, top-left and top-right of the current block.

In some examples, prediction may be performed as follows. At each event, a probable ordering of (mode) events may be determined. For example, mode events may be ordered from most likely to least likely. For example, suppose that at some block (or partition) B, it is determined that Auto blocks (index 3) are most likely, that Intra blocks (index 0) are second most likely, that Inter blocks (index 4) are third most likely, that Multi (5) are fourth most likely, that Skip (1) are fifth most likely, and that Split (2) are the sixth most likely (e.g., least likely). A probable ordering of mode events may then be determined as: 3, 0, 4, 5, 1, 2.

If the actual event at block B is Intra (index 0), the index of the Intra event in the local probable ordering may be coded, which, in this example, is equal to 1. On the other hand if the actual event at B was indeed Auto (index 3) (e.g., anticipated as the most likely event), an index of 0 may be coded. In some examples, the prediction (e.g., probable ordering of events) may be off. For example, if the event at block B is Skip (index 1), an index of 4 may be coded, which is a higher index value. For example, if the prediction is good, the indices that need to be coded will have peaky distribution with 0 being most common, 1 being the second most common, 2 being the third most common, and so on. In this method, the VLC codewords are assigned to the prediction-based indices rather than actual events.

For example, in such examples, modes data (e.g., separately coding of modes data) may include determining a probable ordering of mode events including available modes being ordered from most likely to least likely, determining an actual mode event at a block of a video frame, and coding the actual mode event as the index of the actual mode event in the probable ordering of modes events.

As discussed, a probably ordering of modes events may be used to code modes data. The probably ordering of modes events (e.g., a localized probably ordering of modes events) may be generated as follows. Prior to prediction, a best suitable global ordering of events may be generated or selected from an empirically derived set of likely orderings that work globally (e.g., on blocks of an entire frame). A global ordering may therefore refer to an ordering that closely resembles statistics (histogram) of the modes in an entire frame (or sequence of frames or the like). A most suitable global ordering may be selected and coded with a small VLC. In some examples, the following global orderings (shown along with their VLC code) may be available to select from:

TABLE 7

Global ordering of Frequency of occurrence of Modes, and VLC codes for prediction of block modes in P-pictures

| Index | Global Ordering of Frequency of occurrence of Modes | VLC Codeword |
|---|---|---|
| 0 | 4 1 0 3 5 2 | 0000 |
| 1 | 4 0 1 5 3 2 | 0001 |
| 2 | 4 0 1 3 5 2 | 0010 |
| 3 | 0 4 1 3 5 2 | 0011 |
| 4 | 4 1 5 3 0 2 | 0100 |
| 5 | 4 1 3 5 0 2 | 0101 |
| 6 | 4 1 5 0 3 2 | 0110 |

TABLE 7-continued

Global ordering of Frequency of occurrence of Modes, and VLC codes for prediction of block modes in P-pictures

| Index | Global Ordering of Frequency of occurrence of Modes | VLC Codeword |
|---|---|---|
| 7 | 1 4 5 3 0 2 | 0111 |
| 8 | 4 1 3 0 5 2 | 1000 |
| 9 | 4 5 1 3 0 2 | 1001 |
| 10 | 4 0 5 1 3 2 | 1010 |
| 11 | 4 0 5 3 1 2 | 1011 |
| 12 | 4 1 0 5 3 2 | 1100 |
| 13 | 4 3 1 0 5 2 | 1101 |
| 14 | 4 5 1 0 3 2 | 11100 |
| 15 | 1 4 0 3 5 2 | 11101 |
| 16 | 1 4 3 5 0 2 | 11110 |
| 17 | 1 5 4 3 0 2 | 11111 |

After a global ordering has been set, prediction may proceed for each event (e.g., each block or partition). At a given block or partition known (e.g., previously encoded/decoded) events of the direct neighboring blocks or partitions may be flagged. For example, direct neighboring blocks may include blocks that touch the border of the current block. Typically, such neighboring blocks may include previously decoded blocks to the left, top, top-left and sometimes top-right of the current block. The flagged events (e.g., events that occur at neighboring blocks) form a first group, while the remaining events (e.g., available events that did not occur at neighboring events) form a second group of events. Then, within each group (e.g., the first group and the second group), events are ordered according to the global ordering. The actual localized probable ordering may then be formed by concatenating the first and second groups of events.

For example, let the global ordering for a given frame be 4, 0, 1, 3, 5, 2. Further, suppose that at block B the neighboring blocks have events Auto (index 3) and Inter (index 4). Then the first group is (3, 4), while the second group is (0, 1, 2, 5). Each group may be ordered by the global ordering so they become (4, 3) and (0, 1, 5, 2) respectively. The final localized probable ordering for block B may then be formed via concatenating the first and second groups as 4, 3, 0, 1, 5, 2. Once the (local) probable ordering is derived, the prediction is coded as the index of the actual event in that ordering, as discussed above.

As discussed, in prediction methods, the prediction indices may be coded instead of actual events (e.g., mode events). For example, the indices may have more peaky distribution and can be therefore coded with VLCs more efficiently. The following table shows an example of such case (Qp=8):

TABLE 8

Comparison of histograms of events with (right table) and without prediction (left table). In this case prediction is more peaky yielding better compression

| Event | Count | Prediction Index | Count |
|---|---|---|---|
| Intra | 593 | 0 | 693 |
| Inter | 326 | 1 | 243 |
| Skip | 75 | 2 | 52 |
| Auto | 31 | 3 | 37 |
| Multi | 0 | 4 | 0 |
| Split | 0 | 5 | 0 |

The prediction indices may be coded like events by choosing the best suitable VLC combination from available VLC combinations. For example, the following VLC tables may be implemented with the described method:

TABLE 9

VLC combinations and corresponding headers in Prediction and VLC coding method for block modes in P-pictures

| VLC Set Index | Header | Header bit length | Pred. Index 0 | Pred. Index 1 | Pred. Index 2 | Pred. Index 3 | Pred. Index 4 | Pred. Index 5 |
|---|---|---|---|---|---|---|---|---|
| 0 | 0 | 1 | 1 | 01 | 001 | 0000 | 0001 | — |
| 1 | 1 | 1 | 1 | 01 | 000 | 001 | — | — |

As discussed herein with respect to examples without prediction, in examples using prediction, it may be more efficient to code the most common event (likely prediction index 0) with a symbol-run coder, such as Prediction, Skip level 1 and VLC method (e.g., coding based on proxy variable length coding with a most frequent symbol coded with a symbol-run coding using prediction). Using the prediction described earlier, prediction indices may be obtained for each block (of a video frame or a portion of a video frame or the like). In analogy to the non-prediction case (e.g., Skip level 1 and VLC), the most frequent index may be isolated and coded with a symbol-run-based entropy coder as discussed herein. The remaining prediction indices may be coded using the best available VLC table of a number of available tables. For example, the following VLC tables may be implemented with the described method:

TABLE 10

VLC combinations and corresponding headers in Prediction, Skip Level 1 and VLC coding method for block modes in P-pictures

| VLC Set Index | Header | Header bit length | Pred. Index 0 | Pred. Index 1 | Pred. Index 2 | Pred. Index 3 | Pred. Index 4 | Pred. Index 5 |
|---|---|---|---|---|---|---|---|---|
| 0 | 0 | 1 | — | 1 | 01 | 000 | 001 | — |
| 1 | 10 | 2 | — | 1 | 00 | 01 | — | — |
| 2 | 11 | 2 | — | 0 | 1 | — | — | — |

In some examples (as with the examples without prediction), it may be more efficient to proceed and code one additional prediction index with symbol-run coder (e.g. the second most frequent event). In the example of Prediction, Skip level 1 and Skip level 2 and VLC method (e.g., coding based on proxy variable length coding with a most frequent symbol and a second most frequent symbol coded with a symbol-run coding using prediction), the two most common prediction indices (e.g., events) may be encoded using symbol-run coding, while remaining indices (e.g., events) may be coded with the VLC coding. The symbol-run method may be analogous or the same as the symbol-run-based entropy coding discussed herein. For example, the following VLC tables may be implemented with the described method:

TABLE 11

VLC combinations and corresponding headers in Prediction, Skip Level 1 and Skip Level 2 and VLC coding method for block modes in P-pictures

| VLC Set Index | Header | Header bit length | Pred. Index 0 | Pred. Index 1 | Pred. Index 2 | Pred. Index 3 | Pred. Index 4 | Pred. Index 5 |
|---|---|---|---|---|---|---|---|---|
| 0 | 0 | 1 | — | — | 0 | 1 | — | — |
| 1 | 1 | 1 | — | — | 1 | 00 | 01 | — |

As discussed, in order to get the most efficient coding cost, the best of the previously described methods may be chosen (e.g., the one that yields the smallest bit cost) and the switch information may be coded as an overhead. For example, encoding the modes data may be based on a lowest bit cost and the bitstream may include a joint or separate coding header and/or a separate modes data coding technique indicator indicating the selected coding technique. For example, the following headers may be used to switch to the chosen method at the decoder:

TABLE 12

Headers used for switching the selected method for coding block modes in P-pictures

| Method | Header Code | Header Code length |
|---|---|---|
| Joint Splits and Modes | 0 | 1 |
| VLC Only | 100 | 3 |
| Skip Level 1 and VLC | 101 | 3 |
| Skip Level 1 and Skip Level 2 and VLC | 1100 | 4 |
| Prediction and VLC | 1101 | 4 |
| Prediction, Skip Level 1 and VLC | 1110 | 4 |
| Prediction, Skip Level 1 and Skip Level 2 and VLC | 1111 | 4 |

Figure 26:
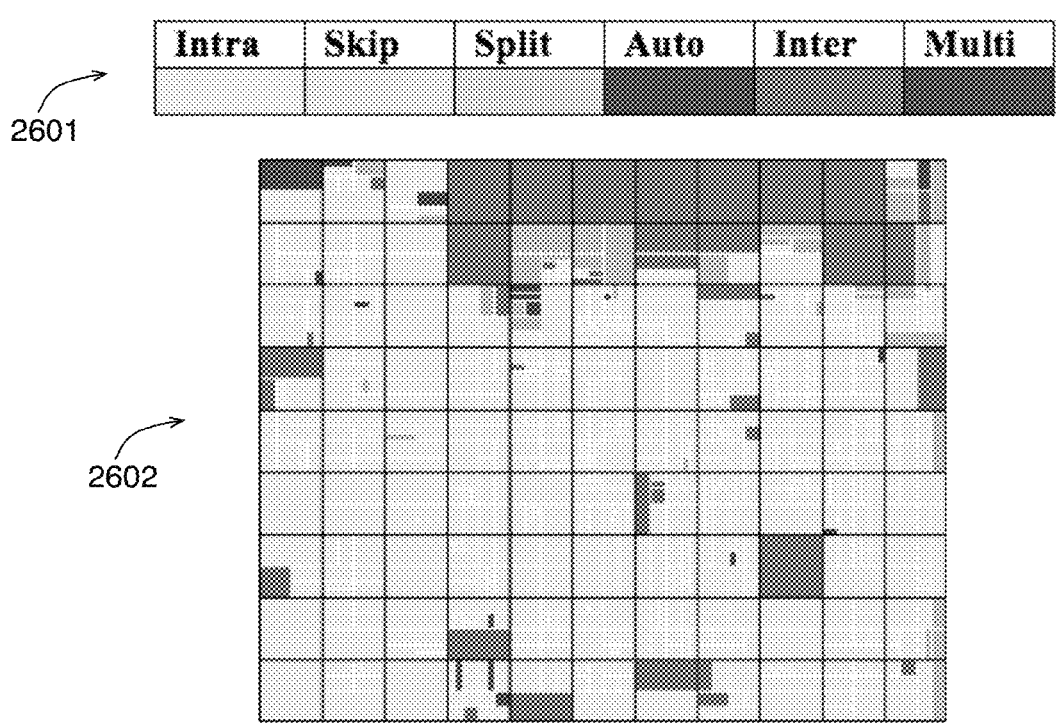
FIG. 26 is an illustrative diagram of example splits and modes for an example B/F-picture.
Figure 27:
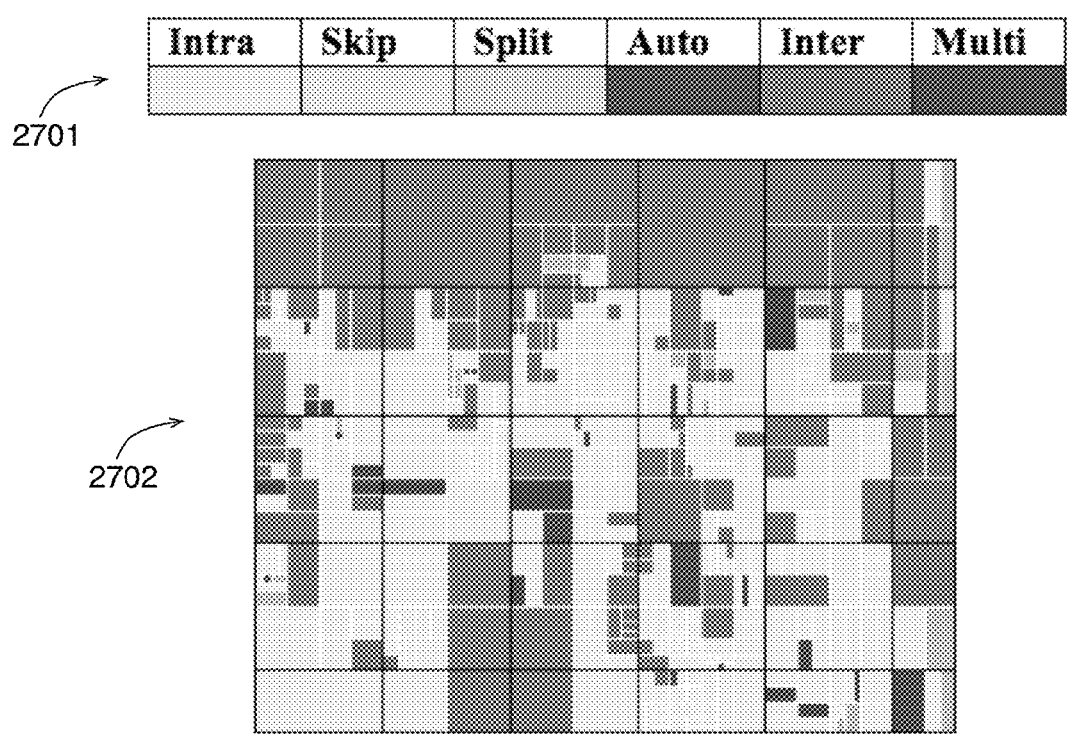
FIG. 27 is an illustrative diagram of example splits and modes for an example B/F-picture.

As discussed, splits data and modes data may be jointly coded or separately coded. FIG. 26 is an illustrative diagram of example splits and modes 2601 for an example B/F-picture 2602 and FIG. 27 is an illustrative diagram of example splits and modes 2701 for an example B/F-picture 2702. FIG. 26 illustrates splits and modes 2601 for example B/F-picture 2602. In the example of FIG. 26, B/F-picture 2602 may have a quantizer, Qp, of 8 and a picture order count, POC, of 4. In the example of FIG. 27, B/F-picture 2702 may have a quantizer, Qp, of 32 and a picture order count, POC, of 4. For example, F-pictures 2602 and 2702 may be example pictures for the football test sequence. The techniques discussed with respect to FIGS. 26 and 27 and tables 13-21 may be associated with coding splits data and modes data for B/F-pictures, such as, for example, Luma B/F-pictures.

As discussed above with respect to P-pictures, in joint coding B/F-pictures, splits and block modes may be coded as pieces of information together as a collection of events. For example, at each level of the prediction tree, a terminating block may be declared as one of 5 types: Intra, Skip, Auto, Inter or Multi, while if a block does not terminate at that level it may be declared Split. There may be two modes of this method (e.g., indicated via a 1 bit overhead switch). In a first mode (e.g., simple mode), the first level may be coded separately with symbol-run used to code skip vs. non-skip modes and single VLC table to code all other events. The following levels in simple mode may use a fixed single VLC table to code remaining events. Also at each level, after the modes and splits are coded, additional information may be coded that may determine if the split blocks should be split horizontally or vertically (horizontal/vertical data or HV info). In the simple mode of the method, HV info is coded as bitmap (e.g., without compression). A second mode (e.g., regular mode) may use a set of VLC tables to represent each event, at each level. Also at each level, after the modes and splits are coded, additional information may be coded that may determine if the split blocks should be split horizontally or vertically (horizontal/vertical data or HV info). In the regular mode of the method, the coding of HV info is done either as bitmap or with a Proxy VLC, which results in a 1 bit overhead to indicate bitmap or Proxy VLC coding.

Also as discussed above with respect to P-pictures, in separate coding of B/F-pictures, all prediction tree splits (e.g., splits data) may be separated from block modes (e.g., modes data) and coded with multi-level entropy coder. For example, the coding may include, for each level in the prediction tree, accumulating split/no-split bits. If tiles are 32×32 pixels there may be up to 6 levels and if tiles are 64×64 there are up to 7 levels possible, for example. Encode each level with an entropy coder (e.g., a basic entropy coder). For example, a basic entropy encoder may be an entropy coder based on a combination of symbol-run coding, proxy VLC entropy coding, and bitmap coding. Symbol-run coding and proxy VLC entropy coding may operate on regular bitstream, an inverted bitstream, or a differential bitstream, thus resulting in a variety of different sub-methods (symbol run on bitstream, symbol run on inverted bitstream, symbol run on differential bitstream, proxy VLC on bitstream, proxy VLC on inverted bitstream, proxy VLC on differential bitstream, and/or bitmap coding). A 2-3 bits switching overhead may be used to indicated the selected sub-method.

For example, overhead may be used to switch between the most efficient of the methods: (1) symbol-run, (2) symbol-run on inverted bitstream, (3) Proxy VLC coder, (4) Proxy VLC coder on inverted bitstream, (5) Proxy VLC coder on differential bitstream, and (6) bitmap, as shown above with respect to Table 3.

For example, in VLC coding for coding block modes (e.g., modes data), a number of VLC combinations may be constructed based on the statistical analysis. With the given histogram, the VLC combination with lowest bit cost may be selected, and the selection index may be encoded as the header. Then each block mode may be coded with a corresponding codeword from the selected VLC set. The following table shows example VLC combinations and corresponding headers implemented.

TABLE 13

VLC combinations and corresponding headers in VLC-only coding method for block modes in B/F-pictures

| VLC Set Index | Header | Header bit length | Intra Blocks Code | Skip Blocks Code | Split Blocks Code | Auto Blocks Code | Inter Blocks Code | Multi Blocks Code |
|---|---|---|---|---|---|---|---|---|
| 0 | 00  | 2 | —    | 1  | — | 000  | 01 | 001  |
| 1 | 01  | 2 | 0000 | 01 | — | 001  | 1  | 0001 |
| 2 | 100 | 3 | —    | 01 | — | 000  | 1  | 001  |
| 3 | 101 | 3 | 0000 | 1  | — | 0001 | 01 | 001  |
| 4 | 110 | 3 | 000  | 1  | — | —    | 01 | 001  |
| 5 | 111 | 3 | 000  | 01 | — | —    | 1  | 001  |

In some examples, to allow for more efficient coding, a combination of VLC coding and a symbol-run coding may be used. For example, in Skip level 1 and VLC method (e.g., coding based on proxy VLC with a most comment event encoded using symbol-run coding), a most common event may be encoded using a symbol-run method, and all of the remaining events may be coded with the VLC. The symbol-run method used to encode the most common event (level 1 event) may be analogous to the methods referred to herein as symbol-run-based entropy coder or elsewhere herein. Example VLC tables used in this method are shown in the following table.

TABLE 14

VLC combinations and corresponding headers in Skip Level 1 and VLC coding method for block modes in B/F-pictures

| VLC Set Index | Header | Header bit length | Intra Blocks Code | Skip Blocks Code | Split Blocks Code | Auto Blocks Code | Inter Blocks Code | Multi Blocks Code |
|---|---|---|---|---|---|---|---|---|
| 0 | 2 | 00  | —   | — | — | —   | —  | —   |
| 1 | 2 | 01  | —   | — | — | 00  | 1  | 01  |
| 2 | 2 | 10  | —   | — | — | 0   | 1  | —   |
| 3 | 3 | 110 | 000 | 1 | — | 001 | —  | 01  |
| 4 | 3 | 111 | 000 | 1 | — | 01  | —  | 001 |

In some examples, it is more efficient to proceed and code one additional event with symbol-run coder (e.g., the second most frequent event). In Skip level 1 and Skip level 2 and VLC method (e.g., coding based on proxy VLC with a most comment event and a second most common event encoded using symbol-run coding), the two most common events may be encoded using symbol-run method, and all of the remaining events may be coded with the VLC. Again, the symbol-run method used to encode the two most common events (level 1 and level 2 event) may be analogous to the symbol-run-based entropy coder methods discussed herein. Example VLC tables used in this method are shown in the following table.

TABLE 15

VLC combinations and corresponding headers in Skip Level 1 and Skip Level 2 and VLC coding method for block modes in B/F-pictures

| VLC Set Index | Header | Header bit length | Intra Blocks Code | Skip Blocks Code | Split Blocks Code | Auto Blocks Code | Inter Blocks Code | Multi Blocks Code |
|---|---|---|---|---|---|---|---|---|
| 0 | 00  | 2 | 0 | — | — | 1  | — | — |
| 1 | 01  | 2 | 0 | — | — | —  | — | 1 |
| 2 | 10  | 2 | 1 | — | — | 00 | — | 01 |
| 3 | 110 | 3 | — | 0 | — | 1  | — | — |
| 4 | 111 | 3 | — | 0 | — | 1  | — | — |

As discussed, in coding block modes, estimated bit costs may be made for with or without prediction. For example, block modes may often be spatially correlated such that it may be advantageous to create a spatial prediction mechanism to reduce bit cost. For example, the prediction may be performed using modes of the previously decoded neighboring blocks immediately to the left, top, top-left and top-right of the current block.

In some examples, prediction may be performed as follows discussed above with respect to P-pictures: at each event and a probable ordering of events may be determined (e.g., mode events may be ordered from most likely to least likely). As discussed, the actual event at a block may be coded based on it's index in the ordering of events and the VLC codewords may be assigned to the prediction-based indices rather than actual events. For example, in such examples, modes data (e.g., separately coding of modes data) may include determining a probable ordering of mode events including available modes being ordered from most likely to least likely, determining an actual mode event at a block of a video frame, and coding the actual mode event as the index of the actual mode event in the probable ordering of modes events.

As discussed, a probably ordering of modes events may be used to code modes data. The probably ordering of modes events (e.g., a localized probably ordering of modes events) may be generated as discussed above with respect to P-pictures: prior to prediction, a best suitable global ordering of events may be generated or selected from an empirically derived set of likely orderings that work globally (e.g., on blocks of an entire frame), for example, a most suitable global ordering may be selected and coded with a small VLC. In some examples, the following global orderings (shown along with their VLC code) may be available to select from:

TABLE 16

Global ordering and VLC codes for prediction of block modes in B/F-pictures

| Index | Global Ordering | VLC Codeword |
|---|---|---|
| 0 | 4 1 0 3 5 2 | 0000 |
| 1 | 4 0 1 5 3 2 | 0001 |
| 2 | 4 0 1 3 5 2 | 0010 |
| 3 | 0 4 1 3 5 2 | 0011 |
| 4 | 4 1 5 3 0 2 | 0100 |
| 5 | 4 1 3 5 0 2 | 0101 |
| 6 | 4 1 5 0 3 2 | 0110 |

TABLE 16-continued

Global ordering and VLC codes for prediction of block modes in B/F-pictures

| Index | Global Ordering | VLC Codeword |
|---|---|---|
| 7  | 1 4 5 3 0 2 | 0111 |
| 8  | 4 1 3 0 5 2 | 1000 |
| 9  | 4 5 1 3 0 2 | 1001 |
| 10 | 4 0 5 1 3 2 | 1010 |
| 11 | 4 0 5 3 1 2 | 1011 |
| 12 | 4 1 0 5 3 2 | 1100 |
| 13 | 4 3 1 0 5 2 | 1101 |
| 14 | 4 5 1 0 3 2 | 11100 |
| 15 | 1 4 0 3 5 2 | 11101 |
| 16 | 1 4 3 5 0 2 | 11110 |
| 17 | 1 5 4 3 0 2 | 11111 |

As discussed above, after a global ordering has been set, prediction may proceed for each event (e.g., each block or partition). At a given block or partition known (e.g., previously encoded/decoded) events of the direct neighboring blocks or partitions may be flagged. For example, direct neighboring blocks may include blocks that touch the border of the current block. Typically, such neighboring blocks may include previously decoded blocks to the left, top, top-left and sometimes top-right of the current block. The flagged events (e.g., events that occur at neighboring blocks) form a first group, while the remaining events (e.g., available events that did not occur at neighboring events) form a second group of events. Then, within each group (e.g., the first group and the second group), events are ordered according to the global ordering. The actual localized probable ordering may then be formed by concatenating the first and second groups of events.

As discussed, in prediction methods, the prediction indices may be coded instead of actual events (e.g., mode events). For example, the indices may have more peaky distribution and can be therefore coded with VLCs more efficiently. The following table shows an example of such case (Qp=8):

TABLE 17

Comparison of histograms of events with (right table) and without prediction (left table). In this case prediction is more peaky yielding better compression

| Event | Count | Prediction Index | Count |
|---|---|---|---|
| Intra | 593 | 0 | 693 |
| Inter | 326 | 1 | 243 |
| Skip | 75 | 2 | 52 |
| Auto | 31 | 3 | 37 |
| Multi | 0 | 4 | 0 |
| Split | 0 | 5 | 0 |

The prediction indices may be coded like events by choosing the best suitable VLC combination from available VLC combinations. For example, the following VLC tables may be implemented with the described method:

TABLE 18

VLC combinations and corresponding headers in Prediction and VLC coding method for block modes in F-pictures

| VLC Set Index | Header | Header bit length | Pred. Index 0 | Pred. Index 1 | Pred. Index 2 | Pred. Index 3 | Pred. Index 4 | Pred. Index 5 |
|---|---|---|---|---|---|---|---|---|
| 0 | 0 | 1 | 1 | 01 | 001 | 0000 | 0001 | — |
| 1 | 1 | 1 | 1 | 01 | 000 | 001 | — | — |

As discussed herein with respect to examples without prediction, in examples using prediction, it may be more efficient to code the most common event (likely prediction index 0) with a symbol-run coder, such as Prediction, Skip level 1 and VLC method (e.g., coding based on proxy variable length coding with a most frequent symbol coded with a symbol-run coding using prediction). Using the prediction described earlier, prediction indices may be obtained for each block (of a video frame or a portion of a video frame or the like). In analogy to the non-prediction case (e.g., Skip level 1 and VLC), the most frequent index may be isolated and coded with a symbol-run-based entropy coder as discussed herein. The remaining prediction indices may be coded using the best available VLC table of a number of available tables. For example, the following VLC tables may be implemented with the described method:

TABLE 19

VLC combinations and corresponding headers in Prediction, Skip Level 1 and VLC coding method for block modes in B/F-pictures

| VLC Set Index | Header | Header bit length | Pred. Index 0 | Pred. Index 1 | Pred. Index 2 | Pred. Index 3 | Pred. Index 4 | Pred. Index 5 |
|---|---|---|---|---|---|---|---|---|
| 0 | 0 | 1 | — | 1 | 01 | 000 | 001 | — |
| 1 | 10 | 2 | — | 1 | 00 | 01 | — | — |
| 2 | 11 | 2 | — | 0 | 1 | — | — | — |

In some examples (as with the examples without prediction), it may be more efficient to proceed and code one additional prediction index with symbol-run coder (e.g. the second most frequent event). In the example of Prediction, Skip level 1 and Skip level 2 and VLC method (e.g., coding based on proxy variable length coding with a most frequent symbol and a second most frequent symbol coded with a symbol-run coding using prediction), the two most common prediction indices (e.g., events) may be encoded using symbol-run coding, while remaining indices (e.g., events) may be coded with the VLC coding. The symbol-run method may be analogous or the same as the symbol-run-based entropy coding discussed herein. For example, the following VLC tables may be implemented with the described method:

TABLE 20

VLC combinations and corresponding headers in Prediction, Skip Level 1 and Skip Level 2 and VLC coding method for block modes in B/F-pictures

| VLC Set Index | Header | Header bit length | Pred. Index 0 | Pred. Index 1 | Pred. Index 2 | Pred. Index 3 | Pred. Index 4 | Pred. Index 5 |
|---|---|---|---|---|---|---|---|---|
| 0 | 0 | 1 | — | — | 0 | 1 | — | — |
| 1 | 1 | 1 | — | — | 1 | 00 | 01 | — |

As discussed, in order to get the most efficient coding cost, the best of the previously described methods may be chosen (e.g., the one that yields the smallest bit cost) and the switch information may be coded as an overhead. For example, encoding the modes data may be based on a lowest bit cost and the bitstream may include a joint or separate coding header and/or a separate modes data coding technique indicator indicating the selected coding technique. For example, the following headers may be used to switch to the chosen method at the decoder:

TABLE 21

Headers used for switching the selected method for coding block modes in B/F-pictures

| Method | Header Code | Header Code length |
|---|---|---|
| Joint Splits and Modes | 0 | 1 |
| VLC Only | 100 | 3 |
| Skip Level 1 and VLC | 101 | 3 |
| Skip Level 1 and Skip Level 2 and VLC | 1100 | 4 |
| Prediction and VLC | 1101 | 4 |
| Prediction, Skip Level 1 and VLC | 1110 | 4 |
| Prediction, Skip Level 1 and Skip Level 2 and VLC | 1111 | 4 |

Figure 28:
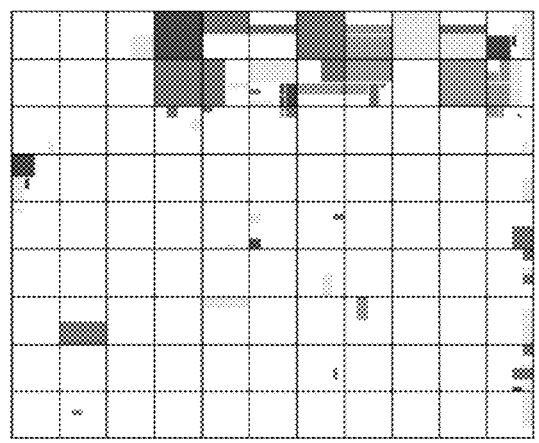
FIG. 28 is an illustrative diagram of example inter block reference types for an example P-picture.
Figure 29:
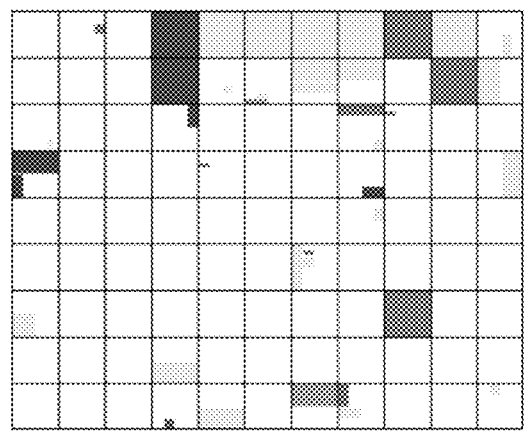
FIG. 29 is an illustrative diagram of example inter block reference types for an example P-picture.

As discussed, inter-block reference types data may be coded by choosing a lowest bit cost coding method (e.g., from three methods for P-pictures and from seven methods for B/F-pictures) and encoding the inter-block reference types data using the selected coding method. FIG. 28 is an illustrative diagram of example inter block reference types 2801 for an example P-picture 2802 and FIG. 29 is an illustrative diagram of example inter block reference types 2901 for an example P-picture 2902. FIG. 28 illustrates inter block reference types 2801 for example P-picture 2802. In the example of FIG. 28, P-picture 2802 may have a quantizer, Qp, of 8 and a picture order count, POC, of 8. In the example of FIG. 29, P-picture 2902 may have a quantizer, Qp, of 32 and a picture order count, POC, of 8. For example, P-pictures 2802 and 2902 may be example pictures for the football test sequence. The techniques discussed with respect to FIGS. 28 and 29 and tables 22-30 may be associated with coding inter block reference types data for P-pictures.

As discussed, in some examples, in coding inter block reference types data for P-pictures, three methods may be evaluated: coding based on proxy variable length coding using default prediction, coding based on proxy variable length coding using modified default prediction, and coding based on proxy variable length coding using prediction. In other examples, three different methods may be evaluated and/or more methods may be evaluated. In the following discussion a variety of coding methods are discussed, any or all of which may be evaluated to determine a most efficient coding technique.

For example, the default prediction may include a simplified prediction-based method. For example, the frequency of events may be assumed to be in a decreasing order such that the task of prediction and VLC assignment may be simplified. In such a method, prediction may be performed by examining the neighbors of the current block (e.g., top, left, and top-left neighbors of the current block). The prediction method may select a single prediction value for the current block. If the predicted and actual value of the block are equal, one bit (e.g., '0') may be spent to signal that the prediction was successful. If the prediction was not successful, then after 1-bit of overhead (e.g., '1'), a VLC may be selected to represent the actual value of the block. Note that the number of possible values for the actual value may be, at this point, one less since the predicted value may be discarded from the set of possible events. For example, there may be four VLC tables used and switching may be automatically performed based on the frame index, as follows:

TABLE 22

VLC codes used for coding the prediction-based events in P-picture reference types coding

| Num of Prev I/P Frames | Event 1 | Event 2 | Event 3 | Event 4 | Event 5 | Event 6 | Event 7 | Event 8 | Event 9 |
|---|---|---|---|---|---|---|---|---|---|
| 1 | 01 | 10 | 00 | 111 | 110 | — | — | — | — |
| 2 | 01 | 10 | 00 | 110 | 1111 | 1110 | — | — | — |
| 3 | 01 | 00 | 110 | 101 | 100 | 1111 | 1110 | — | — |
| 4+ | 111 | 110 | 011 | 101 | 100 | 001 | 010 | 000 | — |

In modified default prediction, a similar method may be used, but the overhead bits signifying whether or not the prediction was correct may be collected into a bitmask, which may be coded using Proxy VLC with a selected table.

In some examples a VLC only method for coding inter-block reference types data may be evaluated and/or used. For example, in the VLC only method, a number of VLC combinations may be constructed based on a statistical analysis. With a given histogram, the VLC combination with lowest bit cost may be selected, and the selection index may be encoded as a header. In such examples, each reference type may be coded with a corresponding codeword from the selected VLC set. The following table shows example VLC combinations and corresponding headers implemented:

TABLE 23

VLC combinations and corresponding headers in VLC-only coding method for inter block reference types in P-pictures

| VLC Index | Hdr | Hdr bitlen | Past None | MRF1 None | MRF2 None | MRF3 None | Past SR1 | Past SR2 | Past SR3 | Past GMC | Past Gain |
|---|---|---|---|---|---|---|---|---|---|---|---|
| 0 | 00 | 2 | 1 | 0001 | — | — | 011 | 001 | 0100 | 0000 | 0101 |
| 1 | 01 | 2 | 1 | 00001 | 000000 | 000001 | 010 | 001 | 0001 | 011 | — |
| 2 | 10 | 2 | 1 | 00001 | — | — | 010 | 011 | 0001 | 001 | 00000 |
| 3 | 11 | 2 | 1 | 001 | 011 | — | 000 | 0101 | 01001 | 010000 | 010001 |

In some examples a skip level 1 and VLC method (e.g., coding based on proxy variable length coding with a most frequent symbol coded with a symbol-run coding) for coding inter-block reference types data may be evaluated and/or used. For example, to allow for more efficient coding, a VLC coding and symbol-run method (e.g., a Skip level 1 and VLC method) such that the most common event is encoded using symbol-run method and all of the remaining events are coded with the VLC may be used. The symbol-run method used to encode the most common event (e.g., the level 1 event) may be analogous to the methods including the symbol-run-based entropy coding methods described earlier. Example VLC tables used in this method are shown as follows:

TABLE 24

VLC combinations and corresponding headers in Skip Level 1 and VLC coding method for inter block reference types in P-pictures

| VLC Index | Hdr | Hdr bitlen | Past None | MRF1 None | MRF2 None | MRF3 None | Past SR1 | Past SR2 | Past SR3 | Past GMC | Past Gain |
|---|---|---|---|---|---|---|---|---|---|---|---|
| 0 | 0 | 1 | — | — | — | — | 01 | 0000 | 0001 | 1 | 001 |
| 1 | 1 | 1 | — | — | — | 0001 | 001 | 1 | — | 01 | 0000 |

In some examples, prediction (e.g., full or advanced prediction) may be used. For example, inter block reference types may be spatially correlated such that it may be advantageous to create a spatial prediction mechanism to reduce bit cost. For example, prediction may be performed using modes or reference types of the previously known (e.g., previously decoded) neighboring blocks immediately to the left, top, top-left and top-right of the current block.

For example, prediction may be performed as follows. At each event, a probable ordering of events is derived, for example, the events may be ordered from most likely to least likely. For example, suppose that at some inter block B we deduce that Past SR2 ref types (index 3) are most likely, then Past P ref types (index 0) are second most likely, then Past SR3 ref types (index 4), then Past GMC (5), Past-Past P (1), Past SR1 (2) and Past Gain (6) (so Past Gain event is least likely). This example gives a probable ordering of 3, 0, 4, 5, 1, 2, 6. If the actual event at block B is Past P (index 0) the index of the Past P event in the local probable ordering may be indexed, which in this example is equal to 1. If the actual event at B was indeed Past SR2 (index 3), which was anticipated as the most likely event, an index of 0 may be coded. If the prediction is less accurate, for example if the event at B is Past Gain (index 6) then a 6 may be coded, which is a higher index value. If the prediction is accurate, the indices that need to be coded will have peaky distribution with 0 being most common, 1 being the second most common, 2 being the third most common, and so on. Therefore, in this method, the VLC codewords may be assigned to the prediction-based indices rather than actual events.

The localized probable ordering at each event may be determined as follows. Prior to prediction, a best suitable global ordering may be determined or selected from an empirically derived set of likely orderings that work globally (e.g., on blocks of the entire frame). As used herein, a global ordering may refer to an ordering that closely resembles statistics (histogram) of the modes in the entire frame. The most suitable global ordering may be selected and coded with a small VLC. The following provides example global orderings (shown along with their VLC code) that may be selected from:

TABLE 25

Global ordering and VLC codes for prediction of inter block reference types in P-pictures

| Index | Global Ordering | VLC Codeword |
|---|---|---|
| 0 | 0 4 5 6 7 8 1 2 3 | 0000 |
| 1 | 0 4 5 6 7 1 2 8 3 | 0001 |
| 2 | 0 4 5 6 1 7 8 2 3 | 0010 |
| 3 | 0 4 5 1 7 6 8 2 3 | 0011 |
| 4 | 0 5 6 4 7 2 1 8 3 | 01000 |
| 5 | 0 5 6 4 7 1 2 3 8 | 01001 |
| 6 | 0 5 7 4 8 6 1 3 2 | 01010 |
| 7 | 0 5 1 4 3 8 6 2 7 | 01011 |
| 8 | 0 1 5 4 8 7 6 2 3 | 01100 |
| 9 | 0 2 1 5 8 4 6 7 3 | 01101 |
| 10 | 0 2 5 4 3 1 6 7 8 | 01110 |
| 11 | 0 5 8 1 4 7 6 2 3 | 01111 |

TABLE 25-continued

Global ordering and VLC codes for prediction of inter block reference types in P-pictures

| Index | Global Ordering | VLC Codeword |
|---|---|---|
| 12 | 2 1 0 5 8 6 4 7 3 | 10000 |
| 13 | 0 3 5 1 8 2 4 6 7 | 10001 |
| 14 | 0 1 5 7 2 4 8 6 3 | 10010 |
| 15 | 1 0 4 5 6 7 8 2 3 | 10011 |
| 16 | 0 2 5 1 4 6 7 8 3 | 10100 |
| 17 | 0 7 4 5 6 1 8 3 2 | 10101 |
| 18 | 0 7 5 6 4 8 1 2 3 | 10110 |
| 19 | 0 1 4 5 7 6 8 2 3 | 10111 |
| 20 | 2 0 1 4 6 5 8 7 3 | 11000 |
| 21 | 0 7 1 4 8 3 5 2 6 | 11001 |
| 22 | 0 7 5 4 1 8 6 2 3 | 11010 |
| 23 | 2 1 0 4 6 5 8 7 3 | 11011 |
| 24 | 0 1 4 5 7 6 8 2 3 | 11100 |
| 25 | 0 7 4 2 5 6 8 1 3 | 11101 |
| 26 | 7 0 5 2 8 4 6 1 3 | 11110 |
| 27 | 0 4 5 6 7 8 1 2 3 | 11111 |

Once a global ordering has been determined or selected, prediction may proceed for each event (block). For example, at a given block, all known (e.g., previously encoded/decoded) events of the direct neighboring blocks may be flagged. The direct neighboring blocks may refer to the blocks that touch the border of the current block. For example, these neighboring blocks may include known blocks to the left, top, top-left and sometimes top-right of the current block. The flagged events (e.g., events that occur at neighboring blocks) may form a first group, while the remaining events (e.g., events that do not occur at neighboring blocks) may form a second group of events. Within each group, events may be ordered according to the global ordering. The actual localized probable ordering may be formed by concatenating the ordered first and second groups. For example, let the global ordering for a given frame be 4, 0, 1, 3, 5, 2, 6. Suppose that at block B the neighboring blocks have events Past SR2 (index 3) and Past SR3 (index 4). Then the first group is (3, 4), while the second group is (0, 1, 2, 5, 6). Each group may then be ordered by the global ordering so they become (4, 3) and (0, 1, 5, 2, 6) respectively. The final localized probable ordering for block B is therefore 4, 3, 0, 1, 5, 2, 6. Once the local probable ordering is determined, the prediction may coded as the index of the actual event in that ordering, as described previously.

As discussed, in the prediction method, the prediction indices may be coded instead of the actual events. The indices often have a more peaky distribution and can be therefore coded with VLCs more efficiently. The prediction indices may be coded like events by choosing the best suitable VLC combination from the available VLC combinations. For example, the following VLC tables may be implemented with this method:

TABLE 26

VLC combinations and corresponding headers in Prediction and VLC coding method for inter block reference types in P-pictures

| VLC Index | Hdr | Hdr bitlen | Pred. Index 0 | Pred. Index 1 | Pred. Index 2 | Pred. Index 3 | Pred. Index 4 | Pred. Index 5 | Pred. Index 6 | Pred. Index 7 | Pred. Index 8 |
|---|---|---|---|---|---|---|---|---|---|---|---|
| 0 | 00 | 2 | 1 | 001 | 0000 | 0001 | 0100 | 0101 | 0110 | 0111 | — |
| 1 | 01 | 2 | 01 | 100 | 101 | 110 | 111 | 0000 | 0001 | 0010 | 0011 |
| 2 | 100 | 3 | 1 | 010 | 011 | 0001 | 0010 | 0011 | 00000 | 00001 | — |
| 3 | 101 | 3 | 01 | 001 | 0000 | 100 | 101 | 110 | 111 | 0001 | — |
| 4 | 110 | 3 | 01 | 001 | 100 | 101 | 110 | 111 | 0001 | 00000 | 00001 |
| 5 | 111 | 3 | 1 | 001 | 010 | 011 | 0001 | 00000 | 00001 | — | — |

In some examples, prediction (e.g., full or advanced prediction) may be used with skip level 1 coding and VLC (e.g., coding based on proxy variable length coding with a most frequent symbol coded with a symbol-run coding). In some examples, it may be more efficient to code the most common event (likely prediction index 0) with a symbol-run coder. For example, a Prediction, Skip level 1 and VLC method may use the prediction described above to obtain prediction indices at each block. The most frequent index may be isolated and coded with symbol run coding such as the symbol-run-based entropy coder discussed herein and the remaining prediction indices may be coded using the best available VLC table. For example, the following VLC tables may be implemented in such methods:

TABLE 27

VLC combinations and corresponding headers in Prediction, Skip Level 1 and VLC coding method for inter block reference types in P-pictures

| VLC Index | Hdr | Hdr bitlen | Pred. Index 0 | Pred. Index 1 | Pred. Index 2 | Pred. Index 3 | Pred. Index 4 | Pred. Index 5 | Pred. Index 6 | Pred. Index 7 | Pred. Index 8 |
|---|---|---|---|---|---|---|---|---|---|---|---|
| 0 | 0 | 1 | — | 01 | 11 | 000 | 001 | 1000 | 101 | 1001 | — |
| 1 | 1 | 1 | — | 01 | 10 | 11 | 001 | 0000 | 0001 | — | — |

As discussed above, in some examples, default prediction may be used. Default prediction may be used with VLC (e.g., coding based on proxy variable length coding using default prediction). For such methods, example VLC combinations and associated VLC headers may be provided as shown in the following table:

TABLE 28

VLC combinations and corresponding headers in Default Prediction and VLC coding method for inter block reference types in P-pictures

| VLC Index | Hdr | Hdr bitlen | Pred. Index 0 | Pred. Index 1 | Pred. Index 2 | Pred. Index 3 | Pred. Index 4 | Pred. Index 5 | Pred. Index 6 | Pred. Index 7 | Pred. Index 8 |
|---|---|---|---|---|---|---|---|---|---|---|---|
| 0 | 0000 | 4 | 1 | 001 | 010 | 011 | 0001 | 00000 | 00001 | — | — |
| 1 | 0001 | 4 | 1 | 000 | 001 | 011 | 0101 | 01001 | 010000 | 010001 | — |
| 2 | 0010 | 4 | 1 | 000 | 001 | 011 | 0100 | 0101 | — | — | — |
| 3 | 0011 | 4 | 1 | 001 | 010 | 011 | 00000 | 0001 | 00001 | — | — |
| 4 | 0100 | 4 | 1 | 001 | 011 | 0100 | 0001 | 0101 | 00000 | 00001 | — |
| 5 | 0101 | 4 | 1 | 011 | 001 | 0001 | 0100 | 0101 | 00001 | 000000 | 000001 |
| 6 | 0110 | 4 | 1 | 001 | 0000 | 011 | 0001 | 0101 | 01001 | 010000 | 010001 |
| 7 | 0111 | 4 | 1 | 000 | 001 | 011 | 0101 | 01001 | 010001 | 0100000 | 0100001 |
| 8 | 1000 | 4 | 1 | 01 | 001 | 00000 | 00001 | 00011 | 000100 | 000101 | — |
| 9 | 1001 | 4 | 1 | 01 | 001 | 0001 | 00001 | 000001 | 0000000 | 0000001 | — |
| 10 | 1010 | 4 | 1 | 01 | 0001 | 00000 | 0011 | 00101 | 00001 | 001000 | 001001 |
| 11 | 1011 | 4 | 1 | 01 | 00000 | 0001 | 0011 | 00101 | 00001 | 001000 | 001001 |
| 12 | 1100 | 4 | 1 | 001 | 0000 | 0001 | 0100 | 0101 | 0110 | 0111 | — |
| 13 | 1101 | 4 | 1 | 010 | 011 | 0001 | 0010 | 0011 | 00000 | 00001 | — |
| 14 | 1110 | 4 | 1 | 001 | 010 | 011 | 0001 | 00000 | 00001 | — | — |
| 15 | 1111 | 4 | 00 | 01 | 101 | 11 | 1000 | 1001 | — | — | — |

In some examples, default prediction may be used with skip level 1 and VLC (e.g., coding based on proxy variable length coding with a most frequent symbol coded with a symbol-run coding). For such methods, example VLC combinations and associated VLC headers may be provided as shown in the following table:

TABLE 29

VLC combinations and corresponding headers in Default Prediction, Skip Level 1 and VLC coding method for inter block reference types in P-pictures

| VLC Index | Hdr | Hdr bitlen | Pred. Index 0 | Pred. Index 1 | Pred. Index 2 | Pred. Index 3 | Pred. Index 4 | Pred. Index 5 | Pred. Index 6 | Pred. Index 7 | Pred. Index 8 |
|---|---|---|---|---|---|---|---|---|---|---|---|
| 0 | 0 | 1 | — | 1 | 01 | 001 | 0001 | 00000 | 00001 | — | — |
| 1 | 10 | 2 | — | 00 | 01 | 11 | 101 | 1000 | 1001 | — | — |
| 2 | 11 | 2 | — | 01 | 11 | 000 | 001 | 1000 | 1010 | 1001 | 1011 |

In order to provide the most efficient coding cost, the best of any or all of the described may be chosen for evaluation. For example, for ease of implementation, only some of the described methods may be evaluated. In other implementations, all of the described methods may be evaluated. In any event, the chosen method may be indicated via overhead such as an inter-block reference type coding technique indicator or the like. The following table provides example headers for use when seven techniques are available for use:

TABLE 30

Headers used for switching the selected method for coding inter block reference types in P-pictures

| Method | Header Code | Header Code length |
|---|---|---|
| Default method | 0 | 1 |
| VLC Only | 100 | 3 |
| Skip Level 1 and VLC | 101 | 3 |
| Prediction and VLC | 1100 | 4 |
| Prediction, Skip Level 1 and VLC | 1101 | 4 |
| Default Prediction and VLC | 1110 | 4 |
| Default Prediction, Skip Level 1 and VLC | 1111 | 4 |

Figure 30:
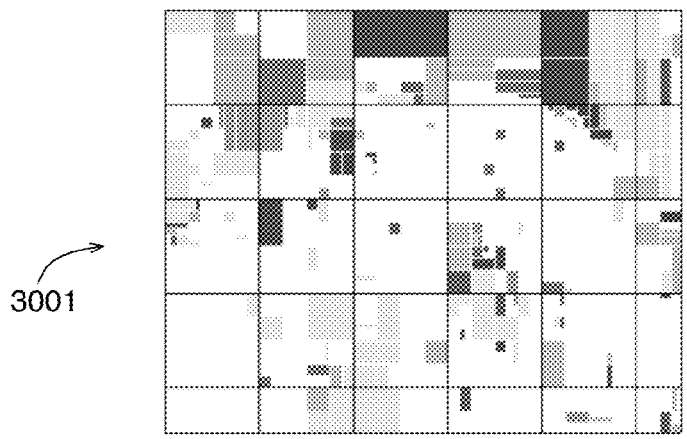
FIG. 30 is an illustrative diagram of example inter block reference types for an example B/F-picture.
Figure 31:
FIG. 31 is an illustrative diagram of example inter block reference types for an example B/F-picture, all arranged in accordance with at least some implementations of the present disclosure.

As discussed, inter-block reference types data may be coded by choosing a lowest bit cost coding method (e.g., from three methods for P-pictures and from seven methods for B/F-pictures) and encoding the inter-block reference types data using the selected coding method. FIG. 30 is an illustrative diagram of example inter block reference types 3001 for an example B/F-picture 3002 and FIG. 31 is an illustrative diagram of example inter block reference types 3101 for an example B/F-picture 3102. FIG. 30 illustrates inter block reference types 3001 for example B/F-picture 3002. In the example of FIG. 30, B/F-picture 302 may have a quantizer, Qp, of 8. In the example of FIG. 31, B/F-picture 3102 may have a quantizer, Qp, of 32. For example, B/F-pictures 3002 and 3102 may be example pictures for the football test sequence. The techniques discussed with respect to FIGS. 30 and 31 and tables 21-38 may be associated with coding inter block reference types data for P-pictures.

As discussed, in some examples, in coding inter block reference types data for B/F-pictures, seven methods may be evaluated: coding based on proxy variable length coding using default prediction, coding based on proxy variable length coding using modified default prediction, coding based on proxy variable length coding without using prediction, coding based on proxy variable length coding using prediction, coding based on proxy variable length coding with a most frequent symbol coded with a symbol-run coding using prediction, coding based on proxy variable length coding using default-like prediction, and coding based on proxy variable length coding with a most frequent symbol coded with a symbol-run coding using default-like prediction. In other examples, a sub-set of the described methods may be evaluated and/or more methods may be evaluated.

For example, the default prediction may include a simplified prediction-based method. For example, the frequency of events may be assumed to be in a decreasing order such that the task of prediction and VLC assignment may be simplified. In such a method, prediction may be performed by examining the neighbors of the current block (e.g., top, left, and top-left neighbors of the current block). The prediction method may select a single prediction value for the current block. If the predicted and actual value of the block are equal, one bit (e.g., '0') may be spent to signal that the prediction was successful. If the prediction was not successful, then after 1-bit of overhead (e.g., '1'), a VLC may be selected to represent the actual value of the block. Note that the number of possible values for the actual value may be, at this point, one less since the predicted value may be discarded from the set of possible events. For example, there may be two VLC tables used and switching may be automatically performed based on the frame index, as follows:

TABLE 31

VLC codes used for coding the prediction-based events in B/F-frame reference types coding

| Num of Prev I/P Frames | Event 1 | Event 2 | Event 3 | Event 4 | Event 5 | Event 6 | Event 7 | Event 8 | Event 9 | Event 10 |
|---|---|---|---|---|---|---|---|---|---|---|
| 1 | 111 | 110 | 011 | 101 | 100 | 001 | 010 | 000 | — | — |
| 2+ | 111 | 110 | 011 | 101 | 100 | 001 | 010 | 0000 | 0001 | — |

In modified default prediction, a similar method may be used, but the overhead bits signifying whether or not the prediction was correct may be collected into a bitmask, which may be coded using Proxy VLC with a selected table.

In some examples a VLC only method (e.g., coding based on proxy variable length coding without using prediction) for coding inter-block reference types data may be evaluated and/or used. For example, in the VLC only method, a number of VLC combinations may be constructed based on a statistical analysis. With a given histogram, the VLC combination with lowest bit cost may be selected, and the selection index may be encoded as a header. In such examples, each reference type may be coded with a corresponding codeword from the selected VLC set. The following table shows example VLC combinations and corresponding headers implemented:

TABLE 32

VLC combinations and corresponding headers in VLC-only coding method for inter block reference types in B/F-pictures

| VLC Index | Hdr len | Hdr | Past None | Proj None | Ftr None | MRF1 None | Ftr SR1 | Ftr SR2 | Ftr SR3 | Ftr GMC | Ftr Gain | Past FLT |
|---|---|---|---|---|---|---|---|---|---|---|---|---|
| 0 | 2 | 00 | — | — | — | — | — | — | — | — | — | — |
| 1 | 2 | 01 | — | 1 | 000 | — | 01000 | 001 | 01001 | — | 0101 | 011 |
| 2 | 3 | 100 | 01 | 1 | 0011 | — | 00000 | — | 00001 | 0010 | 0001 | — |
| 3 | 3 | 101 | 0 | 1 | — | — | — | — | — | — | — | — |
| 4 | 3 | 110 | 00 | 1 | — | — | — | 01 | — | — | — | — |
| 5 | 3 | 111 | 0011 | 00100 | 1 | 00101 | 00000 | 010 | 011 | 00010 | 00001 | 00011 |

In some examples, prediction (e.g., full or advanced prediction) may be used. For example, as discussed, inter block reference types may be spatially correlated such that it may be advantageous to create a spatial prediction mechanism to reduce bit cost. For example, prediction may be performed using modes or reference types of the previously known (e.g., previously decoded) neighboring blocks immediately to the left, top, top-left and top-right of the current block.

For example, prediction may be performed as follows. At each event, a probable ordering of events may be derived, for example, the events may be ordered from most likely to least likely and an actual event may be coded as it's index in the ordering of events, as discussed herein. Therefore, in this method, the VLC codewords may be assigned to the prediction-based indices rather than actual events.

As discussed, the localized probable ordering at each event may be determined as follows. Prior to prediction, a best suitable global ordering may be determined or selected from an empirically derived set of likely orderings that work globally. As used herein, a global ordering may refer to an ordering that closely resembles statistics (histogram) of the modes in the entire frame. The most suitable global ordering may be selected and coded with a small VLC. The following provides example global orderings (shown along with their VLC code) that may be selected from:

TABLE 33

Global ordering and VLC codes for prediction of inter block reference types in B/F-pictures

| Index | Global Ordering | VLC Codeword |
|---|---|---|
| 0 | 0 1 9 2 7 4 6 8 5 3 | 0000 |
| 1 | 2 1 0 5 9 4 6 8 7 3 | 0001 |
| 2 | 1 3 0 2 5 7 9 4 6 8 | 00100 |
| 3 | 2 1 5 8 6 4 0 3 9 7 | 00101 |
| 4 | 0 9 1 2 5 8 4 7 6 3 | 00110 |
| 5 | 2 0 5 1 4 9 8 6 7 3 | 00111 |
| 6 | 2 0 1 4 5 9 6 8 3 7 | 01000 |
| 7 | 2 5 1 0 9 4 3 7 6 8 | 01001 |
| 8 | 0 1 2 4 5 6 7 9 8 3 | 01010 |
| 9 | 0 1 4 2 6 5 9 7 8 3 | 01011 |
| 10 | 0 2 1 5 6 9 4 8 7 3 | 01100 |
| 11 | 0 1 2 9 6 4 5 7 8 3 | 01101 |
| 12 | 1 0 9 2 5 7 4 6 8 3 | 01110 |
| 13 | 0 2 9 1 4 7 5 6 8 3 | 01111 |
| 14 | 1 2 0 5 8 7 9 4 6 3 | 10000 |
| 15 | 3 1 0 7 2 9 4 5 6 8 | 10001 |
| 16 | 2 1 5 0 4 6 7 9 8 3 | 10010 |
| 17 | 0 2 1 9 5 7 4 3 6 8 | 10011 |
| 18 | 2 5 0 1 3 4 9 6 7 8 | 10100 |
| 19 | 1 2 0 3 4 5 9 6 7 8 | 10101 |
| 20 | 1 0 9 7 5 2 4 6 8 3 | 10110 |
| 21 | 1 5 7 2 9 8 6 0 4 3 | 10111 |
| 22 | 1 5 0 7 2 4 6 9 8 3 | 11000 |
| 23 | 0 1 9 2 4 6 5 8 7 3 | 11001 |
| 24 | 0 1 9 5 2 8 7 4 6 3 | 11010 |
| 25 | 2 1 5 4 8 0 7 9 6 3 | 11011 |
| 26 | 1 0 5 2 7 6 4 8 9 3 | 11100 |
| 27 | 0 1 2 4 5 7 6 3 9 8 | 11101 |
| 28 | 4 1 0 2 7 8 5 6 9 3 | 11110 |
| 29 | 1 0 2 6 5 4 9 7 8 3 | 11111 |

Once a global ordering has been determined or selected, prediction may proceed for each event (block). For example, at a given block, all known (e.g., previously encoded/decoded) events of the direct neighboring blocks may be flagged. The direct neighboring blocks may refer to the blocks that touch the border of the current block. For example, these neighboring blocks may include known blocks to the left, top, top-left and sometimes top-right of the current block. The flagged events (e.g., events that occur at neighboring blocks) may form a first group, while the remaining events (e.g., events that do not occur at neighboring blocks) may form a second group of events. Within each group, events may be ordered according to the global ordering. The actual localized probable ordering may be formed by concatenating the ordered first and second groups.

As discussed, in the prediction method, the prediction indices may be coded instead of the actual events. The indices often have a more peaky distribution and can be therefore coded with VLCs more efficiently. The prediction indices may be coded like events by choosing the best suitable VLC combination from the available VLC combinations. For example, the following VLC tables may be implemented with this method:

TABLE 34

VLC combinations and corresponding headers in Prediction and VLC coding method for inter block reference types in B/F-pictures

| VLC Index | Hdr | Hdr len | Pred Ind 0 | Pred Ind 1 | Pred Ind 2 | Pred Ind 3 | Pred Ind 4 | Pred Ind 5 | Pred Ind 6 | Pred Ind 7 | Pred Ind 8 | Pred Ind 9 |
|---|---|---|---|---|---|---|---|---|---|---|---|---|
| 0 | 0000 | 4 | 01 | 001 | 100 | 101 | 110 | 111 | 0001 | 00001 | 000000 | 000001 |
| 1 | 0001 | 4 | 01 | 11 | 001 | 101 | 1000 | 0001 | 1001 | 00001 | 000000 | 000001 |
| 2 | 0010 | 4 | 01 | 11 | 001 | 101 | 0000 | 0001 | 10000 | 1001 | 10001 | — |
| 3 | 0011 | 4 | 01 | 10 | 11 | 0001 | 0010 | 0011 | 00000 | 00001 | — | — |
| 4 | 0100 | 4 | 00 | 01 | 101 | 111 | 1100 | 1001 | 100000 | 1101 | 10001 | 100001 |
| 5 | 0101 | 4 | 01 | 11 | 001 | 0000 | 0001 | 10000 | 1010 | 1011 | 1001 | 10001 |
| 6 | 0110 | 4 | 01 | 101 | 001 | 110 | 111 | 0000 | 1001 | 0001 | 10000 | 10001 |
| 7 | 0111 | 4 | 1 | 01 | 0000 | 0001 | 001 | — | — | — | — | — |
| 8 | 1000 | 4 | 01 | 1 | 001 | 0000 | 0001 | — | — | — | — | — |
| 9 | 1001 | 4 | 0000 | 1 | 01 | 001 | 0001 | — | — | — | — | — |
| 10 | 1010 | 4 | 01 | 11 | 001 | 101 | 0001 | 1000 | 1001 | 00000 | 00001 | — |
| 11 | 1011 | 4 | 11 | 000 | 001 | 011 | 100 | 101 | 0101 | 01001 | 010000 | 010001 |
| 12 | 1100 | 4 | 01 | 1 | 0000 | 001 | 0001 | — | — | — | — | — |
| 13 | 1101 | 4 | 000 | 01 | 11 | 101 | 001 | 1000 | 1001 | — | — | — |
| 14 | 11100 | 5 | 1 | 01 | 001 | 00010 | 00011 | 00000 | 00001 | — | — | — |
| 15 | 11101 | 5 | 00 | 01 | 101 | 111 | 1000 | 1001 | 11000 | 1101 | 11001 | — |
| 16 | 11110 | 5 | 01 | 10 | 11 | 00011 | 001 | 00000 | 00001 | 000100 | 000101 | — |
| 17 | 11111 | 5 | 10 | 01 | 11 | 0010 | 0001 | 00001 | 0011 | 000001 | 0000000 | 0000001 |

In some examples, prediction (e.g., full or advanced prediction) may be used with skip level 1 coding and VLC (e.g., coding based on proxy variable length coding with a most frequent symbol coded with a symbol-run coding). In some examples, it may be more efficient to code the most common event (likely prediction index 0) with a symbol-run coder. For example, a Prediction, Skip level 1 and VLC method may use the prediction described above to obtain prediction indices at each block. The most frequent index may be isolated and coded with symbol run coding such as the symbol-run-based entropy coder discussed herein and the remaining prediction indices may be coded using the best available VLC table. For example, the following VLC tables may be implemented in such methods:

TABLE 35

VLC combinations and corresponding headers in Prediction, Skip Level 1 and VLC coding method for inter block reference types in B/F-pictures

| VLC Index | Hdr | Hdr Len | Pred Ind 0 | Pred Ind 1 | Pred Ind 2 | Pred Ind 3 | Pred Ind 4 | Pred Ind 5 | Pred Ind 6 | Pred Ind 7 | Pred Ind 8 | Pred Ind 9 |
|---|---|---|---|---|---|---|---|---|---|---|---|---|
| 0 | 00 | 2 | — | 1 | 01 | 001 | 00000 | 00010 | 00001 | 00011 | — | — |
| 1 | 01 | 2 | — | 1 | 001 | 01 | 0001 | 000000 | 00001 | 000001 | — | — |
| 2 | 100 | 3 | — | 1 | 000 | 01 | 001 | — | — | — | — | — |
| 3 | 101 | 3 | — | 001 | 11 | 010 | 011 | 100 | 0001 | 101 | 00000 | 00001 |
| 4 | 110 | 3 | — | 01 | 101 | 001 | 11 | 1001 | 0000 | 0001 | 10000 | 10001 |
| 5 | 111 | 3 | — | 01 | 1 | 001 | 0000 | 0001 | — | — | — | — |

As discussed above, in some examples, default or default-like prediction may be used. Default prediction may be used with VLC (e.g., coding based on proxy variable length coding using default or default-like prediction). For example, in default or default-like prediction, a histograms of event from neighboring blocks may be used for prediction. For such methods, example VLC combinations and associated VLC headers may be provided as shown in the following table:

TABLE 36

VLC combinations and corresponding headers in Default Prediction and VLC coding method for inter block reference types in B/F-pictures

| VLC Index | Hdr | Hdr Len | Pred Ind 0 | Pred Ind 1 | Pred Ind 2 | Pred Ind 3 | Pred Ind 4 | Pred Ind 5 | Pred Ind 6 | Pred Ind 7 | Pred Ind 8 | Pred Ind 9 |
|---|---|---|---|---|---|---|---|---|---|---|---|---|
| 0 | 00 | 2 | 1 | 01 | 001 | 0001 | 00001 | 000001 | 00000000 | 0000001 | 00000001 | — |
| 1 | 01 | 2 | 01 | 001 | 100 | 101 | 0000 | 111 | 0001 | 1100 | 1101 | — |
| 2 | 10 | 2 | 01 | 001 | 100 | 101 | 110 | 111 | 0001 | 00001 | 000000 | 000001 |
| 3 | 110 | 3 | 01 | 11 | 001 | 1001 | 101 | 0000 | 0001 | 10000 | 10001 | — |
| 4 | 111 | 3 | 1 | 001 | 011 | 00010 | 0100 | 00011 | 0101 | 00001 | 000000 | 000001 |

In some examples, default or default-like prediction may be used with skip level 1 and VLC (e.g., coding based on proxy variable length coding with a most frequent symbol coded with a symbol-run coding using default-like prediction). For such methods, example VLC combinations and associated VLC headers may be provided as shown in the following table:

TABLE 37

VLC combinations and corresponding headers in Default Prediction, Skip Level 1 and VLC coding method for inter block reference types in B/F-pictures

| VLC Index | Hdr | Hdr Len | Pred Ind 0 | Pred Ind 1 | Pred Ind 2 | Pred Ind 3 | Pred Ind 4 | Pred Ind 5 | Pred Ind 6 | Pred Ind 7 | Pred Ind 8 | Pred Ind 9 |
|---|---|---|---|---|---|---|---|---|---|---|---|---|
| 0 | 0 | 1 | — | 000 | 01 | 11 | 001 | 101 | 1001 | 10000 | 10001 | — |
| 1 | 1 | 1 | — | 1 | 001 | 011 | 0000 | 0001 | 0100 | 0101 | — | — |

In order to provide the most efficient coding cost, the best of any or all of the described may be chosen for evaluation. For example, for ease of implementation, only some of the described methods may be evaluated. In other implementations, all of the described methods may be evaluated. In any event, the chosen method may be indicated via overhead such as an inter-block reference type coding technique indicator or the like. The following table provides example headers for use when six techniques are available for use:

TABLE 38

Headers used for switching the selected method for coding inter block reference types in F-pictures

| Method | Header Code | Header Code length |
|---|---|---|
| Default Method | 0 | 1 |
| VLC Only | 100 | 3 |
| Prediction and VLC | 101 | 3 |
| Prediction, Skip Level 1 and VLC | 110 | 3 |
| Alternate Prediction and VLC | 1110 | 4 |
| Alternate Prediction, Skip Level 1 and VLC | 1111 | 4 |

In the example of Table 38, alternate prediction may refer to default-like prediction as discussed herein.

As discussed, multi-block reference types data may be coded by choosing a lowest bit cost VLC table based on a number of multi-block reference types in the multi-block reference types data and coding the multi-block reference types based on the selected VLC table.

For example, in P-pictures, ref types for multi blocks (e.g., multi-block reference types data) may be coded using a VLC lookup method. For example, the data points may be coded using the VLC table with two cases in P-pictures coded ref types: (1) multi blocks have one fixed reference (e.g., PAST_NONE or the like) and two possibilities for the second reference; and (2) multi blocks have one fixed reference (e.g., PAST_NONE or the like) and three possibilities for the second reference. In such examples, two VLC tables may be selected between, one for each case as follows:

TABLE 39

Example VLC tables. The top table is for case (1) and the bottom table is for case (2)

| Ref Type index | VLC | VLC bits |
|---|---|---|
| 0 | 0 | 1 |
| 1 | 1 | 1 |

| Ref Type index | VLC | VLC bits |
|---|---|---|
| 0 | 0 | 1 |
| 1 | 10 | 2 |
| 2 | 11 | 2 |

In F pictures, In F-pictures, ref types for multi blocks (e.g., multi-block reference types data) may be coded using an adaptive VLC method. For example, based on the statistics of data to be coded, a best table may be selected from available tables, the table index or indicator may be coded, and the data points (e.g., multi-block reference types data) themselves may be coded using the selected table. For example, there may be five cases possible in F-pictures coded ref types: (1) multi blocks have 1 fixed reference (e.g., PAST_NONE) and 4 possibilities for the second reference with dir=0 (e.g., direction of zero); (2) multi blocks have 1 fixed reference (e.g., PAST_NONE) and 5 possibilities for the second ref with dir=0 (e.g., direction of zero); multi blocks have 1 fixed reference (e.g., PAST_NONE) and 6 possibilities for the second ref with dir=0 (e.g., direction of zero); multi blocks have 1 fixed reference (e.g., PAST_NONE) and 7 possibilities for the second ref with dir=0 (e.g., direction of zero); and multi blocks have 1 fixed reference (e.g., PAST_NONE) and 8 possibilities for the second ref with dir=0 (e.g., direction of zero).

In such examples, the adaptive VLC may performed based on Tables 40-44, where each of Tables 40-44 shows tables that may be available for each case. Paragraph before table

TABLE 40

For case 1, there may be 4 VLC tables

| VLC Index | Header | Ref Type 0 | Ref Type 1 | Ref Type 2 | Ref Type 3 |
|---|---|---|---|---|---|
| 0 | 00 | — | 10 | 0 | 11 |
| 1 | 01 | 11 | 0 | — | 10 |
| 2 | 10 | 110 | 0 | 10 | 111 |
| 3 | 11 | 00 | 01 | 10 | 11 |

TABLE 41

For case 2, there may be 8 VLC tables

| VLC Index | Header | Ref Type 0 | Ref Type 1 | Ref Type 2 | Ref Type 3 | Ref Type 4 |
|---|---|---|---|---|---|---|
| 0 | 000 | — | 0 | — | 1 | — |
| 1 | 001 | — | 111 | 110 | 0 | 10 |
| 2 | 010 | — | 0 | — | 10 | 11 |
| 3 | 011 | 10 | 0 | — | 11 | — |

TABLE 41-continued

For case 2, there may be 8 VLC tables

| VLC Index | Header | Ref Type 0 | Ref Type 1 | Ref Type 2 | Ref Type 3 | Ref Type 4 |
|---|---|---|---|---|---|---|
| 4 | 100 | 100 | 0 | 101 | 110 | 111 |
| 5 | 101 | 10 | 0 | 110 | — | 111 |
| 6 | 110 | 10 | 0 | 110 | 1110 | 1111 |
| 7 | 111 | 10 | 00 | 01 | 110 | 111 |

TABLE 42

For case 3, there may be 8 VLC tables

| VLC Index | Header | Ref Type 0 | Ref Type 1 | Ref Type 2 | Ref Type 3 | Ref Type 4 | Ref Type 5 |
|---|---|---|---|---|---|---|---|
| 0 | 000 | 11110 | 0 | 11111 | 1110 | 110 | 10 |
| 1 | 001 | 1110 | 10 | 01 | 00 | 1111 | 011 |
| 2 | 010 | 110 | 0 | 1110 | 100 | 1111 | 101 |
| 3 | 011 | 100 | 101 | 10 | 01 | 110 | 111 |
| 4 | 100 | 1110 | 10 | 11110 | 11111 | 110 | 0 |
| 5 | 101 | 1 | 0010 | 0000 | 0001 | 0011 | 01 |
| 6 | 110 | 11111 | 10 | 0 | 110 | 11110 | 1110 |
| 7 | 111 | 000 | 01 | 11 | 100 | 101 | 001 |

TABLE 43

For case 4, there may be 4 VLC tables

| VLC Index | Header | Ref Type 0 | Ref Type 1 | Ref Type 2 | Ref Type 3 | Ref Type 4 | Ref Type 5 | Ref Type 6 |
|---|---|---|---|---|---|---|---|---|
| 0 | 00 | 0100 | 1 | 0101 | 000 | 0110 | 0111 | 001 |
| 1 | 01 | 010 | 011 | 0010 | 0011 | 0000 | 0001 | 1 |
| 2 | 10 | 000000 | 01 | 1 | 00001 | 001 | 0001 | 000001 |
| 3 | 11 | 110 | 111 | 100 | 01 | 000 | 101 | 001 |

TABLE 44

For case 5, there may be 8 VLC tables

| VLC Index | Header | Ref Type 0 | Ref Type 1 | Ref Type 2 | Ref Type 3 | Ref Type 4 | Ref Type 5 | Ref Type 6 | Ref Type 7 |
|---|---|---|---|---|---|---|---|---|---|
| 0 | 000 | 000010 | 01 | 000011 | 000000 | 001 | 000001 | 0001 | 1 |
| 1 | 001 | 00100 | 01 | 00101 | 00000 | 0011 | 00001 | 0001 | 1 |
| 2 | 010 | 101 | 00 | 1100 | 1101 | 100 | 1110 | 1111 | 01 |
| 3 | 011 | 001000 | 01 | 1 | 0011 | 0000 | 00101 | 001001 | 0001 |
| 4 | 100 | 0000000 | 01 | 1 | 0001 | 00001 | 000001 | 0000001 | 001 |
| 5 | 101 | 000000 | 10 | 000001 | 01 | 001 | 0001 | 00001 | 11 |
| 6 | 110 | 11000 | 00 | 1101 | 01 | 100 | 101 | 11001 | 111 |
| 7 | 111 | 000 | 001 | 010 | 011 | 100 | 101 | 110 | 111 |

The discussed methods and systems may make advantageous tradeoffs between achievable gains and complexity.

As discussed with respect to FIG. 16, example video coding system 1600 may include imaging device(s) 1601, video encoder 100 and/or a video encoder implemented via logic circuitry 1650 of processing unit(s) 1620, video decoder 200 and/or a video decoder implemented via logic circuitry 1650 of processing unit(s) 1620, an antenna 1602, one or more processor(s) 1603, one or more memory store(s) 2004, and/or a display device 2005.

In some examples, video encoder 100 implemented via logic circuitry 1650 may include an image buffer (e.g., via either processing unit(s) 1620 or memory store(s) 1604)) and a graphics processing unit (e.g., via processing unit(s) 1620). The graphics processing unit may be communicatively coupled to the image buffer. The graphics processing unit may include video encoder 100 as implemented via logic circuitry 1650 to embody the various modules as discussed with respect to FIG. 1 and FIGS. 4, 6 and others herein. For example, the graphics processing unit may include entropy encoder logic circuitry, and so on. The logic circuitry may be configured to perform the various operations as discussed herein. For example, the entropy encoder logic circuitry may be configured to load splits data, horizontal/vertical data, modes data, and reference type data for at least a portion of a video frame, determine a first estimated entropy coding bit cost comprising an entropy coding bit cost for jointly coding the splits data and the modes data and an entropy coding bit cost for coding the horizontal/vertical data, determine a second estimated entropy coding bit cost comprising an entropy coding bit cost for separately coding the splits data and the modes data, and an entropy coding bit cost for coding the horizontal/vertical data, select between jointly and separately coding the splits data and the modes data for at least the portion of the video frame based on the lowest of the first estimated entropy coding bit cost and the second estimated entropy coding bit cost, entropy encode, jointly or separately based on the selected coding, the splits data and the modes data, and entropy encode the horizontal/vertical data, entropy encode the reference type data, and output a bitstream comprising the entropy encoded splits data, modes data, horizontal/vertical data, and reference type data.

In some examples, antenna 1602 of video coding system 1600 may be configured to receive an entropy encoded bitstream of video data. As discussed, the bitstream may include compressed video data of various types. Video coding system 1600 may also include video decoder 200 coupled to antenna 1602 and configured to decode the encoded bitstream. For example, video decoder 200 may be configured to decode the encoded bitstream to determine a joint or separate coding header associated with splits data and modes data of at least a portion of a video frame, entropy decode the splits data and the modes data jointly, and entropy decode horizontal/vertical data when the joint or separate coding header indicates joint coding, entropy decode the splits data and the modes data separately, and entropy decode the horizontal/vertical data when the joint or separate coding header indicates separate coding, and entropy decode the encoded bitstream to determine reference type data for the portion of the video frame.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include loading splits data, horizontal/vertical data, modes data, and reference type data for at least a portion of a video frame, determining a first estimated entropy coding bit cost including an entropy coding bit cost for jointly coding the splits data and the modes data and an entropy coding bit cost for coding the horizontal/vertical data, determining a second estimated entropy coding bit cost including an entropy coding bit cost for separately coding the splits data and the modes data, and an entropy coding bit cost for coding the horizontal/vertical data, selecting between jointly and separately coding the splits data and the modes data for at least the portion of the video frame based on the lowest of the first estimated entropy coding bit cost and the second estimated entropy coding bit cost, entropy encoding, jointly or separately based on the selected coding, the splits data and the modes data, and entropy encoding the horizontal/vertical data, entropy encoding the reference type data, and outputting a bitstream including the entropy encoded splits data, modes data, horizontal/vertical data, and reference type data.

In another example, a computer-implemented method for video coding may further include the splits data including split bits indicating whether a block is further split or not and the horizontal/vertical data indicating whether each split in the splits data is a horizontal or a vertical split. The modes data may include modes for blocks or partitions of the video frame, and the modes data may include at least one of intra mode, skip mode, split mode, auto mode, inter mode, or multi mode. The reference type data may include reference types for inter mode blocks of the video frame, the video frame may be a P-picture, and reference types for the inter mode blocks may include at least one of a previously decoded frame, a previously decoded super-resolution based frame, a previously decoded dominant motion morphed frame, or a previously decoded gain morphed frame. The reference type data may include reference types for multi mode blocks of the video frame, the video frame may be a P-picture, and reference types for the multi mode blocks may include a first reference type including a previously decoded frame and a second reference type including a second previously decoded frame. The reference type data may include reference types for inter mode blocks of the video frame, the video frame may be a B/F-picture, and reference types for the inter mode blocks may include at least one of a previously decoded frame, a projected reference frame, a previously decoded super-resolution based frame, a previously decoded dominant motion morphed frame, or a previously decoded gain morphed frame. The reference type data may include reference types for multi mode blocks of the video frame, the video frame may be a B/F-picture, and reference types for the multi mode blocks may include a first reference type including a previously decoded frame and a second reference type including at least one of a second previously decoded frame, a previously decoded super-resolution based frame, a projected reference frame, a previously decoded dominant motion morphed frame, or a previously decoded gain morphed frame. The at least the portion of the video frame may be a slice of the video frame or the video frame. The reference type data may include inter-block reference type data and multi-block reference type data. The reference type data may include inter-block reference type data and multi-block reference type data, and encoding the reference type data may include selecting a variable length coding table for the multi-block reference type data based on a number of multi-reference types in the multi-block reference type data and encoding the multi-block reference type data based on the variable length coding table. The reference type data may include inter-block reference type data and multi-block reference type data, the video frame may be a P-picture, and encoding the reference type data may include determining a first inter-block reference type data coding bit cost based on proxy variable length coding using default prediction, determining a second inter-block reference type data coding bit cost based on proxy variable length coding using modified default prediction, determining a third inter-block reference type data coding bit cost based on proxy variable length coding using prediction, and encoding the inter-block reference type data based on a lowest bit cost from the first, second, and third inter-block reference type data coding bit costs. The reference type data may include inter-block reference type data and multi-block reference type data, the video frame may be a B/F-picture, and encoding the reference type data may include determining a first inter-block reference type data coding bit cost based on proxy variable length coding using default prediction, determining a second inter-block reference type data coding bit cost based on proxy variable length coding using modified default prediction, determining a third inter-block reference type data coding bit cost based on proxy variable length coding without using prediction, determining a fourth inter-block reference type data coding bit cost based on proxy variable length coding using prediction, determining a fifth inter-block reference type data coding bit cost based on proxy variable length coding with a most frequent symbol coded with a symbol-run coding using prediction, determining a sixth inter-block reference type data coding bit cost based on proxy variable length coding using default-like prediction, determining a seventh inter-block reference type data coding bit cost based on proxy variable length coding with a most frequent symbol coded with a symbol-run coding using default-like prediction, and encoding the inter-block reference type data based on a lowest bit cost from the first through seventh inter-block reference type data coding bit costs. Coding the modes data may include determining a first modes data coding bit cost based on proxy variable length coding without prediction, determining a second modes data coding bit cost based on proxy variable length coding with a most frequent symbol coded with a symbol-run coding without prediction, determining a third modes data coding bit cost based on proxy variable length coding with a most frequent symbol and a second most frequent symbol coded with a symbol-run coding without prediction, determining a fourth modes data coding bit cost based on proxy variable length coding using prediction, determining a fifth modes data coding bit cost based on proxy variable length coding with a most frequent symbol coded with a symbol-run coding using prediction, determining a sixth modes data coding bit cost based on proxy variable length coding with a most frequent symbol and a second most frequent symbol coded with a symbol-run coding using prediction, and encoding the modes data based on a lowest bit cost from the first through sixth modes data coding bit costs. Coding the modes data may include determining a probable ordering of mode events including available modes being ordered from most likely to least likely, determining an actual mode event at a first block of the video frame, and coding the actual mode event as the index of the actual mode event in the probable ordering of modes events. Coding the modes data may include determining a local probable ordering of mode events including available modes being ordered from most likely to least likely, where determining the local probable ordering of modes may include determining a global probable ordering of mode events, determining actual mode events at blocks neighboring a first block of the video frame, forming a first sub-group of mode events based on the actual mode events placed in their order with respect to the global probable ordering of mode events, forming a second sub-group of mode events based on mode events in the global probable ordering of mode events but not in the actual mode events placed in their order with respect to the global probable ordering of mode events, and concatenating the first and second sub-groups to form the local probable ordering of modes, determining an actual mode event at a first block of the video frame, and coding the actual mode event as the index of the actual mode event in the local probable ordering of modes events. Jointly coding the splits data and the modes data may include coding the splits data and the modes data jointly as a collection of events using a prediction tree having a terminating block of at least one of intra-, skip-, auto-, inter-, or multi-, such that a block may be defined as split if it does not terminate, and such that a first level of the prediction tree may be coded using symbol-run coding and higher levels of the prediction tree may be coded using variable length proxy coding. Jointly coding the splits data and the modes data may include coding the splits data and the modes data jointly as a collection of events using a prediction tree having a terminating block of at least one of intra-, skip-, auto-, inter-, or multi-, such that a block may be defined as split if it does not terminate, such that a first level of the prediction tree may be coded using symbol-run coding and higher levels of the prediction tree may be coded using proxy variable length coding, and such that coding the horizontal/vertical data may include at least one of a bitmap coding or a proxy variable length coding.

In other examples, a video encoder may include an image buffer and a graphics processing unit having entropy encoder logic circuitry. The graphics processing unit may be communicatively coupled to the image buffer and the entropy encoder logic circuitry may be configured to load splits data, horizontal/vertical data, modes data, and reference type data for at least a portion of a video frame, determine a first estimated entropy coding bit cost including an entropy coding bit cost for jointly coding the splits data and the modes data and an entropy coding bit cost for coding the horizontal/vertical data, determine a second estimated entropy coding bit cost including an entropy coding bit cost for separately coding the splits data and the modes data, and an entropy coding bit cost for coding the horizontal/vertical data, select between jointly and separately coding the splits data and the modes data for at least the portion of the video frame based on the lowest of the first estimated entropy coding bit cost and the second estimated entropy coding bit cost, entropy encode, jointly or separately based on the selected coding, the splits data and the modes data, and entropy encode the horizontal/vertical data, entropy encode the reference type data, and output a bitstream including the entropy encoded splits data, modes data, horizontal/vertical data, and reference type data.

In a further example video encoder, the splits data may include split bits indicating whether a block is further split or not and the horizontal/vertical data indicating whether each split in the splits data is a horizontal or a vertical split. The modes data may include modes for blocks or partitions of the video frame, and the modes data may include at least one of intra mode, skip mode, split mode, auto mode, inter mode, or multi mode. The reference type data may include reference types for inter mode blocks of the video frame, the video frame may be a P-picture, and reference types for the inter mode blocks may include at least one of a previously decoded frame, a previously decoded super-resolution based frame, a previously decoded dominant motion morphed frame, or a previously decoded gain morphed frame. The reference type data may include reference types for multi mode blocks of the video frame, the video frame may be a P-picture, and reference types for the multi mode blocks may include a first reference type including a previously decoded frame and a second reference type including a second previously decoded frame. The reference type data may include reference types for inter mode blocks of the video frame, the video frame may be a B/F-picture, and reference types for the inter mode blocks may include at least one of a previously decoded frame, a projected reference frame, a previously decoded super-resolution based frame, a previously decoded dominant motion morphed frame, or a previously decoded gain morphed frame. The reference type data may include reference types for multi mode blocks of the video frame, the video frame may be a B/F-picture, and reference types for the multi mode blocks may include a first reference type including a previously decoded frame and a second reference type including at least one of a second previously decoded frame, a previously decoded super-resolution based frame, a projected reference frame, a previously decoded dominant motion morphed frame, or a previously decoded gain morphed frame. The at least the portion of the video frame may be a slice of the video frame or the video frame. The reference type data may include inter-block reference type data and multi-block reference type data. The reference type data may include inter-block reference type data and multi-block reference type data, and to entropy encode the reference type data may include the entropy encoder logic circuitry being further configured to select a variable length coding table for the multi-block reference type data based on a number of multi-reference types in the multi-block reference type data and encode the multi-block reference type data based on the variable length coding table. The reference type data may include inter-block reference type data and multi-block reference type data, the video frame may be a P-picture, and to entropy encode the reference type data may include the entropy encoder logic circuitry being further configured to determine a first inter-block reference type data coding bit cost based on proxy variable length coding using default prediction, determine a second inter-block reference type data coding bit cost based on proxy variable length coding using modified default prediction, determine a third inter-block reference type data coding bit cost based on proxy variable length coding using prediction, and encode the inter-block reference type data based on a lowest bit cost from the first, second, and third inter-block reference type data coding bit costs. The reference type data may include inter-block reference type data and multi-block reference type data, the video frame may be a B/F-picture, and to entropy encode the reference type data may include the entropy encoder logic circuitry being further configured to determine a first inter-block reference type data coding bit cost based on proxy variable length coding using default prediction, determine a second inter-block reference type data coding bit cost based on proxy variable length coding using modified default prediction, determine a third inter-block reference type data coding bit cost based on proxy variable length coding without using prediction, determine a fourth inter-block reference type data coding bit cost based on proxy variable length coding using prediction, determine a fifth inter-block reference type data coding bit cost based on proxy variable length coding with a most frequent symbol coded with a symbol-run coding using prediction, determine a sixth inter-block reference type data coding bit cost based on proxy variable length coding using default-like prediction, determine a seventh inter-block reference type data coding bit cost based on proxy variable length coding with a most frequent symbol coded with a symbol-run coding using default-like prediction, and encode the inter-block reference type data based on a lowest bit cost from the first through seventh inter-block reference type data coding bit costs. To separately entropy encode the modes data may include the entropy encoder logic circuitry being further configured to determine a first modes data coding bit cost based on proxy variable length coding without prediction, determine a second modes data coding bit cost based on proxy variable length coding with a most frequent symbol coded with a symbol-run coding without prediction, determine a third modes data coding bit cost based on proxy variable length coding with a most frequent symbol and a second most frequent symbol coded with a symbol-run coding without prediction, determine a fourth modes data coding bit cost based on proxy variable length coding using prediction, determine a fifth modes data coding bit cost based on proxy variable length coding with a most frequent symbol coded with a symbol-run coding using prediction, determine a sixth modes data coding bit cost based on proxy variable length coding with a most frequent symbol and a second most frequent symbol coded with a symbol-run coding using prediction, and encode the modes data based on a lowest bit cost from the first through sixth modes data coding bit costs. To separately entropy encode the modes data may include the entropy encoder logic circuitry being further configured to determine a probable ordering of mode events including available modes being ordered from most likely to least likely, determine an actual mode event at a first block of the video frame, and code the actual mode event as the index of the actual mode event in the probable ordering of modes events. To separately entropy encode the modes data may include the entropy encoder logic circuitry being further configured to determine a local probable ordering of mode events including available modes being ordered from most likely to least likely, to determine the local probable ordering of modes may include determine a global probable ordering of mode events the entropy encoder logic circuitry being further configured to determine a global probable ordering of mode events, determine actual mode events at blocks neighboring a first block of the video frame, form a first sub-group of mode events based on the actual mode events placed in their order with respect to the global probable ordering of mode events, form a second sub-group of mode events based on mode events in the global probable ordering of mode events but not in the actual mode events placed in their order with respect to the global probable ordering of mode events, and concatenate the first and second sub-groups to form the local probable ordering of modes, determine an actual mode event at a first block of the video frame, and code the actual mode event as the index of the actual mode event in the local probable ordering of modes events. To jointly entropy encode the splits data and the modes data may include the entropy encoder logic circuitry being further configured to entropy encode the splits data and the modes data jointly as a collection of events using a prediction tree having a terminating block of at least one of intra-, skip-, auto-, inter-, or multi-, such that a block may be defined as split if it does not terminate, such that a first level of the prediction tree may be coded using symbol-run coding and higher levels of the prediction tree may be coded using proxy variable length coding, and such that to entropy encode the horizontal/vertical data may include the entropy encoder logic circuitry being further configured to perform at least one of a bitmap coding or a proxy variable length coding.

In yet another example, a system may include a video decoder configured to decode an encoded bitstream. The video decoder may be configured to decode the encoded bitstream to determine a joint or separate coding header associated with splits data and modes data of at least a portion of a video frame, entropy decode the splits data and the modes data jointly, and entropy decode horizontal/vertical data when the joint or separate coding header indicates joint coding, entropy decode the splits data and the modes data separately, and entropy decode the horizontal/vertical data when the joint or separate coding header indicates separate coding, and entropy decode the encoded bitstream to determine reference type data for the portion of the video frame.

In a further example system, the system may also include an antenna configured to receive the entropy encoded bitstream and a display device configured to present video frames. The splits data may include split bits indicating whether a block may be further split, and the horizontal/vertical data may indicate whether splits in the splits data are horizontal or vertical splits. The modes data may include modes for blocks or partitions of the video frame, and the modes data may include at least one of intra mode, skip mode, split mode, auto mode, inter mode, or multi mode. The reference type data may include reference types for inter mode blocks of the video frame, the video frame may be a P-picture, and reference types for the inter mode blocks may include at least one of a previously decoded frame, a previously decoded super-resolution based frame, a previously decoded dominant motion morphed frame, or a previously decoded gain morphed frame. The reference type data may include reference types for multi mode blocks of the video frame, the video frame may be a P-picture, and reference types for the multi mode blocks may include a first reference type including a previously decoded frame and a second reference type including a second previously decoded frame. The reference type data may include reference types for inter mode blocks of the video frame, the video frame may be a B/F-picture, and reference types for the inter mode blocks may include at least one of a previously decoded frame, a projected reference frame, a previously decoded super-resolution based frame, a previously decoded dominant motion morphed frame, or a previously decoded gain morphed frame. The reference type data may include reference types for multi mode blocks of the video frame, the video frame may be a B/F-picture, and reference types for the multi mode blocks may include a first reference type including a previously decoded frame and a second reference type including at least one of a second previously decoded frame, a previously decoded super-resolution based frame, a projected reference frame, a previously decoded dominant motion morphed frame, or a previously decoded gain morphed frame. The at least the portion of the video frame may be a slice of the video frame or the video frame. The reference type data may include inter-block reference type data and multi-block reference type data. The reference type data may include inter-block reference type data and multi-block reference type data, and the video decoder may be configured to select a variable length coding table for the multi-block reference type data based on a number of multi-reference types in the multi-block reference type data and entropy decode the multi-block reference type data based on the variable length coding table. The reference type data may include inter-block reference type data and multi-block reference type data, and the video frame may be a P-picture, and the video decoder may be configured to determine an inter-block reference type coding technique indicator from the bitstream indicating at least one of a coding based on proxy variable length coding using default prediction, a coding based on proxy variable length coding using modified default prediction, or a coding based on proxy variable length coding using prediction and entropy decode the inter-block reference type data based on the indicated technique. The reference type data may include inter-block reference type data and multi-block reference type data, the video frame may be a B/F-picture, and the video decoder may be configured to determine an inter-block reference type coding technique indicator from the bitstream indicating at least one of a coding based on proxy variable length coding using default prediction, a coding based on proxy variable length coding using modified default prediction, a coding based on proxy variable length coding without using prediction, a coding based on proxy variable length coding using prediction, a coding based on proxy variable length coding with a most frequent symbol coded with a symbol-run coding using prediction, or a coding based on proxy variable length coding using default-like prediction and entropy decode the inter-block reference type data based on the indicated technique. To entropy decode the splits data and modes data separately may include the video decoder being configured to determine a probable ordering of mode events including available modes being ordered from most likely to least likely, determine, from the bitstream, an index of an actual mode event for a first block of the video frame, and determine the actual mode event for the first block of the video frame based on the index and the probable ordering of modes events. To entropy decode the splits data and modes data separately may include the video decoder being configured to determine a local probable ordering of mode events including available modes being ordered from most likely to least likely, such that to determine the local probable ordering of modes may include the video decoder being configured to determine a global probable ordering of mode events, determine actual mode events at blocks neighboring a first block of the video frame, form a first sub-group of mode events based on the actual mode events placed in their order with respect to the global probable ordering of mode events, form a second sub-group of mode events based on mode events in the global probable ordering of mode events but not in the actual mode events placed in their order with respect to the global probable ordering of mode events, and concatenate the first and second sub-groups to form the local probable ordering of modes, determine, from the bitstream, an index of an actual mode event for a first block of the video frame, and determine the actual mode event for the first block of the video frame based on the index and the local probable ordering of modes events.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method for video coding, comprising:
    loading splits data, horizontal/vertical data, modes data, and reference type data for at least a portion of a video frame;
    determining a first estimated entropy coding bit cost comprising an entropy coding bit cost for jointly coding the splits data and the modes data and an entropy coding bit cost for coding the horizontal/vertical data;
    determining a second estimated entropy coding bit cost comprising an entropy coding bit cost for separately coding the splits data and the modes data, and an entropy coding bit cost for coding the horizontal/vertical data;
    selecting between jointly and separately coding the splits data and the modes data for at least the portion of the video frame based on the lowest of the first estimated entropy coding bit cost and the second estimated entropy coding bit cost;
    entropy encoding, jointly or separately based on the selected coding, the splits data and the modes data, and entropy encoding the horizontal/vertical data;
    entropy encoding the reference type data; and
    outputting a bitstream comprising the entropy encoded splits data, modes data, horizontal/vertical data, and reference type data.

2. The method of claim 1, wherein the reference type data comprises inter-block reference type data and multi-block reference type data, and wherein entropy encoding the reference type data comprises:
    selecting a variable length coding table for the multi-block reference type data based on a number of multi-reference types in the multi-block reference type data; and
    encoding the multi-block reference type data based on the variable length coding table.

3. The method of claim 1, wherein the reference type data comprises inter-block reference type data and multi-block reference type data, wherein the video frame comprises a P-picture, and wherein entropy encoding the reference type data comprises:
    determining a first inter-block reference type data coding bit cost based on proxy variable length coding using default prediction;
    determining a second inter-block reference type data coding bit cost based on proxy variable length coding using modified default prediction;
    determining a third inter-block reference type data coding bit cost based on proxy variable length coding using prediction; and
    encoding the inter-block reference type data based on a lowest bit cost from the first, second, and third inter-block reference type data coding bit costs.

4. The method of claim 1, wherein the reference type data comprises inter-block reference type data and multi-block reference type data, wherein the video frame comprises a B/F-picture, and wherein entropy encoding the reference type data comprises:
    determining a first inter-block reference type data coding bit cost based on proxy variable length coding using default prediction;
    determining a second inter-block reference type data coding bit cost based on proxy variable length coding using modified default prediction;
    determining a third inter-block reference type data coding bit cost based on proxy variable length coding without using prediction;
    determining a fourth inter-block reference type data coding bit cost based on proxy variable length coding using prediction;
    determining a fifth inter-block reference type data coding bit cost based on proxy variable length coding with a most frequent symbol coded with a symbol-run coding using prediction;
    determining a sixth inter-block reference type data coding bit cost based on proxy variable length coding using default-like prediction;
    determining a seventh inter-block reference type data coding bit cost based on proxy variable length coding with a most frequent symbol coded with a symbol-run coding using default-like prediction; and
    encoding the inter-block reference type data based on a lowest bit cost from the first through seventh inter-block reference type data coding bit costs.

5. The method of claim 1, wherein separately entropy encoding the modes data comprises:
    determining a first modes data coding bit cost based on proxy variable length coding without prediction;
    determining a second modes data coding bit cost based on proxy variable length coding with a most frequent symbol coded with a symbol-run coding without prediction;
    determining a third modes data coding bit cost based on proxy variable length coding with a most frequent symbol and a second most frequent symbol coded with a symbol-run coding without prediction;
    determining a fourth modes data coding bit cost based on proxy variable length coding using prediction;
    determining a fifth modes data coding bit cost based on proxy variable length coding with a most frequent symbol coded with a symbol-run coding using prediction;
    determining a sixth modes data coding bit cost based on proxy variable length coding with a most frequent symbol and a second most frequent symbol coded with a symbol-run coding using prediction; and
    encoding the modes data based on a lowest bit cost from the first through sixth modes data coding bit costs.

6. The method of claim 1, wherein separately entropy encoding the modes data comprises:
    determining a probable ordering of mode events comprising available modes being ordered from most likely to least likely;
    determining an actual mode event at a first block of the video frame; and
    coding the actual mode event as the index of the actual mode event in the probable ordering of modes events.

7. The method of claim 1, wherein separately entropy encoding the modes data comprises:
    determining a local probable ordering of mode events comprising available modes being ordered from most likely to least likely, wherein determining the local probable ordering of modes comprises:
        determining a global probable ordering of mode events;
        determining actual mode events at blocks neighboring a first block of the video frame;
        forming a first sub-group of mode events based on the actual mode events placed in their order with respect to the global probable ordering of mode events;
        forming a second sub-group of mode events based on mode events in the global probable ordering of mode events but not in the actual mode events placed in their order with respect to the global probable ordering of mode events; and concatenating the first and second sub-groups to form the local probable ordering of modes;

determining an actual mode event at a first block of the video frame; and coding the actual mode event as the index of the actual mode event in the local probable ordering of modes events.

8. The method of claim 1, wherein jointly entropy encoding the splits data and the modes data comprises entropy encoding the splits data and the modes data jointly as a collection of events using a prediction tree having a terminating block of at least one of intra-, skip-, auto-, inter-, or multi-, wherein a block is defined as split if it does not terminate, and wherein a first level of the prediction tree is coded using symbol-run coding and higher levels of the prediction tree are coded using variable length proxy coding.

9. The method of claim 1, wherein the splits data comprises split bits indicating whether a block is further split or not and the horizontal/vertical data indicating whether each split in the splits data is a horizontal or a vertical split, wherein the modes data comprises modes for blocks or partitions of the video frame, and wherein the modes data comprises at least one of intra mode, skip mode, split mode, auto mode, inter mode, or multi mode, wherein the reference type data comprises reference types for inter mode blocks of the video frame, wherein the video frame comprises a P-picture, and wherein reference types for the inter mode blocks comprise at least one of a previously decoded frame, a previously decoded super-resolution based frame, a previously decoded dominant motion morphed frame, or a previously decoded gain morphed frame, wherein the reference type data comprises reference types for multi mode blocks of the video frame, wherein the video frame comprises a P-picture, and wherein reference types for the multi mode blocks comprise a first reference type comprising a previously decoded frame and a second reference type comprising a second previously decoded frame, wherein the reference type data comprises reference types for inter mode blocks of the video frame, wherein the video frame comprises a B/F-picture, and wherein reference types for the inter mode blocks comprise at least one of a previously decoded frame, a projected reference frame, a previously decoded super-resolution based frame, a previously decoded dominant motion morphed frame, or a previously decoded gain morphed frame, wherein the reference type data comprises reference types for multi mode blocks of the video frame, wherein the video frame comprises a B/F-picture, and wherein reference types for the multi mode blocks comprise a first reference type comprising a previously decoded frame and a second reference type comprising at least one of a second previously decoded frame, a previously decoded super-resolution based frame, a projected reference frame, a previously decoded dominant motion morphed frame, or a previously decoded gain morphed frame, wherein the at least the portion of the video frame comprises a slice of the video frame or the video frame, wherein the reference type data comprises inter-block reference type data and multi-block reference type data, wherein the reference type data comprises inter-block reference type data and multi-block reference type data, and wherein encoding the reference type data comprises:

selecting a variable length coding table for the multi-block reference type data based on a number of multi-reference types in the multi-block reference type data; and encoding the multi-block reference type data based on the variable length coding table, wherein the reference type data comprises inter-block reference type data and multi-block reference type data, wherein the video frame comprises a P-picture, and wherein encoding the reference type data comprises:

determining a first inter-block reference type data coding bit cost based on proxy variable length coding using default prediction;

determining a second inter-block reference type data coding bit cost based on proxy variable length coding using modified default prediction;

determining a third inter-block reference type data coding bit cost based on proxy variable length coding using prediction; and encoding the inter-block reference type data based on a lowest bit cost from the first, second, and third inter-block reference type data coding bit costs, wherein the reference type data comprises inter-block reference type data and multi-block reference type data, wherein the video frame comprises a B/F-picture, and wherein encoding the reference type data comprises:

determining a first inter-block reference type data coding bit cost based on proxy variable length coding using default prediction;

determining a second inter-block reference type data coding bit cost based on proxy variable length coding using modified default prediction;

determining a third inter-block reference type data coding bit cost based on proxy variable length coding without using prediction;

determining a fourth inter-block reference type data coding bit cost based on proxy variable length coding using prediction;

determining a fifth inter-block reference type data coding bit cost based on proxy variable length coding with a most frequent symbol coded with a symbol-run coding using prediction;

determining a sixth inter-block reference type data coding bit cost based on proxy variable length coding using default-like prediction;

determining a seventh inter-block reference type data coding bit cost based on proxy variable length coding with a most frequent symbol coded with a symbol-run coding using default-like prediction; and encoding the inter-block reference type data based on a lowest bit cost from the first through seventh inter-block reference type data coding bit costs, wherein coding the modes data comprises:

determining a first modes data coding bit cost based on proxy variable length coding without prediction;

determining a second modes data coding bit cost based on proxy variable length coding with a most frequent symbol coded with a symbol-run coding without prediction;

determining a third modes data coding bit cost based on proxy variable length coding with a most frequent symbol and a second most frequent symbol coded with a symbol-run coding without prediction;

determining a fourth modes data coding bit cost based on proxy variable length coding using prediction;

determining a fifth modes data coding bit cost based on proxy variable length coding with a most frequent symbol coded with a symbol-run coding using prediction;

determining a sixth modes data coding bit cost based on proxy variable length coding with a most frequent symbol and a second most frequent symbol coded with a symbol-run coding using prediction; and encoding the modes data based on a lowest bit cost from the first through sixth modes data coding bit costs, wherein coding the modes data comprises:
 determining a probable ordering of mode events comprising available modes being ordered from most likely to least likely;
 determining an actual mode event at a first block of the video frame; and
 coding the actual mode event as the index of the actual mode event in the probable ordering of modes events, wherein coding the modes data comprises:
 determining a local probable ordering of mode events comprising available modes being ordered from most likely to least likely, wherein determining the local probable ordering of modes comprises:
  determining a global probable ordering of mode events;
  determining actual mode events at blocks neighboring a first block of the video frame;
  forming a first sub-group of mode events based on the actual mode events placed in their order with respect to the global probable ordering of mode events;
  forming a second sub-group of mode events based on mode events in the global probable ordering of mode events but not in the actual mode events placed in their order with respect to the global probable ordering of mode events; and
  concatenating the first and second sub-groups to form the local probable ordering of modes;
 determining an actual mode event at a first block of the video frame; and
 coding the actual mode event as the index of the actual mode event in the local probable ordering of modes events, wherein jointly coding the splits data and the modes data comprises coding the splits data and the modes data jointly as a collection of events using a prediction tree having a terminating block of at least one of intra-, skip-, auto-, inter-, or multi-, wherein a block is defined as split if it does not terminate, and wherein a first level of the prediction tree is coded using symbol-run coding and higher levels of the prediction tree are coded using variable length proxy coding, and wherein jointly coding the splits data and the modes data comprises coding the splits data and the modes data jointly as a collection of events using a prediction tree having a terminating block of at least one of intra-, skip-, auto-, inter-, or multi-, wherein a block is defined as split if it does not terminate, wherein a first level of the prediction tree is coded using symbol-run coding and higher levels of the prediction tree are coded using proxy variable length coding, and wherein coding the horizontal/vertical data comprises at least one of a bitmap coding or a proxy variable length coding.

10. A video encoder comprising:
an image buffer; and
a graphics processing unit comprising entropy encoder logic circuitry, wherein the graphics processing unit is communicatively coupled to the image buffer and wherein the entropy encoder logic circuitry is configured to:
 load splits data, horizontal/vertical data, modes data, and reference type data for at least a portion of a video frame;
 determine a first estimated entropy coding bit cost comprising an entropy coding bit cost for jointly coding the splits data and the modes data and an entropy coding bit cost for coding the horizontal/vertical data;
 determine a second estimated entropy coding bit cost comprising an entropy coding bit cost for separately coding the splits data and the modes data, and an entropy coding bit cost for coding the horizontal/vertical data;
 select between jointly and separately coding the splits data and the modes data for at least the portion of the video frame based on the lowest of the first estimated entropy coding bit cost and the second estimated entropy coding bit cost;
 entropy encode, jointly or separately based on the selected coding, the splits data and the modes data, and entropy encode the horizontal/vertical data;
 entropy encode the reference type data; and
 output a bitstream comprising the entropy encoded splits data, modes data, horizontal/vertical data, and reference type data.

11. The video encoder of claim 10, wherein the at least the portion of the video frame comprises a slice of the video frame or the video frame.

12. The video encoder of claim 10, wherein the reference type data comprises inter-block reference type data and multi-block reference type data, and wherein to entropy encode the reference type data comprises the entropy encoder logic circuitry being further configured to:
 select a variable length coding table for the multi-block reference type data based on a number of multi-reference types in the multi-block reference type data; and
 encode the multi-block reference type data based on the variable length coding table.

13. The video encoder of claim 10, wherein to separately entropy encode the modes data comprises the entropy encoder logic circuitry being further configured to:
 determine a first modes data coding bit cost based on proxy variable length coding without prediction;
 determine a second modes data coding bit cost based on proxy variable length coding with a most frequent symbol coded with a symbol-run coding without prediction;
 determine a third modes data coding bit cost based on proxy variable length coding with a most frequent symbol and a second most frequent symbol coded with a symbol-run coding without prediction;
 determine a fourth modes data coding bit cost based on proxy variable length coding using prediction;
 determine a fifth modes data coding bit cost based on proxy variable length coding with a most frequent symbol coded with a symbol-run coding using prediction;
 determine a sixth modes data coding bit cost based on proxy variable length coding with a most frequent symbol and a second most frequent symbol coded with a symbol-run coding using prediction; and encode the modes data based on a lowest bit cost from the first through sixth modes data coding bit costs.

14. The video encoder of claim 10, wherein to separately entropy encode the modes data comprises the entropy encoder logic circuitry being further configured to:
determine a local probable ordering of mode events comprising available modes being ordered from most likely to least likely, wherein to determine the local probable ordering of modes comprises the entropy encoder logic circuitry being further configured to:
determine a global probable ordering of mode events;
determine actual mode events at blocks neighboring a first block of the video frame;
form a first sub-group of mode events based on the actual mode events placed in their order with respect to the global probable ordering of mode events;
form a second sub-group of mode events based on mode events in the global probable ordering of mode events but not in the actual mode events placed in their order with respect to the global probable ordering of mode events; and
concatenate the first and second sub-groups to form the local probable ordering of modes;
determine an actual mode event at a first block of the video frame; and
code the actual mode event as the index of the actual mode event in the local probable ordering of modes events.

15. The video encoder of claim 10, wherein to jointly entropy encode the splits data and the modes data comprises the entropy encoder logic circuitry being further configured to entropy encode the splits data and the modes data jointly as a collection of events using a prediction tree having a terminating block of at least one of infra-, skip-, auto-, inter-, or multi-, wherein a block is defined as split if it does not terminate, and wherein a first level of the prediction tree is coded using symbol-run coding and higher levels of the prediction tree are coded using variable length proxy coding.

16. The video encoder of claim 10, wherein the splits data comprises split bits indicating whether a block is further split or not and the horizontal/vertical data indicating whether each split in the splits data is a horizontal or a vertical split,
wherein the modes data comprises modes for blocks or partitions of the video frame, and wherein the modes data comprises at least one of infra mode, skip mode, split mode, auto mode, inter mode, or multi mode,
wherein the reference type data comprises reference types for inter mode blocks of the video frame, wherein the video frame comprises a P-picture, and wherein reference types for the inter mode blocks comprise at least one of a previously decoded frame, a previously decoded super-resolution based frame, a previously decoded dominant motion morphed frame, or a previously decoded gain morphed frame,
wherein the reference type data comprises reference types for multi mode blocks of the video frame, wherein the video frame comprises a P-picture, and wherein reference types for the multi mode blocks comprise a first reference type comprising a previously decoded frame and a second reference type comprising a second previously decoded frame,
wherein the reference type data comprises reference types for inter mode blocks of the video frame, wherein the video frame comprises a B/F-picture, and wherein reference types for the inter mode blocks comprise at least one of a previously decoded frame, a projected reference frame, a previously decoded super-resolution based frame, a previously decoded dominant motion morphed frame, or a previously decoded gain morphed frame,
wherein the reference type data comprises reference types for multi mode blocks of the video frame, wherein the video frame comprises a B/F-picture, and wherein reference types for the multi mode blocks comprise a first reference type comprising a previously decoded frame and a second reference type comprising at least one of a second previously decoded frame, a previously decoded super-resolution based frame, a projected reference frame, a previously decoded dominant motion morphed frame, or a previously decoded gain morphed frame,
wherein the at least the portion of the video frame comprises a slice of the video frame or the video frame,
wherein the reference type data comprises inter-block reference type data and multi-block reference type data,
wherein the reference type data comprises inter-block reference type data and multi-block reference type data, and wherein to entropy encode the reference type data comprises the entropy encoder logic circuitry being further configured to:
select a variable length coding table for the multi-block reference type data based on a number of multi-reference types in the multi-block reference type data; and
encode the multi-block reference type data based on the variable length coding table,
wherein the reference type data comprises inter-block reference type data and multi-block reference type data, wherein the video frame comprises a P-picture, and wherein to entropy encode the reference type data comprises the entropy encoder logic circuitry being further configured to:
determine a first inter-block reference type data coding bit cost based on proxy variable length coding using default prediction;
determine a second inter-block reference type data coding bit cost based on proxy variable length coding using modified default prediction;
determine a third inter-block reference type data coding bit cost based on proxy variable length coding using prediction; and
encode the inter-block reference type data based on a lowest bit cost from the first, second, and third inter-block reference type data coding bit costs,
wherein the reference type data comprises inter-block reference type data and multi-block reference type data, wherein the video frame comprises a B/F-picture, and wherein to entropy encode the reference type data comprises the entropy encoder logic circuitry being further configured to:
determine a first inter-block reference type data coding bit cost based on proxy variable length coding using default prediction;
determine a second inter-block reference type data coding bit cost based on proxy variable length coding using modified default prediction;
determine a third inter-block reference type data coding bit cost based on proxy variable length coding without using prediction;

determine a fourth inter-block reference type data coding bit cost based on proxy variable length coding using prediction;
determine a fifth inter-block reference type data coding bit cost based on proxy variable length coding with a most frequent symbol coded with a symbol-run coding using prediction;
determine a sixth inter-block reference type data coding bit cost based on proxy variable length coding using default-like prediction;
determine a seventh inter-block reference type data coding bit cost based on proxy variable length coding with a most frequent symbol coded with a symbol-run coding using default-like prediction; and
encode the inter-block reference type data based on a lowest bit cost from the first through seventh inter-block reference type data coding bit costs,
wherein to separately entropy encode the modes data comprises the entropy encoder logic circuitry being further configured to:
determine a first modes data coding bit cost based on proxy variable length coding without prediction;
determine a second modes data coding bit cost based on proxy variable length coding with a most frequent symbol coded with a symbol-run coding without prediction;
determine a third modes data coding bit cost based on proxy variable length coding with a most frequent symbol and a second most frequent symbol coded with a symbol-run coding without prediction;
determine a fourth modes data coding bit cost based on proxy variable length coding using prediction;
determine a fifth modes data coding bit cost based on proxy variable length coding with a most frequent symbol coded with a symbol-run coding using prediction;
determine a sixth modes data coding bit cost based on proxy variable length coding with a most frequent symbol and a second most frequent symbol coded with a symbol-run coding using prediction; and
encode the modes data based on a lowest bit cost from the first through sixth modes data coding bit costs,
wherein to separately entropy encode the modes data comprises the entropy encoder logic circuitry being further configured to:
determine a probable ordering of mode events comprising available modes being ordered from most likely to least likely;
determine an actual mode event at a first block of the video frame; and
code the actual mode event as the index of the actual mode event in the probable ordering of modes events,
wherein to separately entropy encode the modes data comprises the entropy encoder logic circuitry being further configured to:
determine a local probable ordering of mode events comprising available modes being ordered from most likely to least likely, wherein to determine the local probable ordering of modes comprises the entropy encoder logic circuitry being further configured to:
determine a global probable ordering of mode events;
determine actual mode events at blocks neighboring a first block of the video frame;
form a first sub-group of mode events based on the actual mode events placed in their order with respect to the global probable ordering of mode events;
form a second sub-group of mode events based on mode events in the global probable ordering of mode events but not in the actual mode events placed in their order with respect to the global probable ordering of mode events; and
concatenate the first and second sub-groups to form the local probable ordering of modes;
determine an actual mode event at a first block of the video frame; and
code the actual mode event as the index of the actual mode event in the local probable ordering of modes events, and
wherein to jointly entropy encode the splits data and the modes data comprises the entropy encoder logic circuitry being further configured to entropy encode the splits data and the modes data jointly as a collection of events using a prediction tree having a terminating block of at least one of intra-, skip-, auto-, inter-, or multi-, wherein a block is defined as split if it does not terminate, wherein a first level of the prediction tree is coded using symbol-run coding and higher levels of the prediction tree are coded using proxy variable length coding, and wherein to entropy encode the horizontal/vertical data comprises the entropy encoder logic circuitry being further configured to perform at least one of a bitmap coding or a proxy variable length coding.

17. A system comprising:
a video decoder configured to decode an encoded bitstream, wherein the video decoder is configured to:
decode the encoded bitstream to determine a joint or separate coding header associated with splits data and modes data of at least a portion of a video frame;
entropy decode the splits data and the modes data jointly, and entropy decode horizontal/vertical data when the joint or separate coding header indicates joint coding;
entropy decode the splits data and the modes data separately, and entropy decode the horizontal/vertical data when the joint or separate coding header indicates separate coding; and
entropy decode the encoded bitstream to determine reference type data for the portion of the video frame.

18. The system of claim 17, wherein the reference type data comprises inter-block reference type data and multi-block reference type data, and wherein the video decoder is configured to:
select a variable length coding table for the multi-block reference type data based on a number of multi-reference types in the multi-block reference type data; and
decode the multi-block reference type data based on the variable length coding table.

19. The system of claim 17, wherein the reference type data comprises inter-block reference type data and multi-block reference type data, wherein the video frame comprises a P-picture, and wherein the video decoder is configured to:
determine an inter-block reference type coding technique indicator from the bitstream indicating at least one of a coding based on proxy variable length coding using default prediction, a coding based on proxy variable length coding using modified default prediction, or a coding based on proxy variable length coding using prediction; and entropy decode the inter-block reference type data based on the indicated technique.

20. The system of claim 17, wherein to entropy decode the splits data and modes data separately comprises the video decoder being configured to:

determining a local probable ordering of mode events comprising available modes being ordered from most likely to least likely, wherein to determine the local probable ordering of modes comprises the video decoder being configured to:

determine a global probable ordering of mode events;

determine actual mode events at blocks neighboring a first block of the video frame;

form a first sub-group of mode events based on the actual mode events placed in their order with respect to the global probable ordering of mode events;

form a second sub-group of mode events based on mode events in the global probable ordering of mode events but not in the actual mode events placed in their order with respect to the global probable ordering of mode events; and concatenate the first and second sub-groups to form the local probable ordering of modes;

determine, from the bitstream, an index of an actual mode event for a first block of the video frame; and determine the actual mode event for the first block of the video frame based on the index and the local probable ordering of modes events.

21. The system of claim 17, wherein the splits data comprises split bits indicating whether a block is further split, and wherein the horizontal/vertical data indicates whether splits in the splits data are horizontal or vertical splits, wherein the modes data comprises modes for blocks or partitions of the video frame, and wherein the modes data comprises at least one of intra mode, skip mode, split mode, auto mode, inter mode, or multi mode, wherein the reference type data comprises reference types for inter mode blocks of the video frame, wherein the video frame comprises a P-picture, and wherein reference types for the inter mode blocks comprise at least one of a previously decoded frame, a previously decoded super-resolution based frame, a previously decoded dominant motion morphed frame, or a previously decoded gain morphed frame, wherein the reference type data comprises reference types for multi mode blocks of the video frame, wherein the video frame comprises a P-picture, and wherein reference types for the multi mode blocks comprise a first reference type comprising a previously decoded frame and a second reference type comprising a second previously decoded frame, wherein the reference type data comprises reference types for inter mode blocks of the video frame, wherein the video frame comprises a B/F-picture, and wherein reference types for the inter mode blocks comprise at least one of a previously decoded frame, a projected reference frame, a previously decoded super-resolution based frame, a previously decoded dominant motion morphed frame, or a previously decoded gain morphed frame, wherein the reference type data comprises reference types for multi mode blocks of the video frame, wherein the video frame comprises a B/F-picture, and wherein reference types for the multi mode blocks comprise a first reference type comprising a previously decoded frame and a second reference type comprising at least one of a second previously decoded frame, a previously decoded super-resolution based frame, a projected reference frame, a previously decoded dominant motion morphed frame, or a previously decoded gain morphed frame, wherein the reference type data comprises inter-block reference type data and multi-block reference type data, wherein the reference type data comprises inter-block reference type data and multi-block reference type data, and wherein the video decoder is configured to:

select a variable length coding table for the multi-block reference type data based on a number of multi-reference types in the multi-block reference type data; and entropy decode the multi-block reference type data based on the variable length coding table, wherein the reference type data comprises inter-block reference type data and multi-block reference type data, wherein the video frame comprises a P-picture, and wherein the video decoder is configured to:

determine an inter-block reference type coding technique indicator from the bitstream indicating at least one of a coding based on proxy variable length coding using default prediction, a coding based on proxy variable length coding using modified default prediction, or a coding based on proxy variable length coding using prediction; and entropy decode the inter-block reference type data based on the indicated technique, wherein the reference type data comprises inter-block reference type data and multi-block reference type data, wherein the video frame comprises a B/F-picture, and wherein the video decoder is configured to:

determine an inter-block reference type coding technique indicator from the bitstream indicating at least one of a coding based on proxy variable length coding using default prediction, a coding based on proxy variable length coding using modified default prediction, a coding based on proxy variable length coding without using prediction, a coding based on proxy variable length coding using prediction, a coding based on proxy variable length coding with a most frequent symbol coded with a symbol-run coding using prediction, or a coding based on proxy variable length coding using default-like prediction; and entropy decode the inter-block reference type data based on the indicated technique, wherein to entropy decode the splits data and modes data separately comprises the video decoder being configured to:

determine a probable ordering of mode events comprising available modes being ordered from most likely to least likely;

determine, from the bitstream, an index of an actual mode event for a first block of the video frame; and determine the actual mode event for the first block of the video frame based on the index and the probable ordering of modes events, and wherein to entropy decode the splits data and modes data separately comprises the video decoder being configured to:

determine a local probable ordering of mode events comprising available modes being ordered from most likely to least likely, wherein to determine the local probable ordering of modes comprises the video decoder being configured to:
  determine a global probable ordering of mode events;
  determine actual mode events at blocks neighboring a first block of the video frame;
  form a first sub-group of mode events based on the actual mode events placed in their order with respect to the global probable ordering of mode events;
  form a second sub-group of mode events based on mode events in the global probable ordering of mode events but not in the actual mode events placed in their order with respect to the global probable ordering of mode events; and
  concatenate the first and second sub-groups to form the local probable ordering of modes;
  determine, from the bitstream, an index of an actual mode event for a first block of the video frame; and
  determine the actual mode event for the first block of the video frame based on the index and the local probable ordering of modes events.

22. At least one non-transitory machine readable medium comprising a plurality of instructions that in response to being executed on a computing device, cause the computing device to provide video coding by:
  loading splits data, horizontal/vertical data, modes data, and reference type data for at least a portion of a video frame;
  determining a first estimated entropy coding bit cost comprising an entropy coding bit cost for jointly coding the splits data and the modes data and an entropy coding bit cost for coding the horizontal/vertical data;
  determining a second estimated entropy coding bit cost comprising an entropy coding bit cost for separately coding the splits data and the modes data, and an entropy coding bit cost for coding the horizontal/vertical data;
  selecting between jointly and separately coding the splits data and the modes data for at least the portion of the video frame based on the lowest of the first estimated entropy coding bit cost and the second estimated entropy coding bit cost;
  entropy encoding, jointly or separately based on the selected coding, the splits data and the modes data, and entropy encoding the horizontal/vertical data;
  entropy encoding the reference type data; and
  outputting a bitstream comprising the entropy encoded splits data, modes data, horizontal/vertical data, and reference type data.

23. The non-transitory machine readable medium of claim 22, wherein the reference type data comprises inter-block reference type data and multi-block reference type data, and wherein the machine readable medium comprises further instructions that in response to being executed on a computing device, cause the computing device to provide video coding by:
  selecting a variable length coding table for the multi-block reference type data based on a number of multi-reference types in the multi-block reference type data; and
  encoding the multi-block reference type data based on the variable length coding table.

24. The non-transitory machine readable medium of claim 22, further comprising instructions that in response to being executed on a computing device, cause the computing device to separately encode the modes data by:
  determining a local probable ordering of mode events comprising available modes being ordered from most likely to least likely, wherein determining the local probable ordering of modes comprises:
    determining a global probable ordering of mode events;
    determining actual mode events at blocks neighboring a first block of the video frame;
    forming a first sub-group of mode events based on the actual mode events placed in their order with respect to the global probable ordering of mode events;
    forming a second sub-group of mode events based on mode events in the global probable ordering of mode events but not in the actual mode events placed in their order with respect to the global probable ordering of mode events; and
    concatenating the first and second sub-groups to form the local probable ordering of modes;
  determining an actual mode event at a first block of the video frame; and
  coding the actual mode event as the index of the actual mode event in the local probable ordering of modes events.

25. The non-transitory machine readable medium of claim 22, wherein the splits data comprises split bits indicating whether a block is further split or not and the horizontal/vertical data indicating whether each split in the splits data is a horizontal or a vertical split,
  wherein the modes data comprises modes for blocks or partitions of the video frame, and wherein the modes data comprises at least one of intra mode, skip mode, split mode, auto mode, inter mode, or multi mode,
  wherein the reference type data comprises reference types for inter mode blocks of the video frame, wherein the video frame comprises a P-picture, and wherein reference types for the inter mode blocks comprise at least one of a previously decoded frame, a previously decoded super-resolution based frame, a previously decoded dominant motion morphed frame, or a previously decoded gain morphed frame,
  wherein the reference type data comprises reference types for multi mode blocks of the video frame, wherein the video frame comprises a P-picture, and wherein reference types for the multi mode blocks comprise a first reference type comprising a previously decoded frame and a second reference type comprising a second previously decoded frame,
  wherein the reference type data comprises reference types for inter mode blocks of the video frame, wherein the video frame comprises a B/F-picture, and wherein reference types for the inter mode blocks comprise at least one of a previously decoded frame, a projected reference frame, a previously decoded super-resolution based frame, a previously decoded dominant motion morphed frame, or a previously decoded gain morphed frame,
  wherein the reference type data comprises reference types for multi mode blocks of the video frame, wherein the video frame comprises a B/F-picture, and wherein reference types for the multi mode blocks comprise a first reference type comprising a previously decoded frame and a second reference type comprising at least one of a second previously decoded frame, a previously decoded super-resolution based frame, a projected reference frame, a previously decoded dominant motion morphed frame, or a previously decoded gain morphed frame, wherein the at least the portion of the video frame comprises a slice of the video frame or the video frame, wherein the reference type data comprises inter-block reference type data and multi-block reference type data, wherein the reference type data comprises inter-block reference type data and multi-block reference type data, and wherein encoding the reference type data comprises:
   selecting a variable length coding table for the multi-block reference type data based on a number of multi-reference types in the multi-block reference type data; and
   encoding the multi-block reference type data based on the variable length coding table, wherein the reference type data comprises inter-block reference type data and multi-block reference type data, wherein the video frame comprises a P-picture, and wherein encoding the reference type data comprises:
   determining a first inter-block reference type data coding bit cost based on proxy variable length coding using default prediction;
   determining a second inter-block reference type data coding bit cost based on proxy variable length coding using modified default prediction;
   determining a third inter-block reference type data coding bit cost based on proxy variable length coding using prediction; and
   encoding the inter-block reference type data based on a lowest bit cost from the first, second, and third inter-block reference type data coding bit costs, wherein the reference type data comprises inter-block reference type data and multi-block reference type data, wherein the video frame comprises a B/F-picture, and wherein encoding the reference type data comprises:
   determining a first inter-block reference type data coding bit cost based on proxy variable length coding using default prediction;
   determining a second inter-block reference type data coding bit cost based on proxy variable length coding using modified default prediction;
   determining a third inter-block reference type data coding bit cost based on proxy variable length coding without using prediction;
   determining a fourth inter-block reference type data coding bit cost based on proxy variable length coding using prediction;
   determining a fifth inter-block reference type data coding bit cost based on proxy variable length coding with a most frequent symbol coded with a symbol-run coding using prediction;
   determining a sixth inter-block reference type data coding bit cost based on proxy variable length coding using default-like prediction;
   determining a seventh inter-block reference type data coding bit cost based on proxy variable length coding with a most frequent symbol coded with a symbol-run coding using default-like prediction; and
   encoding the inter-block reference type data based on a lowest bit cost from the first through seventh inter-block reference type data coding bit costs, wherein coding the modes data comprises:
   determining a first modes data coding bit cost based on proxy variable length coding without prediction;
   determining a second modes data coding bit cost based on proxy variable length coding with a most frequent symbol coded with a symbol-run coding without prediction;
   determining a third modes data coding bit cost based on proxy variable length coding with a most frequent symbol and a second most frequent symbol coded with a symbol-run coding without prediction;
   determining a fourth modes data coding bit cost based on proxy variable length coding using prediction;
   determining a fifth modes data coding bit cost based on proxy variable length coding with a most frequent symbol coded with a symbol-run coding using prediction;
   determining a sixth modes data coding bit cost based on proxy variable length coding with a most frequent symbol and a second most frequent symbol coded with a symbol-run coding using prediction; and
   encoding the modes data based on a lowest bit cost from the first through sixth modes data coding bit costs, wherein coding the modes data comprises:
   determining a probable ordering of mode events comprising available modes being ordered from most likely to least likely;
   determining an actual mode event at a first block of the video frame; and
   coding the actual mode event as the index of the actual mode event in the probable ordering of modes events, wherein coding the modes data comprises:
   determining a local probable ordering of mode events comprising available modes being ordered from most likely to least likely, wherein determining the local probable ordering of modes comprises:
     determining a global probable ordering of mode events;
     determining actual mode events at blocks neighboring a first block of the video frame;
     forming a first sub-group of mode events based on the actual mode events placed in their order with respect to the global probable ordering of mode events;
     forming a second sub-group of mode events based on mode events in the global probable ordering of mode events but not in the actual mode events placed in their order with respect to the global probable ordering of mode events; and
     concatenating the first and second sub-groups to form the local probable ordering of modes;
   determining an actual mode event at a first block of the video frame; and
   coding the actual mode event as the index of the actual mode event in the local probable ordering of modes events, wherein jointly coding the splits data and the modes data comprises coding the splits data and the modes data jointly as a collection of events using a prediction tree having a terminating block of at least one of intra-, skip-, auto-, inter-, or multi-, wherein a block is defined as split if it does not terminate, and wherein a first level of the prediction tree is coded using symbol-run coding and higher levels of the prediction tree are coded using variable length proxy coding, and wherein jointly coding the splits data and the modes data comprises coding the splits data and the modes data jointly as a collection of events using a prediction tree having a terminating block of at least one of intra-, skip-, auto-, inter-, or multi-, wherein a block is defined as split if it does not terminate, wherein a first level of the prediction tree is coded using symbol-run coding and higher levels of the prediction tree are coded using proxy variable length coding, and wherein coding the horizontal/vertical data comprises at least one of a bitmap coding or a proxy variable length coding.

* * * * *